(12) United States Patent
Garnick et al.

(10) Patent No.: US 10,500,935 B2
(45) Date of Patent: Dec. 10, 2019

(54) VEHICLE COVER

(71) Applicant: Marc B. Garnick, Boston, MA (US)

(72) Inventors: Marc B. Garnick, Boston, MA (US); Joshua B. Lederer, Pittsburgh, PA (US)

(73) Assignee: VPROTECH, INC., Wilmington, DE (US)

( * ) Notice: Subject to any disclaimer, the term of this patent is extended or adjusted under 35 U.S.C. 154(b) by 0 days.

(21) Appl. No.: 16/049,268

(22) Filed: Jul. 30, 2018

(65) Prior Publication Data

US 2018/0334020 A1 Nov. 22, 2018

Related U.S. Application Data

(63) Continuation-in-part of application No. 15/607,233, filed on May 26, 2017, now Pat. No. 10,035,412.

(60) Provisional application No. 62/342,607, filed on May 27, 2016.

(51) Int. Cl.
*B60J 11/04* (2006.01)

(52) U.S. Cl.
CPC ...................... *B60J 11/04* (2013.01)

(58) Field of Classification Search
CPC .................... B60J 11/04; B60J 11/00
USPC .............. 296/136.01, 136.07, 136.1, 136.13
See application file for complete search history.

(56) References Cited

U.S. PATENT DOCUMENTS

| | | |
|---|---|---|
| 3,474,803 A | 10/1969 | Davis |
| 4,294,483 A | 10/1981 | Ferris |
| 4,315,535 A | 2/1982 | Battle |
| 4,773,456 A | 9/1988 | Rodgers |
| 4,991,363 A | 2/1991 | Randmae |
| 5,242,206 A | 9/1993 | Heck |
| 5,287,904 A | 2/1994 | Smith et al. |
| 5,350,000 A | 9/1994 | Wang |
| 5,660,134 A | 8/1997 | Kim |
| 5,800,006 A | 9/1998 | Pettigrew |
| 5,890,525 A | 4/1999 | Shores |
| 5,902,003 A | 5/1999 | Hindson |

(Continued)

OTHER PUBLICATIONS

YouTube Video entitled "Extreme Vehicle Protection" posted by YouTube User Kenny Lerneri on Mar. 14, 2015. <https://www.youtube.com/watch?v=PgEsMLdooeA&sns=em> Accessed on Jun. 15, 2017.

(Continued)

*Primary Examiner* — Brent W Herring
(74) *Attorney, Agent, or Firm* — Mintz Levin Cohn Ferris Glovsky and Popeo, P.C.

(57) ABSTRACT

Methods and devices are provided for vehicle covers. For example, a method of covering a vehicle is provided including placing a pre-folded vehicle cover between front and rear wheels of the vehicle and then driving the vehicle forwards until the rear wheels of the vehicle are on top of the vehicle cover. The method includes extending a rear portion of the vehicle cover and driving the vehicle backwards until the front wheels of the vehicle are on top of the vehicle cover. The method further includes extending a front portion of the vehicle cover and covering at least a bottom and at least part of each side of the vehicle with the vehicle cover to form a barrier underneath and at least partially around the vehicle. The method can also include covering a top of the vehicle and entirely enclosing the vehicle.

26 Claims, 60 Drawing Sheets

(56) References Cited

U.S. PATENT DOCUMENTS

| | | | |
|---|---|---|---|
| 5,921,389 A | 7/1999 | Zoffer | |
| 5,954,200 A | 9/1999 | Allain et al. | |
| 6,044,881 A | 4/2000 | Welch et al. | |
| 6,056,347 A | 5/2000 | D'Adamo | |
| 6,220,263 B1* | 4/2001 | Randmae | B60J 11/00 135/115 |
| 6,273,113 B1 | 8/2001 | Streyckmans | |
| 6,439,644 B1 | 8/2002 | Jester | |
| 6,517,141 B1 | 2/2003 | Su | |
| 6,588,827 B2 | 7/2003 | Heiland | |
| 6,893,074 B1 | 5/2005 | Wilson | |
| 7,182,391 B2 | 2/2007 | Thrasher et al. | |
| 7,381,460 B2 | 6/2008 | Palmer et al. | |
| 7,604,016 B2 | 10/2009 | Songest | |
| 7,699,380 B2 | 4/2010 | Coleman | |
| 7,963,581 B1 | 6/2011 | Miller | |
| 8,091,947 B1 | 1/2012 | Miller | |
| 8,146,984 B2 | 4/2012 | Devereaux | |
| 8,171,947 B2 | 5/2012 | Hardie | |
| 8,733,380 B1 | 5/2014 | Roberts et al. | |
| 9,061,808 B2 | 6/2015 | Echauz | |
| 9,156,339 B1 | 10/2015 | Perez et al. | |
| 9,248,730 B2 | 2/2016 | Hu | |
| 9,302,572 B2 | 4/2016 | Wang | |
| 9,499,035 B1 | 11/2016 | Chashchukhin | |
| 9,744,837 B2* | 8/2017 | White | B60J 11/04 |
| 10,035,412 B2 | 7/2018 | Garnick et al. | |
| 2002/0157696 A1 | 10/2002 | O'Brien | |
| 2005/0139300 A1 | 6/2005 | Harmon | |
| 2005/0151391 A1 | 7/2005 | Bryd | |
| 2006/0225822 A1 | 10/2006 | Chen | |
| 2007/0176462 A1 | 8/2007 | Lombardo | |
| 2007/0216193 A1* | 9/2007 | Webber | B60J 11/00 296/136.01 |
| 2007/0252406 A1* | 11/2007 | Webber | B60J 11/00 296/136.12 |
| 2009/0008958 A1 | 1/2009 | Sebera et al. | |
| 2009/0140541 A1* | 6/2009 | Suh | B60J 11/00 296/136.01 |
| 2012/0102650 A1* | 5/2012 | McGlynn | A61G 1/00 5/627 |
| 2013/0118659 A1 | 5/2013 | Zhou | |
| 2013/0312882 A1 | 11/2013 | Echauz | |
| 2014/0042771 A1 | 2/2014 | Lo | |
| 2014/0265421 A1* | 9/2014 | Chang | B60J 11/04 296/95.1 |
| 2015/0075685 A1 | 3/2015 | Denham | |
| 2015/0367717 A1 | 12/2015 | Hu | |
| 2016/0009167 A1* | 1/2016 | Ein | B60J 11/04 150/166 |
| 2016/0185200 A1* | 6/2016 | Molina | B60J 11/04 296/136.02 |
| 2016/0207385 A1* | 7/2016 | Ward | B60J 11/04 |
| 2016/0221427 A1 | 8/2016 | Robinson et al. | |
| 2016/0339772 A1 | 11/2016 | Acosta | |
| 2016/0368357 A1 | 12/2016 | Lerner et al. | |
| 2017/0341497 A1 | 11/2017 | Garnick et al. | |
| 2018/0001755 A1 | 1/2018 | Cummings et al. | |

OTHER PUBLICATIONS

Alibaba Listing. 2015 High Quality Hail Protection Car Cover Cold-Resistance Car Body Cover. <https://www.alibaba.com/product-detail/2015-high-quality-hail-protection-car_60315361184.html> Accessed on Jun. 15, 2017.

Alibaba Listing. Water Flood Protection Big Bag for Car. <https://www.alibaba.com/product-detail/water-flood-protection-BIG-BAG-for_142361554.html> Accessed on Jun. 15, 2017.

Auto Anything Website. Rhino Shelter Car Storage Bag. <http://www.autoanything.com/car-covers/rhino-shelter-car-storage-bag> Accessed on Jun. 15, 2017.

Carcoon Website. <https://www.carcoon.com/carcoon-double-skin-outdoor> Accessed on Jun. 15, 2017.

Covercraft Website. < http://www.covercraft.com/us/en> Accessed on Jun. 15, 2017.

Coverking Website. Custom Tailored Vehicle Covers. <https://www.coverking.com/view-custom-car-covers> Accessed on Jun. 15, 2017.

Coverworld Website. Hail Protection Covers for Utes Single Cab and Dual Cab utes. <http://www.coverworld.com.au/car-covers/4x4-ute/hail-covers-utes.html> Accessed on Jun. 15, 2017.

Extreme Vehicle Protection Website. <https://www.extremevehicleprotection.com/> Accessed on Jun. 15, 2017.

Floody Carbag Faceook Website. <https://www.facebook.com/FLOODY-CARBAG-507516485940829/> Accessed on Jun. 15, 2017.

Floody Carbag Website. <http://www.floodycarbag.com/> Accessed on Jun. 15, 2017.

Hail Blankets Website. <http://www.hailblankets.com/site/> Accessed on Jun. 15, 2017.

Hail Protector Website. <https://www.hailprotector.com/> Accessed on Jun. 15, 2017.

Peter Protection Website. Water Away Capsule. <http://www.peterprotection.com/about> Accessed on Jun. 15, 2017.

Seal Skin Covers Website. Seal Skin Supreme All Weather Outdoor Cover. <https://www.sealskincovers.com/index.php/seal-skin-trade-5l-car-cover-432076.html> Accessed on Jun. 15, 2017.

WeatherTech Website. Custom Fit Car Covers. <http://www.weathertech.com/car-covers/> Accessed on Jun. 15, 2017.

YouTube Video entitled "Man invents car cover that protects vehicles from hail" posted by YouTube User KOCO 5 News on May 2, 2013. <https://www.youtube.com/watch?v=7sChWea6Fvo>.

YouTube Video entitled "Save Your Car in flood just By 1 set cover and 1 person" posted by YouTube User TPX8888 TPX8888 on Aug. 17, 2015. <https://www.youtube.com/watch?v=Zcmc6JAEhUU>.

International Search Report and Written Opinion for Application No. PCT/US2017/034825 dated Aug. 10, 2017.

\* cited by examiner

VEHICLE COVER

This application claims priority from U.S. patent application Ser. No. 15/607,233, filed May 26, 2017, and from U.S. Provisional App. No. 62/342,607, filed May 27, 2016, both of which are incorporated herein in their entirety.

FIELD

Devices are provided for a vehicle cover and methods are provided for using the same.

BACKGROUND

Every vehicle owner wants to protect his or her vehicle from harm and damage caused by nature. Many vehicle covers exist that can cover select areas of a vehicle, such as covering the top of a vehicle. However, these existing covers are designed primarily to protect against rain or snow descending from above the vehicle and thus cover only the top of the vehicle. This design leaves large portions of the vehicle exposed to the elements, such as the entire undersurface of the vehicle. For example, during flooding water originates from beneath the vehicle, and thus water can seep into the vehicle from underneath, causing irreversible damage to the vehicle that standard vehicle covers cannot prevent. Other acts of nature, such as hail, can also cause damage through most vehicle covers because many vehicle covers are not designed to prevent damage from external forces, such as hail damage.

These various acts of nature, such as flooding, can cause serious damage to vehicles, such as causing so much damage that a vehicle may be considered to be totaled and irredeemably lost because of the damage. As acts of nature such as flooding continue to occur, especially as problems of climate change may make such acts more common, more and more vehicles are subjected to often irreversible damage that current vehicle covers are unable to prevent, costing significant money, effort, and resources to handle and/or replace.

Accordingly, there remains a need for devices for a vehicle cover and methods for using the same.

SUMMARY

Various methods and devices are provided for a vehicle cover and for using the same.

In one aspect, a covering for a vehicle is provided with an at least water resistant upper cover including a top panel dimensioned to cover at least a top of the vehicle and a plurality of upper side portions that extend from the top panel. The covering also has an at least water resistant lower cover including a bottom panel dimensioned to cover at least a bottom of the vehicle and a plurality of lower side portions that extend from the bottom panel. The lower cover is coupled to the upper cover on a side thereof. A plurality of upper fasteners are coupled to peripheral edges of the upper cover, and a plurality of lower fasteners are coupled to peripheral edges of the lower cover and are complementary to the upper fasteners such that the upper and lower fasteners form an at least water resistant seal when the upper and lower fasteners engage each other. The upper cover and the lower cover are configured to fully envelop the vehicle and the upper and lower fasteners being configured to provide an at least water resistant barrier between the vehicle and external elements. The lower cover is also pre-folded such that the lower cover has a front portion that is folded and a back portion that is folded.

The covering can have numerous variations. For example, the front portion of the lower cover can be pre-folded in an accordion fold, and the back portion of the lower cover can be pre-folded in an accordion fold. The front portion of the lower cover can also be pre-folded in a rolled formation, and the back portion of the lower cover can also be pre-folded in a rolled formation. One or more markings can be formed on the lower cover configured to indicate placement of the vehicle and the lower cover relative to each other. In other embodiments, the covering can include a pulling member engaged with the lower cover and configured to move the lower cover. The pulling member can be selected from a rope, a string, a cloth, a strap, and a handle. In other instances, the covering can include a pushing member that is engaged with the lower cover and is configured to move the lower cover. The pushing member can be selected from a collapsible rod, a telescoping rod, a fixed rod, a stick, a bar, and a handle. In other examples, the plurality of upper fasteners and the plurality of lower fasteners can be selected from a zipper, Velcro, elastic bands, adhesives, ropes, tethers, hooks, snaps, buttons, tape, straps, webbing, webbed straps, and magnets.

In other embodiments, a front portion of the upper cover and the front portion of the lower cover can be pre-folded in a rolled configuration, and a back portion of the upper cover and the back portion of the lower cover can be pre-folded in a rolled configuration. In some examples, a front portion of the upper cover and the front portion of the lower cover can be pre-folded in a rolled configuration, and a back portion of the upper cover and the back portion of the lower cover can be pre-folded in an accordion fold. In another example, the covering can include a plurality of rope-and-engagement-members and a plurality of corresponding loop members positioned opposite one another around the peripheral edges of the lower cover. The plurality of rope-and-engagement-members and the plurality of corresponding loop members can be configured to pair with each other such that each rope-and-engagement-member is configured to engage one loop member, and each pair can be configured to secure excess slack of the upper cover and the lower cover when the covering is on a vehicle. The plurality of rope-and-engagement-members can include one of rope, straps, and webbing. The plurality of loop members include one of a side bar buckle, a cam buckle, a slide buckle, and a double ring. Each pair of the rope-and-engagement-member and the loop member can also have a matching distinct color from the other pairs. In some examples, the upper cover and the lower cover are made of a variety of different materials, such as reinforced poly sheeting. For example, woven reinforced polyethylene sheeting can be used that is either fire-retardant (for example, meeting NFPA 701 Method II and/or Boston Fire Marshal Test BFD IX-1) or non-fire-retardant. The material can be constructed from strips of polyethylene that are woven together. They can optionally be coated on both sides. The material can be puncture and tear resistant, UV-treated, and designed to repel water. The material can be a variety of thicknesses, such as about 4 mm, about 5 mm, about 6 mm, about 7 mm, or about 8 mm thick. As one example, the commercially-available material called Strong Weave 77 can be used.

The upper cover and the lower cover can be made from one or more materials selected from flexible polymer, a cloth, or plastic. The lower cover can have different material properties than the upper cover. In other examples, the lower cover is thicker than the upper cover. For example, the upper and lower cover can each have a thickness of between approximately 3 mm and approximately 20 mm, and more preferably between approximately 5 mm and approximately 15 mm, and more preferably between approximately 5 mm and approximately 10 mm. A weight of the lower and upper covers can be configured not to exceed approximately 30 pounds, or more preferably approximately 25 pounds, or more preferably within a range of about 12 pounds to about 16 pounds. The lower cover can have different dimensions than the upper cover. At least one of the upper cover and the lower cover can have a lip extending around the peripheral edges thereof configured to resist water passage around the plurality of upper and lower fasteners.

In some examples, one or more expandable shafts can be attached to an inside surface of the upper cover and configured to be positioned between the upper cover and the vehicle. The one or more expandable shafts can be self-expanding. The one or more expandable shafts can also be inflatable tubes. In some examples, the covering can have at least one upper engagement on the upper cover and at least one corresponding lower engagement on the lower cover, and the upper and lower engagements can be configured to engage with each other after the upper and lower covers have surrounded the vehicle and while the plurality of upper fasteners and the plurality of lower fasteners are engaged with each other. The peripheral edges of the upper cover and the peripheral edges of the lower cover can be curved to approximate a shape of the vehicle and configured to eliminate excess material, such as being radiused at approximately 4 to 6 feet. The top panel and the plurality of upper side portions can also be integral with each other, and the bottom panel and the plurality of lower side portions can be integral with each other. In one example, the top panel and the plurality of upper side portions can be made from a single piece of material, and the bottom panel and the plurality of lower side portions can be made from another single piece of material. A length of the lower cover can be less than 200% of a total length of the vehicle. A length of the lower cover can also be less than 170% of a total length of the vehicle. For example, a length of the lower and/or upper cover can be approximately 160% to 180% a total length of a vehicle, and more preferably 164%. The cover can be 6 to 9 feet longer than a total length of a vehicle. In some embodiments, at least one of the upper cover and the lower cover can have a transparent portion.

In another aspect, a method of covering a vehicle is provided that includes placing a pre-folded, at least water resistant lower cover between front and rear wheels of the vehicle. The method also includes unfolding a pre-folded, at least water resistant upper cover coupled to the lower cover to one side of the vehicle, and driving the vehicle forwards until the rear wheels of the vehicle are on top of the lower cover. The method includes extending a rear portion of the lower cover behind the vehicle and driving the vehicle backwards until the front wheels of the vehicle are on top of the lower cover while the back wheels remain on top of the lower cover. The method additionally includes extending a front portion of the lower cover in front of the vehicle and covering at least a bottom and at least part of each side of the vehicle with the lower cover. The method then includes covering at least a top of the vehicle with the upper cover and sealing the upper cover and the lower cover together to entirely envelope the vehicle to form an at least water resistant barrier around the vehicle.

The method can have numerous variations. For example, sealing the upper cover and the lower cover together can include fastening peripheral edges of the upper cover and the lower cover to one another using a fastener selected from a zipper, Velcro, elastic bands, adhesives, ropes, tethers, hooks, snaps, buttons, tape, straps, webbing, webbed straps, and magnets. The method can include engaging one or more expandable shafts to the upper cover and positioning the one or more expandable shafts along the top of the vehicle and expanding the shafts. When the one or more expandable shafts are expanded, the method can include preventing hail damage to the vehicle. The method can also include filling the one or more expandable shafts with air. In other embodiments, the method can include extending the lower cover between the front and rear wheels of the vehicle by using a movement means selected from a rod and a rope attached to the lower cover. Driving the vehicle forwards and driving the vehicle backwards can also include driving the vehicle until it rests on one or more markings on the lower cover configured to indicate placement of the vehicle and the lower cover relative to each other. In another example, the method can include, after covering at least the bottom and at least part of each side of the vehicle with the lower cover and covering at least a top of the vehicle with the upper cover but before sealing the upper cover and the lower cover together, engaging at least one engagement on the upper cover with at least one engagement on the lower cover to keep the upper and lower covers in place during sealing. The pre-folded lower cover can have a front portion and a back portion when pre-folded with either accordion style or rolled pre-folds, and driving the vehicle forwards and driving the vehicle backwards to position the vehicle on the lower cover can require clearance in front of the vehicle and clearance behind the vehicle of approximately 34% of a total length of the vehicle or less, such as approximately 25% to 30%. In another example, driving the vehicle forwards and driving the vehicle backwards to position the vehicle on the lower cover can require clearance in front of the vehicle and clearance behind the vehicle of approximately 9% to 15% of a total length of the vehicle, or more preferably approximately 13% or less. Driving the vehicle forwards and driving the vehicle backwards to position the vehicle on the lower cover can require clearance in front of the vehicle and clearance behind the vehicle of approximately 2 to 5 feet in each direction, and more preferably approximately 2 feet to 3 feet, and more preferably 18 inches. The method can also include, subsequent to the upper cover and the lower cover being sealed together, preventing the ingress of water into the vehicle.

In another aspect, a method of covering and/or enveloping a vehicle is provided including placing a pre-folded vehicle cover between front and rear wheels of the vehicle and driving the vehicle forwards until the rear wheels of the vehicle are on top of the vehicle cover. The method also includes extending a rear portion of the vehicle cover behind the vehicle and driving the vehicle backwards until the front wheels of the vehicle are on top of the vehicle cover. The method further includes extending a front portion of the vehicle cover in front of the vehicle and covering, or putting on top of, underneath, around, or entirely enveloping, at least a bottom and at least part of each side of the vehicle with the vehicle cover to form a barrier underneath and at least partially around the vehicle.

The method can have numerous variations. For example, covering at least the bottom and at least part of each side of the vehicle can include entirely enveloping the vehicle with the vehicle cover to form a barrier around the vehicle. In another example, the vehicle cover is compressed or folded to a size that is a fraction of its uncompressed or unfolded size and/or volume, such as 10%, 5%, 1%, 0.1%, or 0.01% of its uncompressed or unfolded size and/or volume. For example, the cover can have an accordion style pre-fold. In still another example, the vehicle cover can be waterproof. In other embodiments, the vehicle cover can be water resistant. In some embodiments, the vehicle cover is compressed and/or can be compressible before it is fully deployed. In other embodiments, extending the rear portion of the vehicle cover includes pulling a pull tab attached to the rear portion of the vehicle cover and unfolding the rear portion once the rear tires have been placed over the folded portion of the rear fold of the cover. In another example, extending the front portion of the vehicle cover includes pulling a pull tab attached to the front portion of the vehicle cover and unfolding the front portion once the front tires have been backed up over the folded portion of the front fold of the cover.

A variety of materials for a vehicle cover can be used herein. As non-limiting examples provided for illustration purposes, vehicle covers intended to be water-resistant, water-repellant, and/or water proof can be made from: various plastics, polymers, polypropylene, latex, natural rubber, any elastic hydrocarbon polymer, Gore-Tex, vinyl, a variety of types of plastic derived from ethylene and chlorine, polyethelene sheeting (HDPE), Low-density polyethylene (LDPF), polyurethane (PU) or Thermoplastic polyurethane (TPU) film, PU or hypalon coated nylon or polyester fabric (which or without stretch), Poly vinyl chloride (PVC) sheeting, polyethylene (PE), fluoropolymer fabrics (such as any textile coated with fluoropolymers), any fluorinated plastics, various block copolymers, surface modified polymers, textiles covered with polyurethane compositions, textiles treated with various hydrophobic components, hydrophilic resins, water-repellent fibrous sheets and/or textiles impregnated with a water-repellent material, and/or waterproof thermoplastic resin film layers firmly bonded to the surfaces of textiles. Materials can be laminated, layered, coated, and/or impregnated to make the materials water-resistant and/or waterproof, for example with a waterproof resinous material such as a melamine-formaldehyde resin or polyacrylic ester resin, or by laminating waterproof thermoplastic resin films. Vehicle covers intended to lessen and/or prevent hail damage can include: Kevlar and para-aramid synthetic fibers generally; other aramids such as Nomex and Technora; rigid plastics such as polyvinyl chloride, high-density polyethylene, and high-density polypropylene; common textile fibrous fabrics such as cotton and wool, and a variety of other materials. The materials can have an elastic modulus reaching, for example, about 1500 MPa to about 3,000 MPa and can have an elastic modulus as low as, for example, about 1.5 MPa to about 15 MPa. Any of the above materials can be used together in any combination, and materials of the vehicle covers are not limited to the examples provided herein. Additionally, a tensile strength of the material to be used can vary depending on the material used and the desired properties. For example, tensile strength can vary between approximately 1.0 MPa and approximately 75 MPA, or more preferably approximately 20 MPa to 55 MPa.

Covers configured to protect against hail can include various other materials, such as foams, plastics, etc. In one embodiment, the foam can be formed from a single polyolefin or copolymers thereof. Examples can include polyethylene, polypropylene, polybutylene, polybutylethylene, polycycloethylene, polyisobutene, polyisobutylethylene, polypropylethylene, and poly tert-butylethylene. The molecular weight of the polyolefin can be selected to yield selected mechanical properties. In certain embodiments, the polyolefin can possess one or more of the following material properties: elastic modulus from about 150 to about 1500 MPa, yield strength from about 2.5 to about 30 MPa, ultimate tensile strength from about 9 to about 45 MPa. In other embodiments, the foam can be formed from an ethylene-vinyl acetate co-polymer. The ethylene-vinyl acetate co-polymer can possess one or more of the following material properties: elastic modulus from about 11 to about 700 MPa, yield strength from about 2.5 to about 28 MPa, ultimate tensile strength from about 1.25 to about 51 MPa. In further embodiments, the foam can be formed from Sorbothane®. Sorbothane® can possess one or more of the following material properties: yield strength from about 0.11 to about 0.5 MPa and ultimate tensile strength from about 0.5 to about 1.1 MPa. In additional embodiments, the foam can be formed from D3O, a closed cell polyurethane foam composite with polyborodimethylsiloxane I(PBDMS) as a dilatant dispersed throughout the foam matrix, as described in U.S. Pat. No. 7,381,460, the entirety of which is incorporated by reference.

In various embodiments, a pre-folded cover is provided that can have an accordion fold, or a fold including pleats with each panel being about a same size and stacking on top of one another similar to pleats on the musical instrument known as the accordion. The pre-folded cover can be manufactured, packaged, and/or provided to an end-user in a folded state, thus being suitable for immediate deployment when first opened. The cover can be vacuum-packed in a folded state. The cover can also be enclosed in a variety of packaging, for example a plastic bag, a storage bag, a fabric bag, a molded foam and/or plastic case, a drawstring bag, a hard-sided case, etc. The cover can be intended for single-use or can be intended for multiple uses. A thickness of the cover can vary depending on the desired use of the cover. For example, a thinner cover can be used to repel water while a thicker cover can be used to repel water and/or prevent hail damage. The thickness of the material can also vary throughout a single cover. For example, the cover can comprise a thicker panel in a center and thinner panels on a front and a back of the cover, thus assisting in refolding the cover when the cover is intended for reuse.

In various embodiments, covering at least a bottom and at least part of each side of the vehicle includes fitting the front portion and the rear portion over the vehicle using elasticized rims extending along peripheral edges of the front and rear portions. Covering at least a bottom and at least part of each side of the vehicle can also include fastening the front and rear portions to one another using an engagement selected from a zipper or Velcro. When a zipper is employed, a tongue and/or extra material section can be added in various embodiments to prevent the zipper from scratching and/or otherwise damaging the vehicle. For another example, when the vehicle has been enveloped, the method can include reducing, slowing, and/or preventing the ingress of water into the vehicle. When the vehicle has been enveloped, the method can include preventing hail damage to the vehicle. When the vehicle has been enveloped, the method can also include sealing a right portion and a left portion of the waterproof vehicle or water resistant vehicle cover to each other over a top of the vehicle. Enveloping the vehicle with the vehicle cover can also include sealing a right portion and a left portion of the vehicle cover to each other along a side of the vehicle. In another example, covering at least a bottom and at least part of each side of the vehicle can include moving a right portion and a left portion of the vehicle cover along a right side and a left side of the vehicle and coupling the right portion and the left portion to the vehicle. In still another example, the right portion and the left portion of the vehicle cover can have elastic peripheral edges. In another embodiment, covering at least a bottom and at least part of each side of the vehicle can include attaching a covering piece to peripheral edges of the right portion and the left portion. The method can also further include covering an exhaust pipe of the vehicle with a removable exhaust pipe cover that is attached to the vehicle cover, thus preventing the exhaust pipe cover from being left on inadvertently when the vehicle cover is removed. In other embodiments, the method can also include covering a top of the vehicle with a second vehicle cover. In some examples, the method can also include coupling the vehicle cover and the second vehicle cover to one another. In other examples, the method can include overlapping the vehicle cover and the second vehicle cover with each other. In another embodiment, the second cover, which can be covered by the vehicle cover, can be made of a material that will prevent hail from damaging the vehicle and/or various parts of the vehicle, such as a roof, trunk, hood, doors, and windows of the vehicle. In another example, the vehicle cover and/or envelope can have built-in rings and/or attachment points to secure the enveloped vehicle to a post or other stationary structure to prevent, in cases of severe flooding, the enveloped vehicle from floating away from its original location where the vehicle cover was deployed.

In another aspect, a covering for a vehicle can be provided with a waterproof, which serves to prevent any passage of water, and/or water resistant, which reduces passage of water, upper cover including a top panel dimensioned to cover at least a top of the vehicle and at least two side panels extending from the top panel on opposite sides of the top panel and dimensioned to cover at least a portion of two sides of the vehicle. The upper cover also includes a front panel extending from the top panel and dimensioned to cover at least a front hood of the vehicle and a back panel extending from the top panel opposite to the front panel and being dimensioned to cover at least a trunk of the vehicle. In vehicles such as a bus, truck, pick-up truck, and/or tractor, which may not have a formal trunk, the vehicle cover can cover the rear portion of the vehicle. The covering also includes a waterproof and/or water resistant lower cover including a base panel dimensioned to cover at least a bottom of the vehicle and a plurality of side portions that extend from the base panel. At least one upper fastener is coupled to peripheral edges of the at least two side panels, the front panel, and the back panel, and a lower fastener is coupled to peripheral edges of the plurality of side portions and is complementary to the upper fastener such that the upper and lower fasteners form a water-tight, which prevents any water from passing there between, or water resistant, which reduces passage of water there between, seal when the upper and lower fasteners engage each other.

The covering can vary in numerous ways. For example, the top panel, the at least two side panels, the front panel, and the back panel can be integral with one another and the base panel and the plurality of side portions are integral with one another. In another example, the front panel can have a transparent portion. At least one of the side panels can have a transparent portion. In some embodiments, the upper fastener and the lower fastener can include a zipper. In other examples, the upper fastener and the lower fastener can include Velcro. The at least two side panels can extend to approximately a door handle on each side of the vehicle. In various embodiments, the at least two side panels can extend to approximately a bottom of a frame of the vehicle. In another example, the waterproof upper cover and the waterproof lower cover can be made of a material selected from a flexible polymer, a cloth, or plastic. In one example, the upper cover and the lower cover can be configured to prevent hail damage by increasing thickness of the covers and/or by incorporating additional padding into the covers and/or by making the covers out of a rigid material designed to absorb and/or deflect a force of impact of the hail. As another example, a driver's side panel of the at least two side panels can be positioned on a driver's side of the vehicle and is dimensioned to allow a driver's side door of the vehicle to open when the driver's side panel is in place. In another embodiment, the covering can include a removable exhaust pipe cover.

In another aspect, a vehicle cover is provided with a base and at least two side portions extending from the base opposite each other. The cover also has at least one fastener extending along a periphery of each side portion, and the fasteners are complementary to each other and configured to form a water-tight seal when engaged with each other.

The vehicle cover can be varied in numerous ways. For example, the vehicle cover can also include a sleeve extending distally from the base and sized to envelop a hood of a vehicle. As another example, the sleeve can be integral with the at least two side portions. In another example, the fasteners can include a zipper. In other embodiments, the fasteners can include Velcro. The vehicle cover can also be made of a material selected from a flexible, waterproof polymer, a waterproof cloth, water resistant cloth, or a plastic. In some embodiments, the vehicle cover can be configured to prevent hail damage. The vehicle cover can also be water resistant. In one example, the vehicle cover can be waterproof. The vehicle cover can also include a removable exhaust pipe cover. In another example, the base can be configured to cover a bottom of a vehicle and the side portions are configured to envelop the vehicle.

In another aspect, a cover for a vehicle is provided that includes a base, a plurality of side portions extending from the base, and at least one closure extending along a periphery of each side portion. The closures are configured to couple to the vehicle.

The cover can have numerous variations. For example, the cover can also include a sleeve extending distally from the base and sized to envelop a hood of the vehicle. The sleeve can be integral with the at least two side portions. In other examples, the closures can include tape. In one embodiment, the closures can include elastic material. The plurality of side portions can be dimensioned to extend to windows of the vehicle. In some examples, the cover can be made of a flexible, waterproof polymer. The cover can further include a covering piece sealably attachable to the at least one closure of the plurality of side portions.

BRIEF DESCRIPTION OF DRAWINGS

The embodiments described above will be more fully understood from the following detailed description taken in conjunction with the accompanying drawings. The drawings are not intended to be drawn to scale. For purposes of clarity, not every component may be labeled in every drawing. In the drawings.

Figure 1:
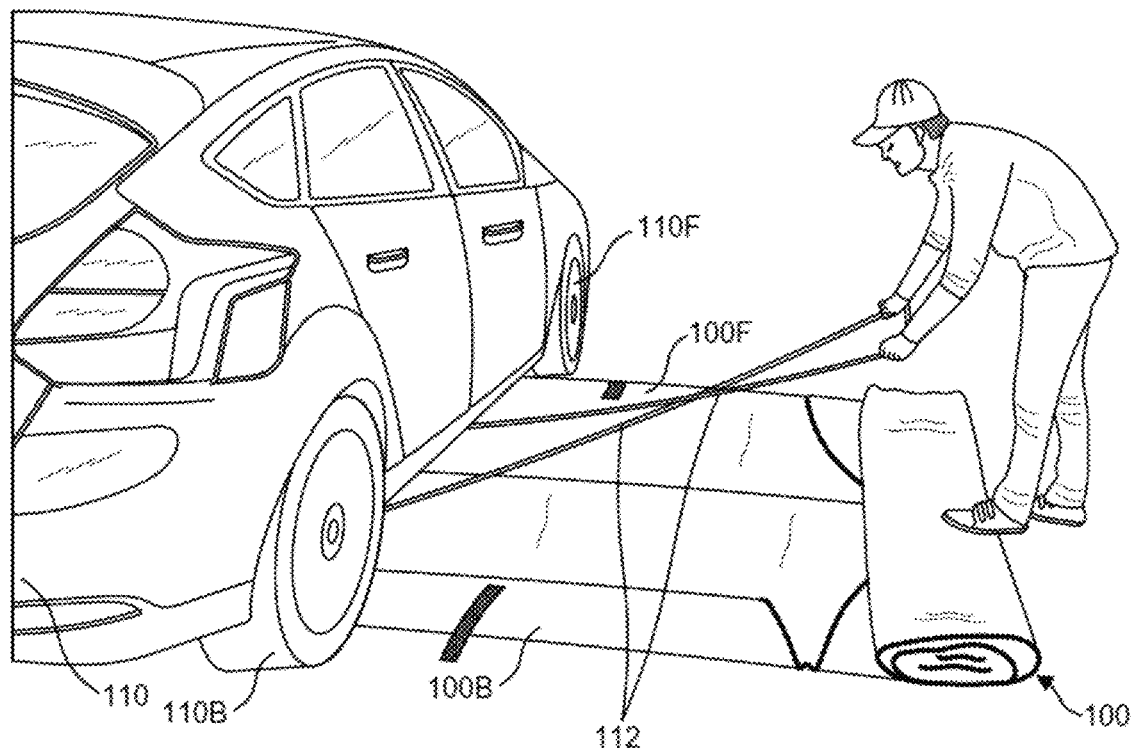
FIG. 1 is a perspective view of one embodiment of a vehicle cover partially underneath an exemplary vehicle.

The patent or application file contains at least one drawing executed in color. Copies of this patent or patent application publication with color drawing(s) will be provided by the Office upon request and payment of the necessary fee.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Sizes and shapes of the systems and devices, and the components thereof, can depend at least on the anatomy of the subject in which the systems and devices will be used, the size and shape of components with which the systems and devices will be used, and the methods and procedures in which the systems and devices will be used.

Devices, systems, and methods for using a vehicle cover are provided. In general, a vehicle cover and/or a vehicle envelope can be provided that is capable of extending between front and rear tires of a vehicle. The vehicle can be driven forwards so that the rear wheels of the vehicle rest on top of the cover. A rear portion of the vehicle cover can be extended behind the vehicle. The vehicle can then be reversed so that the front wheels of the vehicle are on top of the vehicle cover while the rear wheels remain on top of the cover. A front portion of the cover can be extended in front of the vehicle. At this point the vehicle cover has entirely covered the bottom of the vehicle, and all wheels of the vehicle are resting on the cover. The vehicle cover can also be extended over the vehicle to entirely enclose the vehicle. As opposed to other methods of covering a vehicle, the bottom of the vehicle herein can thus be covered through very minimal movement of the vehicle. For example, a vehicle could require only several inches or a few feet of clearance in front and behind the vehicle to successfully maneuver the vehicle onto the vehicle cover so that the bottom of the vehicle is entirely covered. The vehicle cover can also be applied to the vehicle by one person, eliminating difficulty in protecting the bottom of the vehicle. The vehicle cover can also be rapidly applied to the vehicle because of the ease-of-use and single-user operation, thus eliminating time, stress, and requirement for excessive space when attempting to cover a bottom of a vehicle. A parked vehicle, including a parked vehicle on a curb and/or in a parking space, can be covered with only several inches or a few feet of space requirement between the vehicle to be covered and other vehicles and/or objects that may be in front of and/or in back of the vehicle to be covered. Once the bottom of the vehicle has been covered and the wheels of the vehicle are resting on the cover, the cover can be brought up along sides of the vehicle to enclose at least a lower portion of the vehicle. In some embodiments, a top portion of the vehicle cover can be unfolded next to the vehicle and can be maneuvered over the vehicle. The cover over the top of the vehicle and the cover underneath the vehicle can then be sealed together along peripheral edges thereof to create a water resistant or a water proof enclosure for the vehicle. However, a variety of other approaches can be taken to either enclose part of or all of the vehicle. Because of the ease-of-use, rapid application, and minimal free space required to enclose at least a bottom portion of a vehicle using the approach described herein, vehicles can be easily protected from natural disasters, such as floods or hail. For example, during a flood the cover can keep out at least enough water to prevent the vehicle from being damaged to the point that the vehicle is not worth repairing and must be completely abandoned or sold as scrap. The amount of water kept out in different examples can vary depending on the specific embodiment, for example varying between keeping out water entirely and keeping out just enough water to protect the vehicle from requiring any water damage repairs after flooding has retreated. The cover can also serve to slow or reduce the ingress of water into a vehicle rather than stopping ingress entirely. While a variety of storm conditions are discussed herein, embodiments of the vehicle cover can also be used to keep out moisture, mildew, dirt, dust, and everyday debris.

Figure 2:
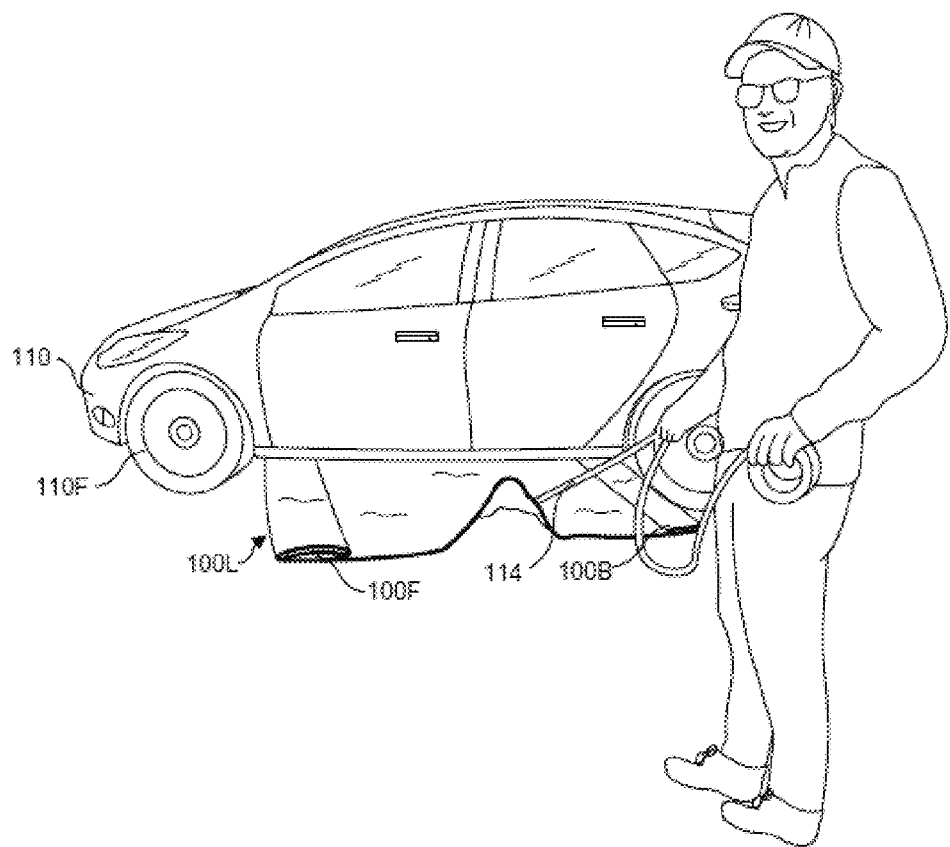
FIG. 2 is a perspective view of the vehicle and cover of FIG. 1 with the cover partially underneath the vehicle.
Figure 3:
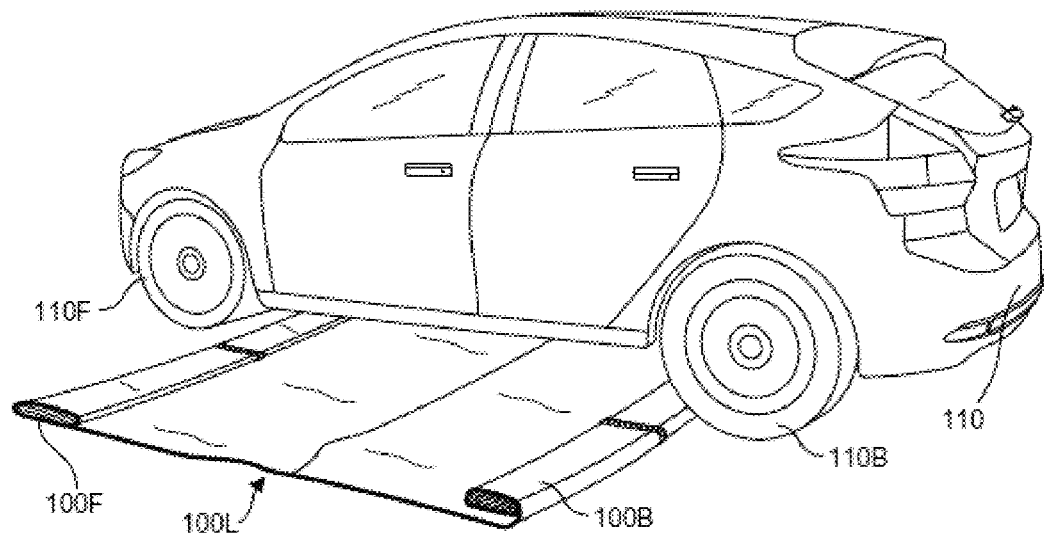
FIG. 3 is a perspective view of the vehicle and cover of FIG. 2 with the cover extending underneath the vehicle and between wheels of the vehicle.
Figure 6:
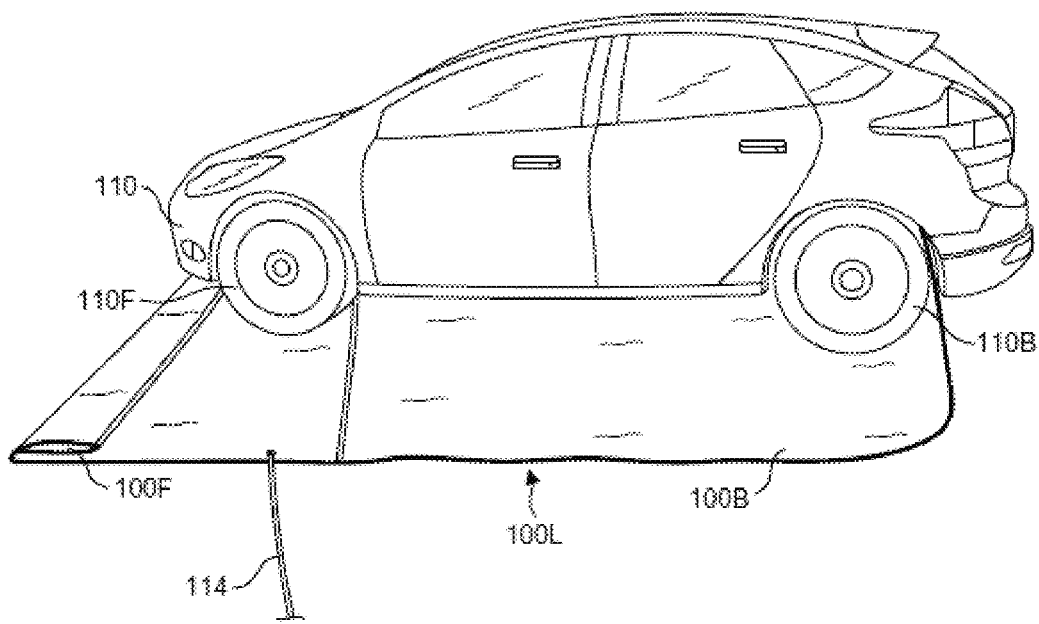
FIG. 6 is a perspective view of the vehicle and cover of FIG. 5 with the vehicle driven backwards so that front wheels of the vehicle are on top of the cover.
Figure 7:
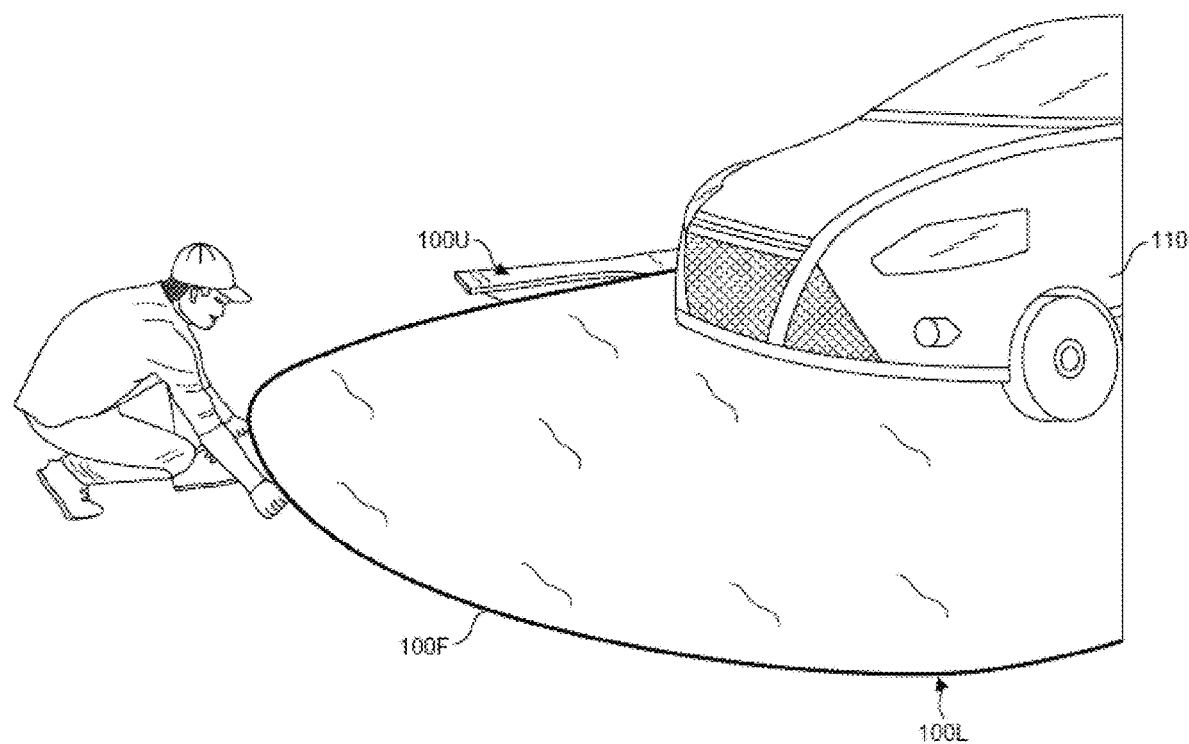
FIG. 7 is a perspective view of the vehicle and cover of FIG. 6 with a front of the cover extended in front of the vehicle.
Figure 8:
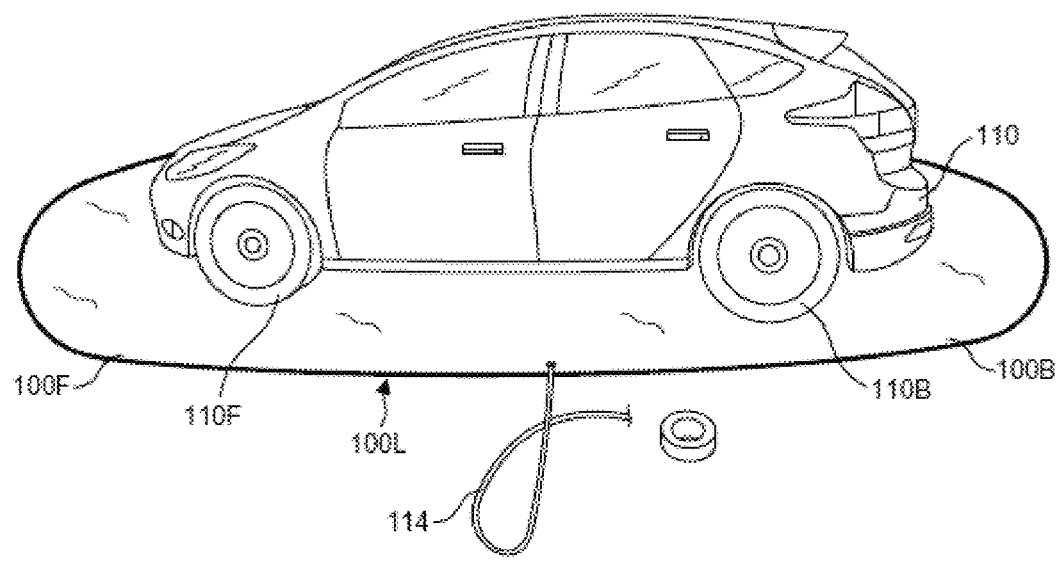
FIG. 8 is a perspective view of the vehicle and cover of FIG. 7 with the vehicle sitting entirely on top of the cover.
Figure 9:
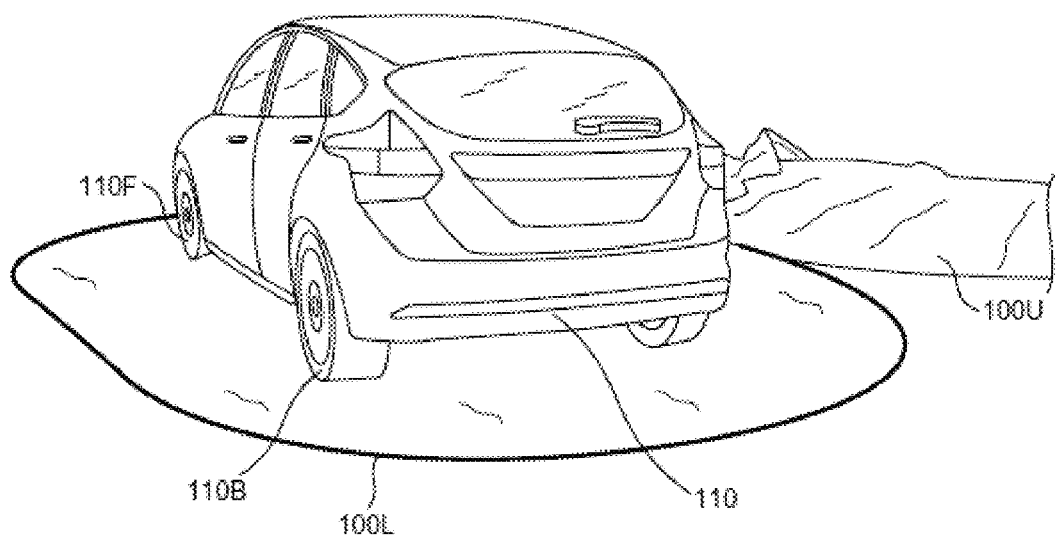
FIG. 9 is another perspective view of the vehicle and cover of FIG. 8 with the vehicle sitting entirely on top of the cover.
Figure 10:
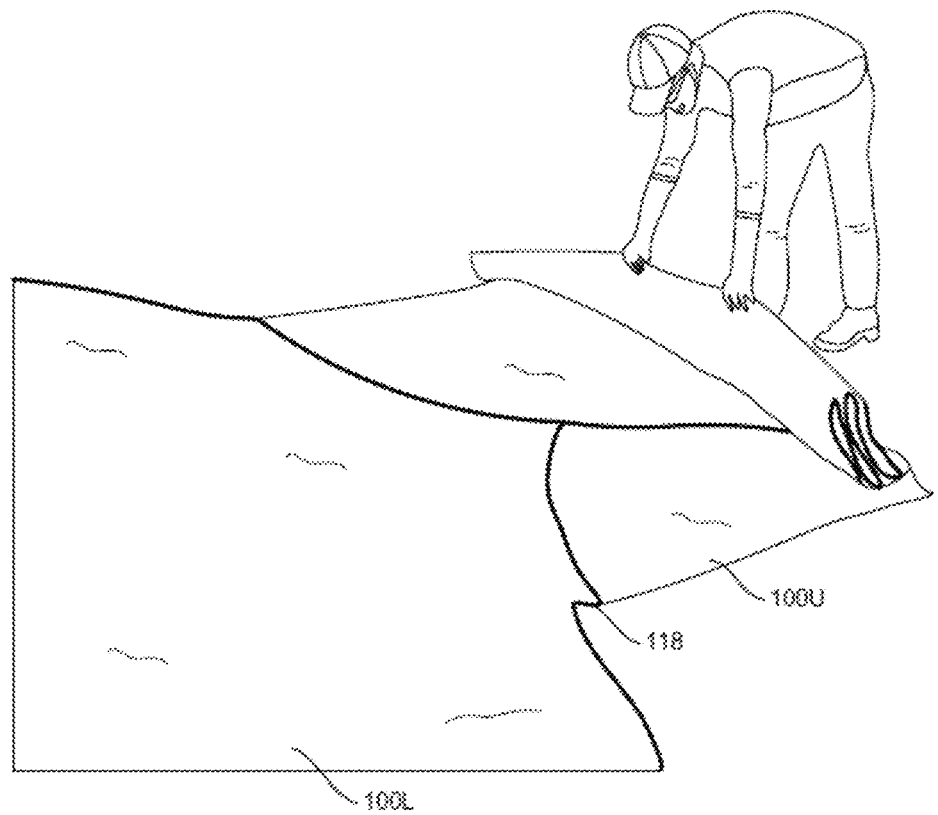
FIG. 10 is a perspective view of one side of a top portion of the cover of FIG. 9 being unfolded.

FIGS. 1-17 illustrate an embodiment of a vehicle cover 100 that is configured to enclose at least a bottom portion of a vehicle 110. The vehicle cover 100 can have a lower portion 100L and an upper portion 100u. The vehicle cover 100 can be pre-folded. For example, as illustrated in FIG. 1, the cover 100 can be pre-folded in an accordion-style fold, for example folded into pleats resembling the bellows of an accordion. However, a variety of different folds and orientations can be used, such as placing the cover 100 in a roll or opposing rolls on each side, in a cylindrical shape, in a bag, folding the cover in triangular or square sections, lose, rolled in flat sections, etc. The cover also does not have to be pre-folded at all. The lower portion 100L of the cover 100 has a front 100f of the cover 100 folded and a back 100b of the cover 100 folded. The cover 100 can be additionally folded, as illustrated in FIG. 1, to accommodate a smaller storage space within a vehicle. The cover 100 is placed on the ground, and the lower portion 100L is extended between front wheels 110f and back wheels 110b of the vehicle 110, as illustrated in FIGS. 1-3, while the upper portion 100u is folded to the side of the vehicle 110, as illustrated in FIGS. 7, 9, and 10.

The lower portion 100L of the cover 100 can be extended between the front wheels 110f and back wheels 110b of the vehicle 110 through a variety of means. For example, as illustrated in FIG. 1, one or more pushing members such as one or more rods 112 can be used to slide the lower portion 100L of the cover 100 between the wheels for the sake of convenience. The pushing members can have a variety of configurations as long as the pushing members are configured to push the cover 100. For example, the rods 112 can be telescoping, as illustrated in FIG. 1, or can be fixed, expandable, collapsible, or a variety of other configurations as long as. The rods 112 can be coupled to the lower portion 100L of the cover 100 on a side opposite a user so that the user can push the rods 112 and the cover 100 through a variety of means. For example, one or more engagement points, such as small web based pockets, can be formed on the cover 100 to allow the cover 100 to be pushed by the rods. The rods 112 can also be permanently fixed to the cover 100. As another example illustrated in FIG. 2, one or more pulling members such as a rope 114 can be used to slide the lower portion 100L of the cover 100 between the wheels. The pulling member can have a variety of configurations as long as the pulling member is configured to pull the cover 100, for instance rope, string, fibers, cloth, rods, twine, paracord, webbing, straps, cable, etc. The pulling member can be attached to or part of a cylindrical device, such as a cylinder or ball, that can be rolled under the vehicle 110. The rope 114 can be coupled to the lower portion 100L of the cover 100 on the same side as a user so that the user can pull the cover 100. Pushing means and pulling means can be used separate on covers or together on covers. Holding containers, pouches, pockets, etc. can be formed on the cover to secure the pushing means and/or pulling means until they are used. Additionally, the pulling means and/or pushing means can be excluded entirely. The lower portion 100L of the cover 100 can be pulled, pushed, or rolled under the cover on its own or by making at least a part of the lower portion 100L of the cover 100 stiff enough to be pushed and/or pulled under a vehicle as is. Rods, ropes, etc. are thus not required on the cover 100 to extend the cover 100 under the vehicle 110.

Figure 4:
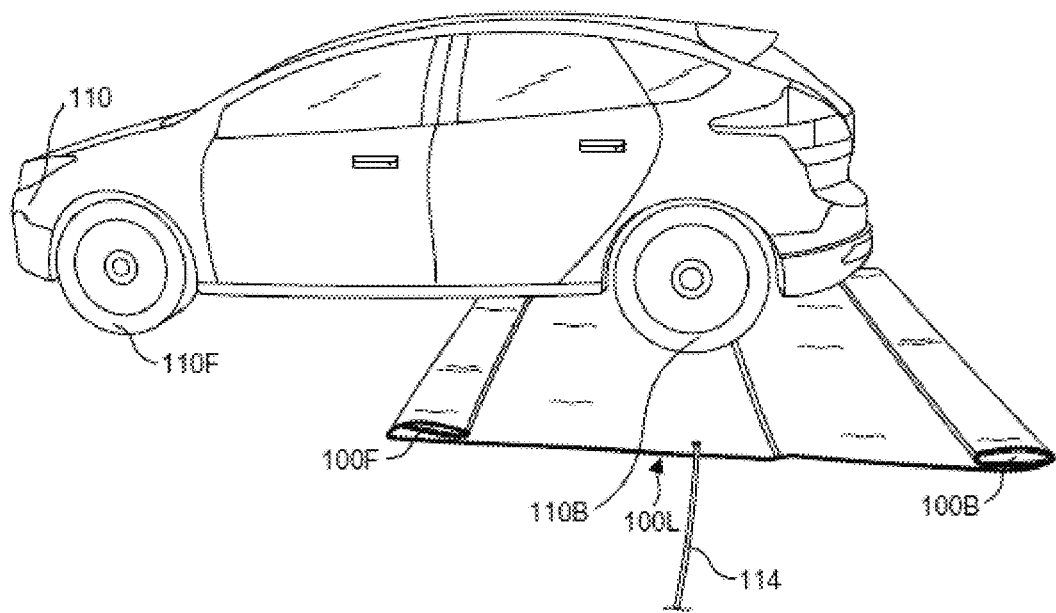
FIG. 4 is a perspective view of the vehicle and cover of FIG. 3 with the vehicle driven forwards so that rear wheels of the vehicle are on top of the cover.
Figure 5:
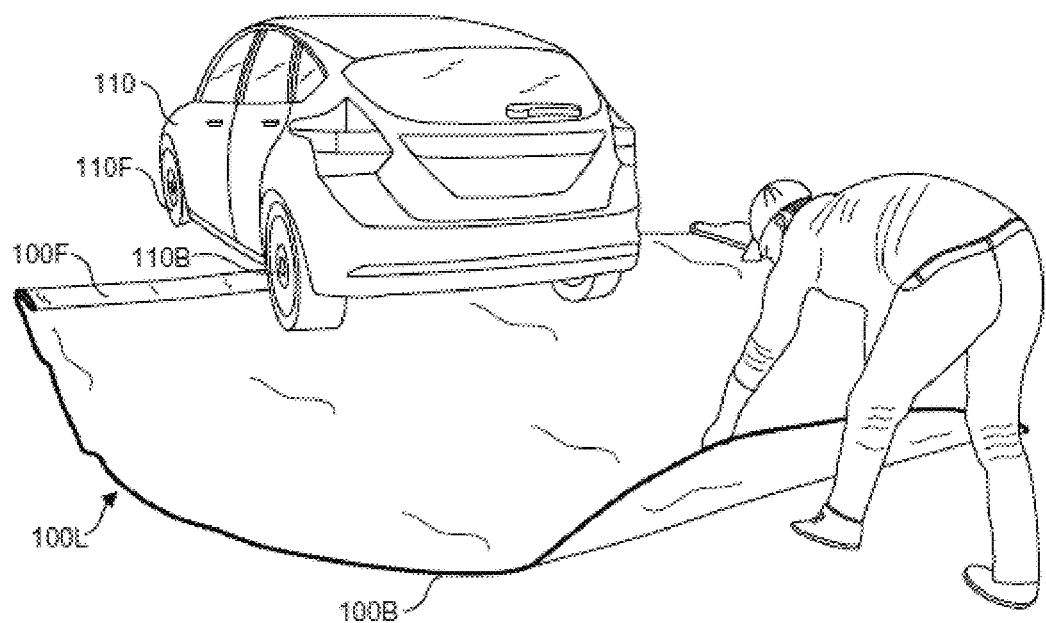
FIG. 5 is a perspective view of the vehicle and cover of FIG. 4 with a rear of the cover extended behind the vehicle.
Figure 11:
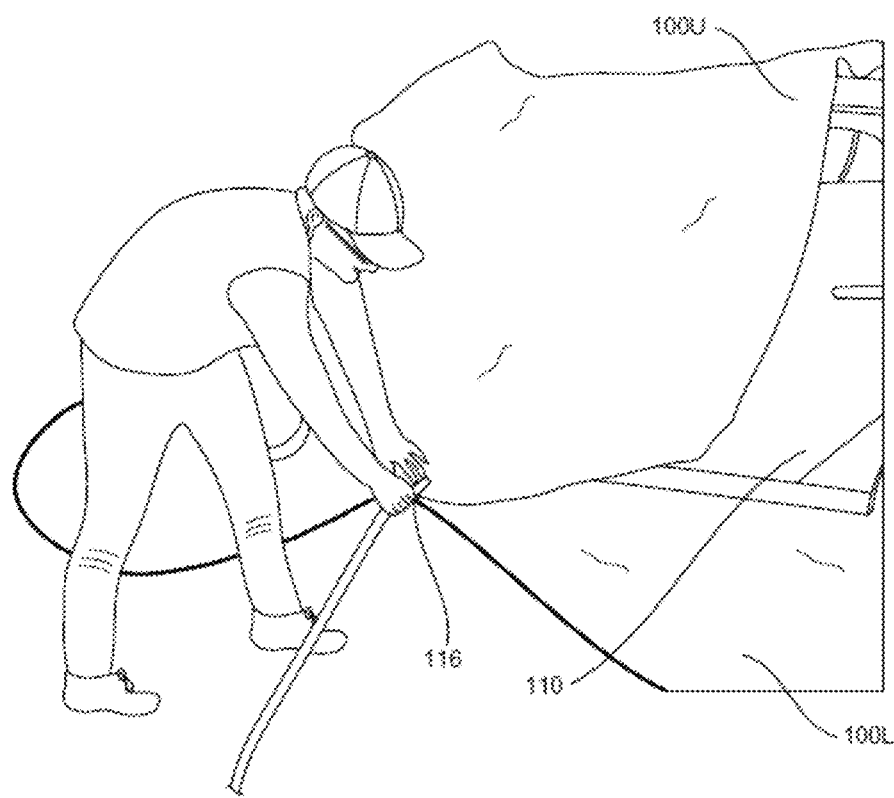
FIG. 11 is a perspective view of the vehicle and cover of FIG. 10 with the top portion of the cover being pulled over the vehicle and the top and bottom portions of the cover being engaged.
Figure 12:
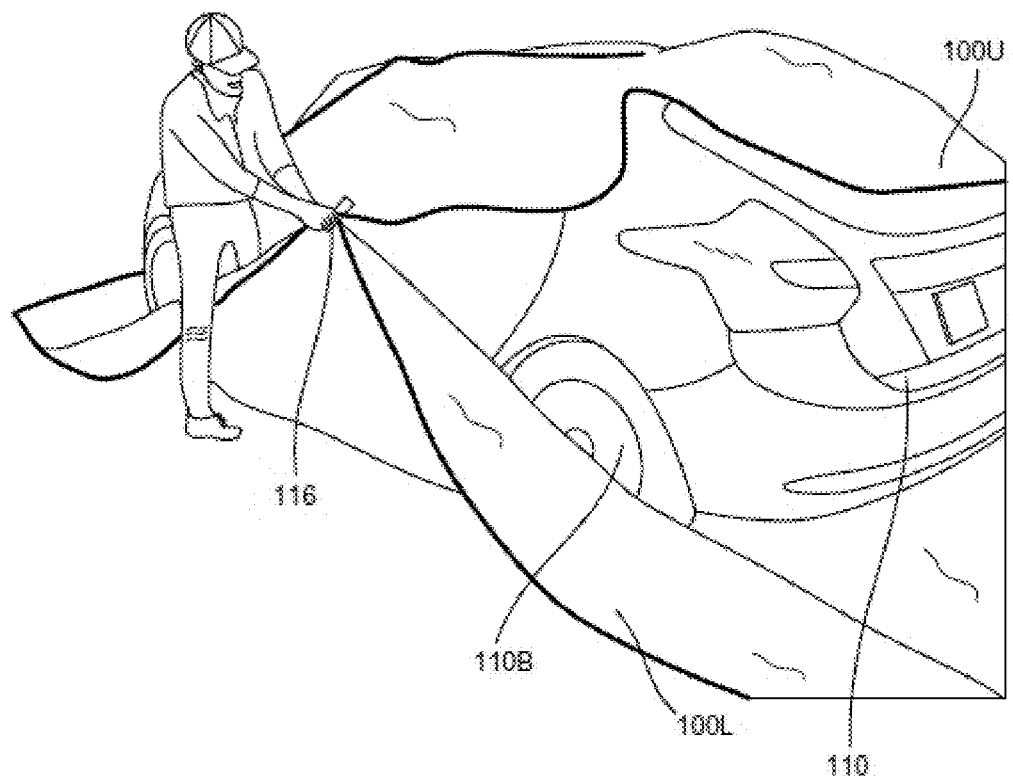
FIG. 12 is another perspective view of the vehicle and cover of FIG. 11 with the top portion of the cover being pulled over the vehicle.
Figure 13:
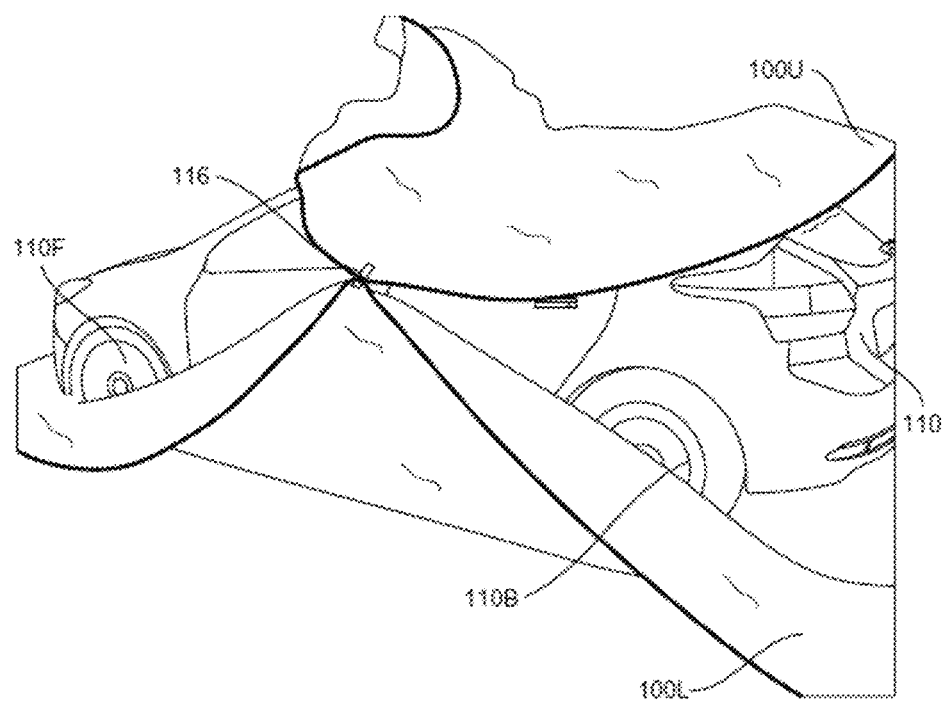
FIG. 13 is another perspective view of the vehicle and cover of FIG. 12 with the top portion of the cover being pulled over the vehicle.
Figure 14:
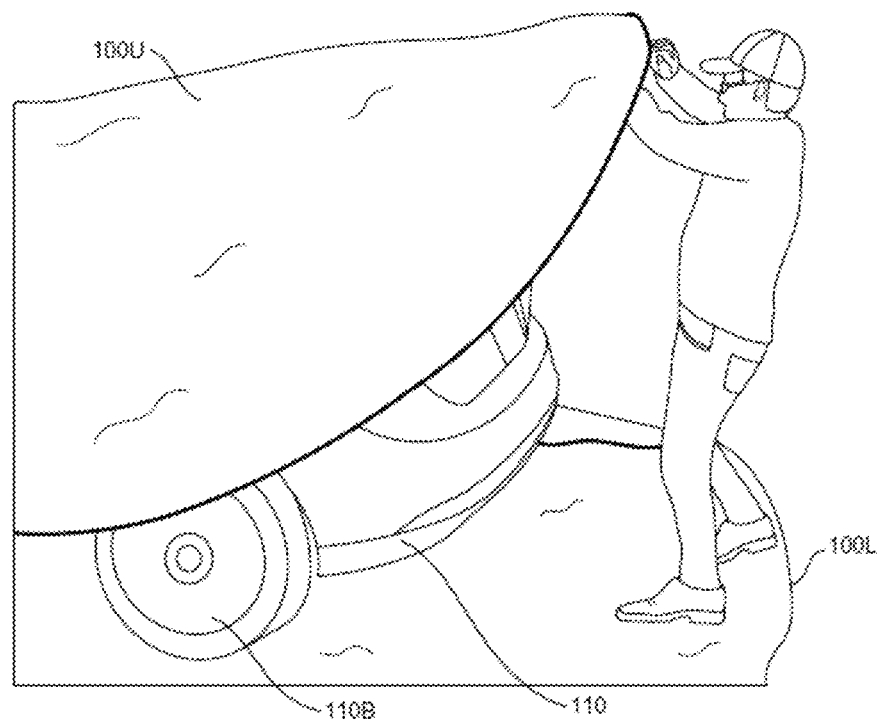
FIG. 14 is another perspective view of the vehicle and cover of FIG. 13 with the top portion of the cover being pulled over the vehicle.
Figure 15:
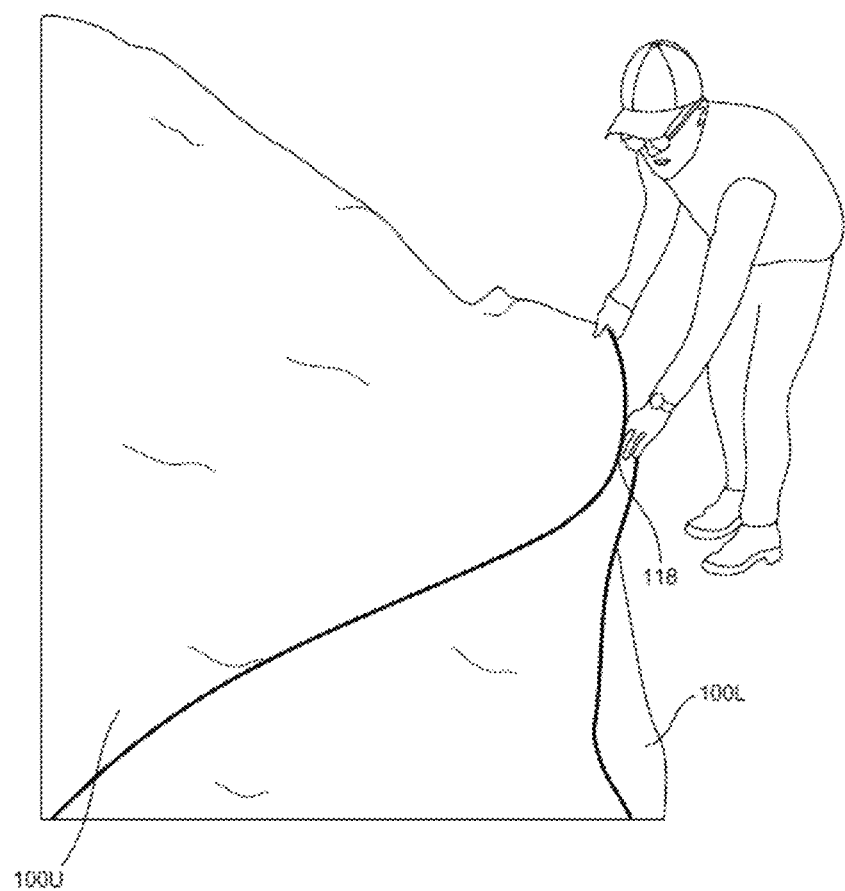
FIG. 15 is a perspective view of the vehicle and cover of FIG. 14 with the top portion of the cover being engaged and sealed with the bottom portion of the cover.

The vehicle 110 is then driven forward so that the back wheels 110b rest on top of the lower portion 100L of the cover 100 between the folds of the front 100f and the back 100b, as illustrated in FIG. 4. The back 100b of the cover 100 is then extended behind the vehicle 110, shown in FIG. 5. Peripheral edges of each of the back 100b and the front 100f can be curved, as illustrated in FIG. 5. Peripheral edges can also be squared, trimmed (for example by cutting the corners off an otherwise square shape), curved at a variety of different angles such as being radiused at approximately 2 feet to approximately 10 feet, and more preferably approximately 4 to 6 feet, etc. The edges can have a soft bevel. Having a smooth curve can allow sealing mechanisms such as zippers to more smoothly close the cover, while having square corners or straight lines can allow for easier manufacturing. The curve on each of the back 100b and the front 100f can be configured to minimize excess material of the cover 100 to more closely match a shape of a vehicle. The corners of the cover 100 can also be tucked or folded into pockets or pouches or simply folded in to contain any excess material, such as a fold or a hospital corner of a bedsheet. In various embodiments, one or more grips, pull tabs, handles, etc. can be attached to the back 100b of the cover 100. The vehicle 110 is then driven backward so that the front wheels 110f rest on top of the lower portion 100L of the cover 100 behind the fold of the front 100f of the cover 100, as shown in FIG. 6. The front 100f of the cover 100 is then pulled to extend the cover 100 in front of the vehicle 110, as illustrated in FIG. 7. As with the back 100b, peripheral edges of the front 100f can be curved, as illustrated in FIG. 7. The front 100f can also be squared, trimmed (for example by cutting the corners off an otherwise square shape), curved at a variety of different angles, etc. The curve on the front 100f can be configured to minimize excess material of the cover 100 to more closely match a shape of a vehicle. In various embodiments, one or more grips, pull tabs, handles, etc. can be attached to the front 100f of the cover 100. Optionally, the vehicle 110 can be repositioned on the lower portion 100L to ensure proper alignment on the lower portion 100L. However, this step is not required if the vehicle 110 is correctly aligned. At this point, a bottom of the vehicle 110 is entirely on the lower portion 100L of the cover 100, as illustrated in FIGS. 8 and 9, with minimal movement by the vehicle 110 or a user. The upper portion 100u can be pre-folded in a variety of ways, such as in an accordion fold, a triangular fold, or by being rolled, similar to the lower portion 100L. Once the bottom of the vehicle 110 is positioned on the lower portion 100L of the cover 100, the upper portion 100u is unfolded, as illustrated in FIG. 10. The upper portion 100u can be pulled over the vehicle 110 to engage the lower portion 100L. As illustrated in FIGS. 11-13, the upper portion 100u and the lower portion 100L can be engaged at one or more initial points 116 through a variety of means, such as Velcro, hooks, buttons, snaps, web attachments, etc., to assist a user to enclose the vehicle 110. The upper portion 100u can then be completely positioned on a top of the vehicle, as illustrated in FIG. 14, and a user can close the cover 100 around the vehicle 110. The cover 100 can be closed by engaging peripheral edges of the upper portion 100u and the lower portion 100L through a variety of closure means. For example, as illustrated in FIG. 15, a zipper 118 can be integrated with peripheral edges of the upper and lower portions 100u, 100L, and a user can close the cover 100 by zipping the two portions 100u, 100L together to create a barrier between the vehicle 110 and the outside world. The zipper can be integrally bound and permanently engaged with itself at a region where the upper and lower portions 100u, 100L couple to one another (as best seen in FIG. 10), so that a user is not forced to align male and female halves of a zipper to close the zipper. Additionally, more than one zipper can be used, for example having a zipper on each side of the region where the upper and lower portions 100u, 100L couple to one another. At the region where the upper and lower portions 100u, 100L couple to one another, there can be a folded hinge that can be configured to attach the lower portion 100L to the upper portion 100u, and on each side of the hinge, a zipper can be positioned that is already engaged for zipping closed of the cover 100. While a zipper is shown herein, a number of different engagement mechanisms can be used to engage the upper and lower portions 100u, 100L, such as Velcro, elastic bands, adhesives, ropes, tethers, hooks, snaps, buttons, tape, webbing straps, magnets, etc.

Figure 16:
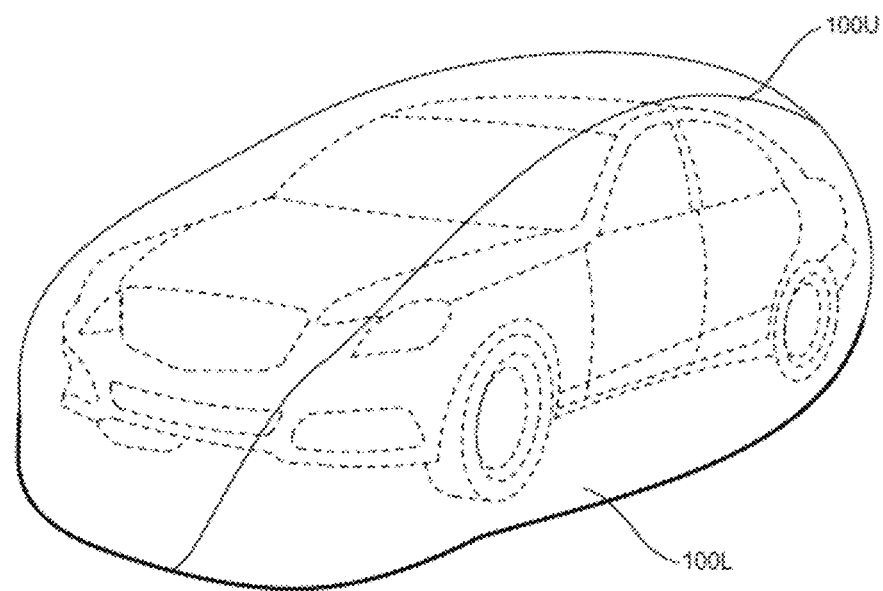
FIG. 16 is a perspective view of the vehicle and cover of FIG. 15 with the cover completely sealed around the vehicle.
Figure 17:
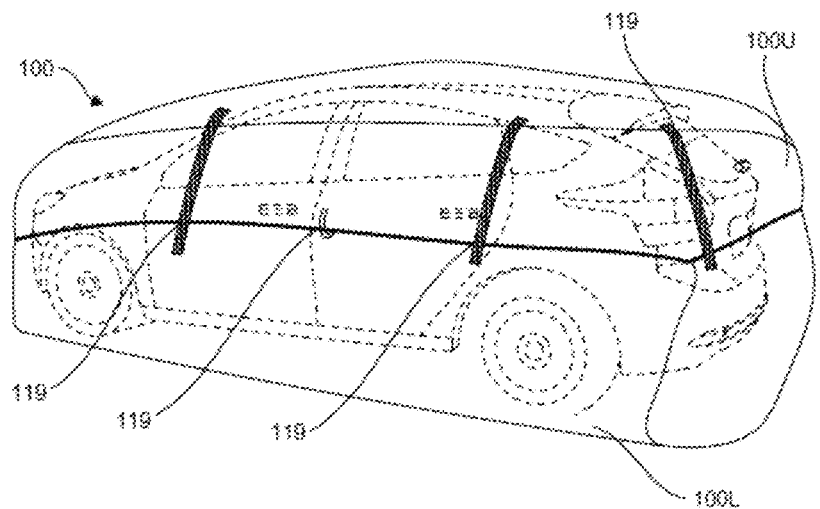
FIG. 17 is a perspective view of the vehicle and cover of FIG. 16 with excess material of the cover coupled to the cover.

Once the zipper 118 has been used to engage the upper and lower portions 100u, 100L of the cover 100, the vehicle 110 will be enveloped by the cover 100 and surrounded by an at least water resistant barrier, as illustrated in FIG. 16. Additionally in some instances, excess material of the cover 100 can be drawn up or bound against the cover through a variety of means, such as a plurality of restraining means 119 attached to the lower portion 100L, as illustrated in FIG. 17, to remove excess material and allow for a snug, efficient fit of the cover 100 to take up less space and provide a greater enclosure against the elements. The plurality of restraining means 119 are adhesive straps, but the excess material can be held against the cover 100 through a variety of means, such as zippers, Velcro, webbing, elastic bands, adhesives, ropes, tethers, hooks, snaps, buttons, tape, webbing straps, magnets, a self-tightening pull on a spring loaded friction clamp, etc. The restraining means 119 can be color-coded so a user can easily identify which restraining means 119 on the lower portion 100L should be attached to which restraining means 119 on the upper portion 100u. Additionally, the upper portion 100u can have excess material to enable covering of roof antennae for radio, telephone, satellite, internet, etc. The cover 100 is configured to be re-folded for repeated use, but other embodiments can be designed to be single-use, for example being made from thin material designed for single-use or using adhesives that cannot be removed.

While the cover 100 entirely encloses the vehicle 110 in this embodiment, other variations are possible in which sides of a cover are brought together and sealed, joined, and/or coupled to each other to enclose at least a bottom of a vehicle without entirely enveloping the vehicle. Once the bottom of the vehicle is enclosed by the cover, the cover can extend to a variety of locations along the sides or the top of the vehicle. For example, the cover can extend to the wheels, the bottoms of the doors, the bottoms of the windows, the tops of the windows, the tops of the doors, the top of the cab, or entirely over the vehicle. The cover can thus form a barrier between at least the bottom portion of the vehicle and the outside world, limiting or preventing entirely ingress of water into the vehicle through at least the bottom and at least the lower sides of the vehicle. The vehicle cover can also include a removable, separate or integrated exhaust pipe cover.

The vehicle cover 100 can be formed of a single piece of material or can be formed from combining a plurality of pieces of material together, for example by joining, sewing, gluing, or otherwise coupling panels to one another. For instance, the lower portion 100L and the upper portion 100u can be made from one, integral piece of material or from two separate pieces of material coupled together. Additionally each of the lower portion 100L and the upper portion 100u can each individually be made from one, integral piece of material or from two separate pieces of material coupled together. In another example, the lower portion 100L of the cover 100 can consist of three panels representing a front panel, a middle panel, and a back panel. Each of the plurality of pieces of material forming the cover can be made from the same material or different materials. For example, the upper and lower portions 100u, 100L can be the same material or different material and the front panel, middle panel, and back panel can be the same material or different material. In some embodiments, the upper portion 100u can be made from one material and/or one thickness and the lower portion 100L can be made from another material and/or another thickness. For instance, the upper portion 100u could be made from PE, PU, or PVC and be between approximately 4 mm and approximately 5 mm thick while the lower portion 100L can be made from the same material or different material, such as PU-coated fabric, and can be thicker, such as between approximately 7 mm and approximately 10 mm thick. This variation of material and thickness can allow for a tougher, stronger lower portion that can withstand being driven on, dragged, pulled, pushed, etc. while reducing the stiffness and/or weight of the upper portion so that it is easier to maneuver over a vehicle.

The cover 100 can be made from a variety of materials, such as the materials discussed above including various plastics, polymers, polypropylene, latex, natural rubber, any elastic hydrocarbon polymer, Gore-Tex, vinyl, a variety of types of plastic derived from ethylene and chlorine, fluoropolymer fabrics (such as any textile coated with fluoropolymers), any fluorinated plastics, various block copolymers, surface modified polymers, textiles covered with polyurethane compositions, textiles treated with various hydrophobic components, hydrophilic resins, water-repellent fibrous sheets and/or textiles impregnated with a water-repellent material, waterproof thermoplastic resin film layers firmly bonded to the surfaces of textiles, Kevlar and para-aramid synthetic fibers generally, other aramids such as Nomex and Technora, rigid plastics such as polyvinyl chloride, high-density polyethylene, and high-density polypropylene, common textile fibrous fabrics such as cotton and wool, various natural and/or synthetic foams, and a variety of other materials. The cover 100 can be made from a single material or a variety of materials. Different portions of the cover 100 can be formed from different materials, and the materials can have a variety of thicknesses and tensile properties depending on the desired results. For example, the lower portion 100L can be thicker or denser than the upper portion 100u. For example, the upper and lower cover can each have a same thickness or a different thickness of between approximately 3 mm and approximately 20 mm, and more preferably between approximately 5 mm and approximately 15 mm, and more preferably between approximately 5 mm and approximately 10 mm. The cover 100 can be configured to prevent and/or reduce hail damage to the vehicle when the cover at least partially encloses the vehicle, for example by being made of a thick and/or padded material designed to resist and/or absorb impact (discussed in more detail below). The cover 100 can have one or more layers, for example having an outer layer of one material and an inner layer of another material. Layers can be stacked like a sandwich or fully enclosing one another.

The cover 100 is configured to be compressible into small dimensions such that the cover 100 can be easily stored in a vehicle and used during an emergency situation, such as a flood. For example, the cover can be designed to be stored in an emergency compartment of a vehicle, such as where a spare tire and/or a jack are stored. The cover can be collapsible to various sizes, such as 4 feet by 4 feet by 2 feet, 2 feet by 2 feet by 1 foot, 9 inches by 14 inches by 22 inches, 18 inches by 18 inches by 8 inches, 12.3 inches by 11.1 inches by 9.6 inches, 10 inches by 10 inches by 5 inches, and/or 5 inches by 5 inches by 3 inches. However, a deployed size of the cover and a collapsed size of the cover will vary depending on the vehicle to be covered. The size of the cover will vary depending on a wheelbase and/or a height of the vehicle to be covered. For example, the cover can be sized so as to eliminate excess material and/or excess space within the cover to ensure a snug fit on the vehicle when the vehicle is covered. Eliminating excess material and/or space within a cover can both decrease an expense of the cover and ensure a more secure, more protective fit of the cover. Depending upon the specific dimensions of the wheelbase, folds of the rear fold and the front fold can be variable between vehicles. In one embodiment, both the rear fold and the front fold preferably can be as close to the front of the rear wheels and back of the front wheels as practical. A variety of collapsed sizes and shapes are possible. For example, the cover can be sized, shaped, and dimensioned to be stored in a vehicle until used, for instance in a trunk, in an emergency compartment with other emergency vehicle supplies such as a vehicle jack, and/or with a spare tire. The cover 100 can be vacuum-packed or otherwise sealed during normal storage and only opened in an emergency. Thus the cover can be compacted to a fraction of its expanded size. The cover 100 can also be configured for single-use or for repackaging and reuse.

While the zipper 118 is illustrated, the cover 100 can have a variety of closures, fasteners, and/or engagements attached thereto. For example, the cover 100 can have elasticized peripheral edges such that, as the cover 100 is brought up the sides of the vehicle 110, the cover fits closely to the sides of the vehicle 110 and holds itself in place. The cover can additionally or instead have Velcro, zippers, hooks, clasps, magnets, buttons, tape, bungee/shock cords, and/or a variety of other closure along the peripheral edges of the cover. When various fasteners are employed in different embodiments, such as zippers, hooks, and/or clasps that may scratch, dent, or otherwise damage a vehicle, extra material in the cover can be provided to serve as a barrier or cushion between the fastener and the vehicle to ensure limited or no damage is done to the vehicle. For example, a tongue of extra material can be provided when using a zipper to prevent the zipper from scratching the vehicle. The closures can either attach to one another or attach to the vehicle. The closures can also form watertight or water resistant seals with each other. Additionally, a lip of excess material can be provided around peripheral edges of either the upper portion 100u or the lower portion 100L or both configured to reduce or eliminate ingress of water around the fasteners, such as the zipper 118. There can also be beveled out portions of the cover 100, for example around the peripheral edges of either the upper portion 100u or the lower portion 100L, to enable more snug fittings of the cover 100 once it is fully deployed.

Figure 18:
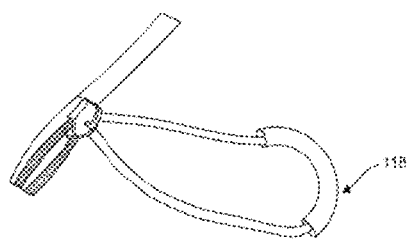
FIG. 18 is a perspective view of one embodiment of a zipper pull.

A variety of pull tabs can be attached to the cover 100 and made of a variety of materials, such as bungee/shock cord, elastic, plastic, metal, and/or rope. The zipper 118 can have a variety of pulls attached thereto, such as the pull 118p illustrated in FIG. 18 to allow for easy and rapid closure. Other pulls can be used, such as smaller pulls to allow for more compact or discrete packing when the cover is not in use. In various embodiments, the cover can also have cut-outs in the cover instead of pull tabs extending from the cover. In other embodiments, the cover may not have pull tabs or cut-outs at all. The vehicle 110 illustrated in FIGS. 1-17 is a Ford Focus, but a variety of vehicles can be used, such as cars, trucks, motorcycles, tractors, busses, mobile homes, and/or other structures that are placed on wheels, such as trailers.

Figure 19:
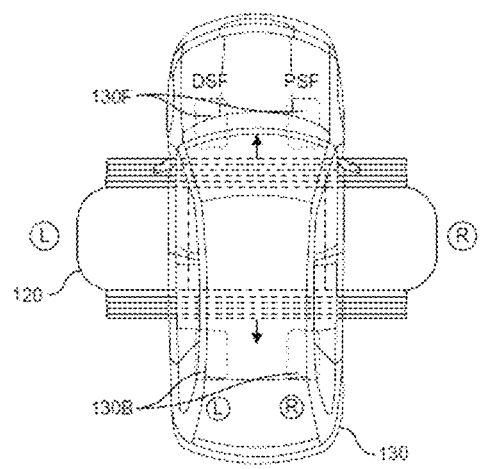
FIG. 19 is a top-down view of an embodiment of a method of using a vehicle cover with an exemplary vehicle with the cover extending underneath the vehicle and between wheels of the vehicle.
Figure 20:
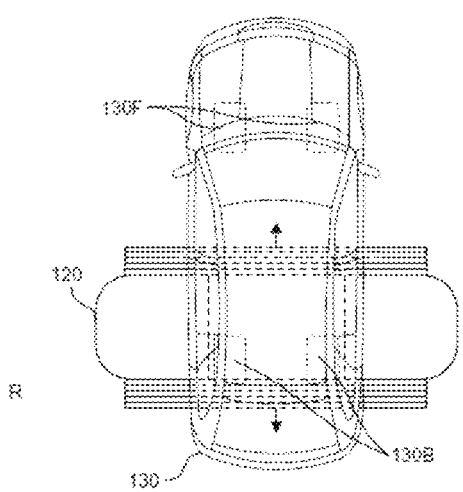
FIG. 20 is a top-down view of the vehicle and cover of FIG. 19 with the vehicle driven forwards so that rear wheels of the vehicle are on top of the cover.
Figure 21:
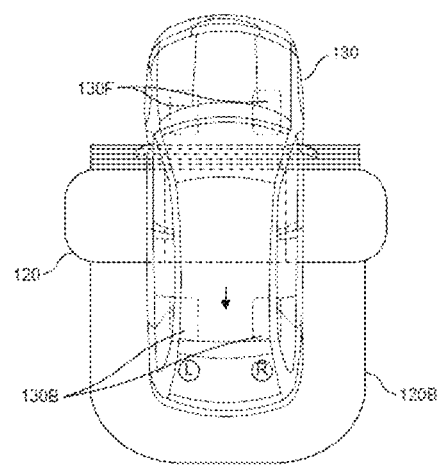
FIG. 21 is a top-down view of the vehicle and cover of FIG. 20 with a rear of the cover extended behind the vehicle.
Figure 22:
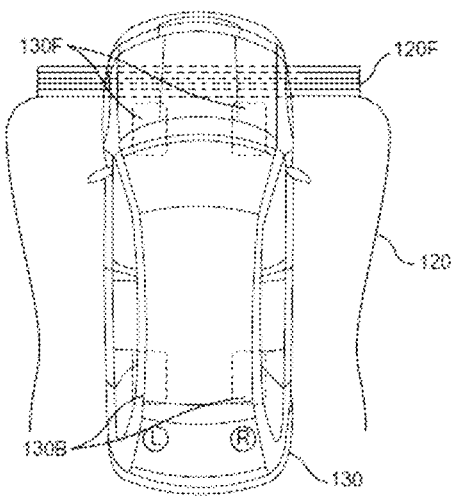
FIG. 22 is a top-down view of the vehicle and cover of FIG. 21 with the vehicle driven backwards so that front wheels of the vehicle are on top of the cover.
Figure 23:
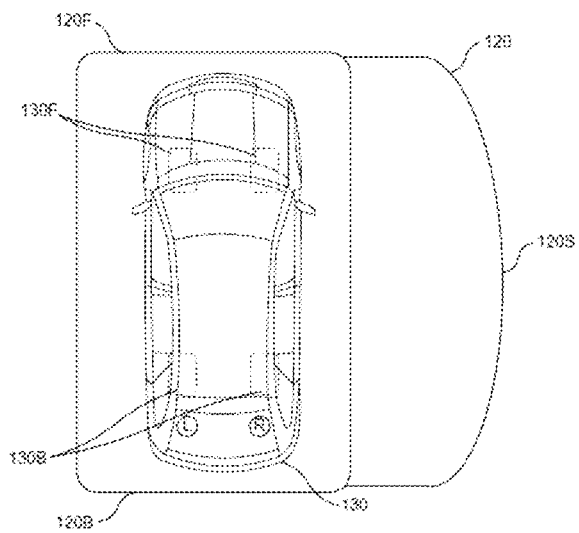
FIG. 23 is a top-down view of the vehicle and cover of FIG. 22 with a front, side, and the rear of the cover extended around the vehicle.

FIGS. 19-23 illustrate an embodiment of enclosing a vehicle with a vehicle cover similar to that illustrated in FIGS. 1-17. A vehicle cover 120 is pre-folded and placed on the ground and extended between front wheels 130f and back wheels 130b of a vehicle 130, as illustrated in FIG. 19. The vehicle 130 is driven forward so that the back wheels 130b rest on top of the cover 120 between folds of the cover 120, as illustrated in FIG. 20. A back 120b of the cover 120 is extended behind the vehicle 130, shown in FIG. 21. The vehicle 130 is then driven backward so that the front wheels 130f rest on top of the cover 120, as shown in FIG. 22. A front 120f of the cover 120 is extended in front of the vehicle 130, as illustrated in FIG. 23. FIG. 23 illustrates the cover 120 extending entirely around the vehicle 130 such that a side 120s of the cover 120 extends to one side of the vehicle 130. The side 120s can be brought over the vehicle 130 and engaged with peripheral edges of the bottom part of the cover 120 to be sealed, joined, and/or coupled together using a variety of mechanisms, such as Velcro, tape, zippers, hooks, clasps and/or buttons, similar to cover 100 discussed above. However, in other embodiments the cover 120 can have more than one side, such as having a right side and a left side. In such an embodiment, the front, the back, and the right and left sides of the cover 120 can be brought together to enclose all of the vehicle 130, and the front, the back, and the sides can be sealed, joined, and/or coupled together. The cover 120 can be made of a variety of materials and have a variety of variations, as discussed above with relation to the cover 100 that equally apply to cover 120 and should be understood to be incorporated herein.

Figure 24:
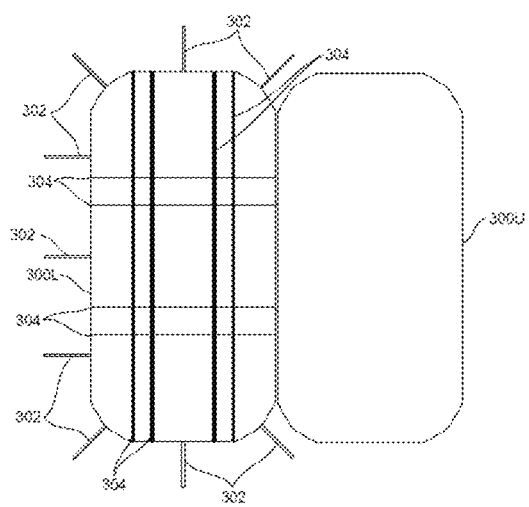
FIG. 24 is a top-down view of another embodiment of a vehicle cover.
Figure 25:
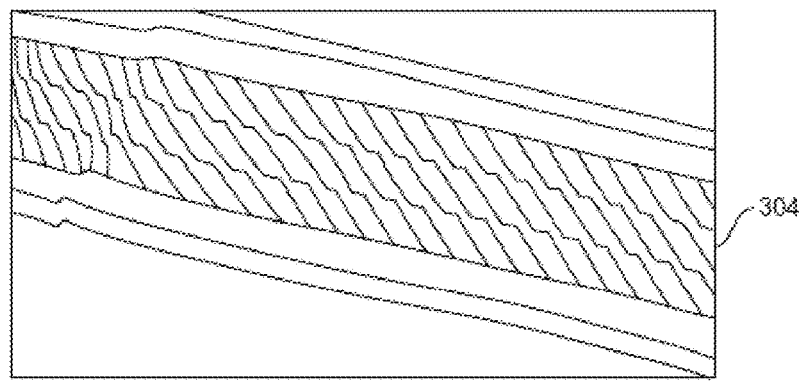
FIG. 25 is a perspective view of markings on the cover of FIG. 24.

FIG. 24 illustrates another embodiment of a cover 300 similar to the cover 100 discussed above. The cover 300 has an upper portion 300u, a lower portion 300L, and a plurality of restraining means 302 attached to the lower portion 300L similar to the cover 100. The cover 300 also has markings 304 on the lower portion 300L thereof that are configured to serve as guides to a user when deploying and using the cover 300. The markings 304 can serve as lines along which a user should drive a vehicle when enclosing the vehicle in the cover 300. For example, the markings 304 form two parallel guide lines that run from a front to a back of the lower portion 300L and form another two parallel guide lines that run from a left to a right of the lower portion 300L. In use, the user can follow the same basic deployment method as described above with respect to the cover 100, however the user can drive the vehicle backwards and forwards along the lines running from the front to the back of the lower portion 300L to ensure that the vehicle is lined up along a center of the lower portion 300L of the cover 300. The user can position the four wheels of the vehicle over the points where the lines running from the left to the right of the lower portion 100L intersect with the lines running from the front to the back to ensure that the vehicle is both lined up between the two sides of the lower portion 300L of the cover 300 and between the front and the back of the lower portion 300L of the cover 300. The markings 304 can have a variety of configurations and take a variety of forms depending on what type of vehicle is being covered and how much guidance is desirable for the user. For example, the markings 304 can be as simple as circles, Xs, dots, etc. at the four points where a typical vehicle's wheels should rest once the vehicle has been maneuvered onto the cover or can be as complicated as numbered and color-coordinated lines, dashes, arrows, etc. on the cover with accompanying word and/or figure instructions to provide detailed guidance to a user during the entire deployment process, for example marking that allow the user to know where to position the vehicle after each step of deployment. The markings 304 are made from reflective tape to aid in low-light installation, but a variety of marking means can be used, such as ink, tape, paint, stitching, grooves, florescent markings, texturizing, strips of different material, etc.

Figure 26:
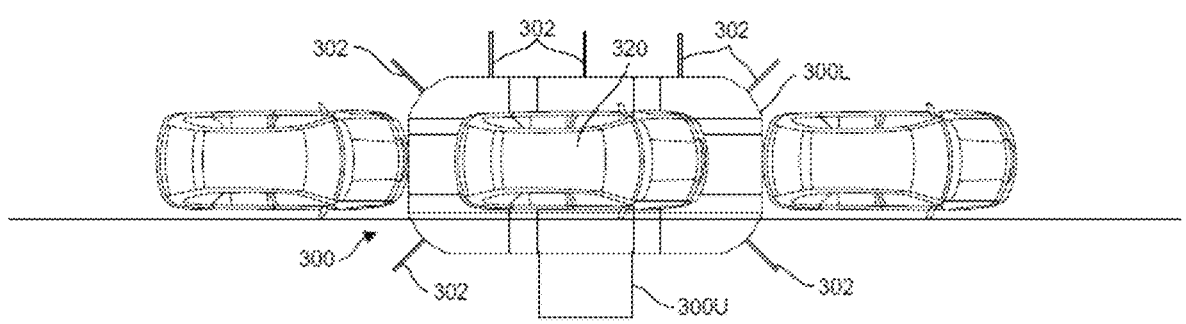
FIG. 26 is a top-down view of a vehicle with the cover of FIG. 24 and other vehicles.
Figure 27:
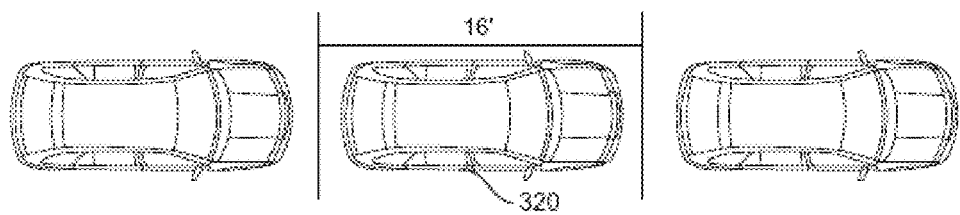
FIG. 27 is a top-down view of the vehicles of FIG. 26.

FIG. 26 illustrates the cover 300 being deployed on a vehicle 320. Using the method described above with respect to the cover 100, a user can use a back and forth motion of the vehicle 320 to deploy the cover 300 in only a few steps and in a very limited space. As illustrated in FIG. 26, the vehicle 320 can be positioned on a crowded curb in an urban environment and still be covered in a minimal amount of space with the cover 300. For example, the vehicle 320 is a Ford Focus with an estimated total length of approximately 14.3 feet. With such a vehicle, a user can cover the vehicle 320 with the cover 300 with approximately 24 feet between an object in front of the vehicle 320 and an object behind the vehicle 320. Taking into consideration the approximate size of the vehicle 320 of 14.3 feet, the cover 300 can be applied with a total of approximately 9.7 feet of clear space either in front of the vehicle, behind the vehicle, or a combination of the two. The required clearance distance can equal a length of the cover 300, as illustrated in FIG. 26. The required clearance distance and the length of the cover can vary depending on a length, height, and width of the vehicle in question, however. For example, the clearance distance can require 200% or less, 170% or less, 150% or less, or 125% or less of a total length of the vehicle in free space in front of the vehicle, behind the vehicle, or a combination of the two. However, the vehicle is required to be able to move forward and backward for deployment of a cover, so there must be at least a minimum clearance distance in front of the vehicle, behind the vehicle, or both. For instance, a distance in front of a vehicle and behind the vehicle of approximately 1 to 15 feet can be used, and more preferably a distance of approximately 2 to 9 feet and/or approximately 6 to 9 feet can be used. In an exemplary embodiment as illustrated in FIG. 27, the cover 300 can be applied to the vehicle 320 in as little as 16 feet of space (including the length of the vehicle 320), thus requiring as little as 1.7 feet of clearance distance in front of the vehicle, behind the vehicle, or a combination of the two. This 1.7 foot distance relates to the Ford Focus example illustrated in FIGS. 26-27. A vehicle generally can require approximately 2 feet and, more preferably, as little as approximately 18 inches of clearance in front of the vehicle, behind the vehicle, or a combination of the two to successfully deploy one of the covers discussed herein, such as cover 100. As an example, a vehicle may require approximately 2 feet of distance in either direction to roll over a cover. Providing a flood protection distance of approximately 3 feet and a minor amount of excess space to allow easier placement and maneuvering of a vehicle of approximately 3 feet results in a preferred embodiment of a cover with approximately 8 feet of extra cover length in addition to a total length of a vehicle. Such a length would result in a cover with a length of approximately 160% to 180% of a total length of a vehicle to be covered, and more preferably a length of approximately 164% of the total length of the vehicle.

Figure 28:
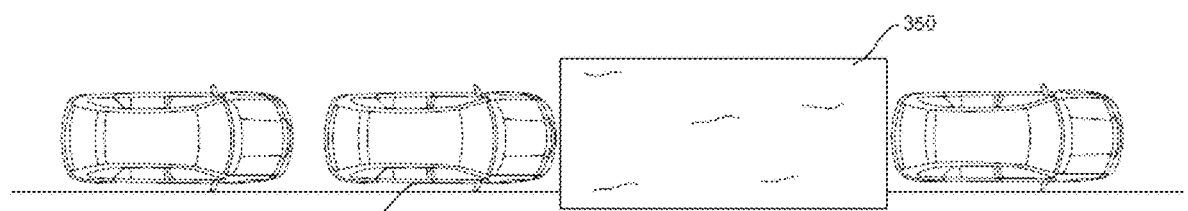
FIG. 28 is a top-down view of the vehicles of FIG. 26 with an example vehicle cover found in the related art.

The covers discussed herein can thus be deployed to envelope a vehicle with a much smaller clearance distance than covers currently available. Covers that are currently available require significantly more clearance distance in front of a vehicle so that the vehicle can pull forward entirely into and/or onto a cover, thus requiring a clearance distance of at least an entire length of the vehicle. As illustrated in FIG. 28, the vehicle 320 requires a clearance distance in front of the vehicle 320 of at least an entire length of the vehicle 320 to pull into a common cover available on the market, and the required clearance distance can be even greater depending on the cover. For example, a common cover 350 illustrated in FIG. 28 can require a total of 38 feet of clearance between an object in front of the vehicle 320 and an object behind the vehicle 320. The increased required clearance distance can make deploying many covers commonly available extremely difficult because an area has to be found where there is that much clearance distance. In urban setting and/or in emergencies, it can be time consuming or impossible to find such an area, which will prevent deployment of many common covers (such as the cover 350 in FIG. 28).

Figure 29:
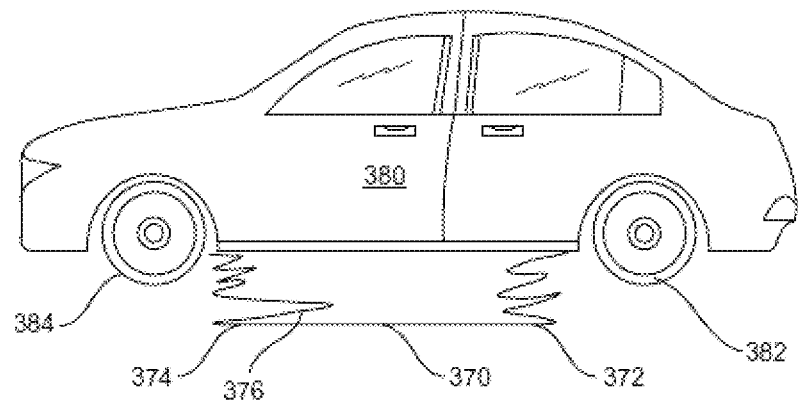
FIG. 29 is a side diagram view of another embodiment of a vehicle cover partially underneath an exemplary vehicle.
Figure 30:
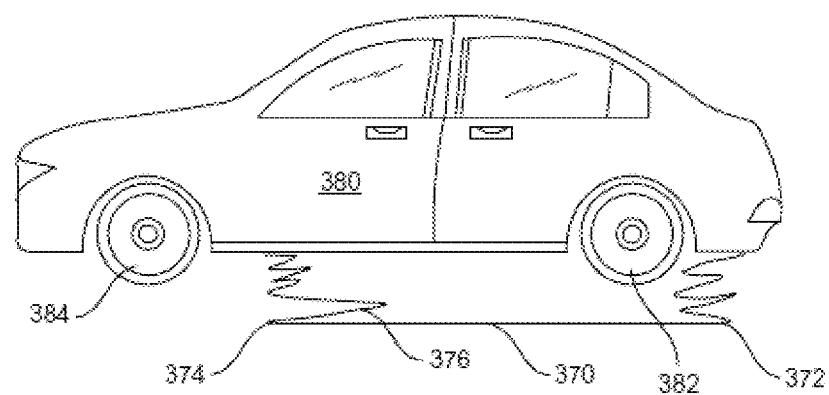
FIG. 30 is a side diagram view of the vehicle cover and vehicle of FIG. 29, illustrating only a bottom portion of the vehicle.
Figure 31:
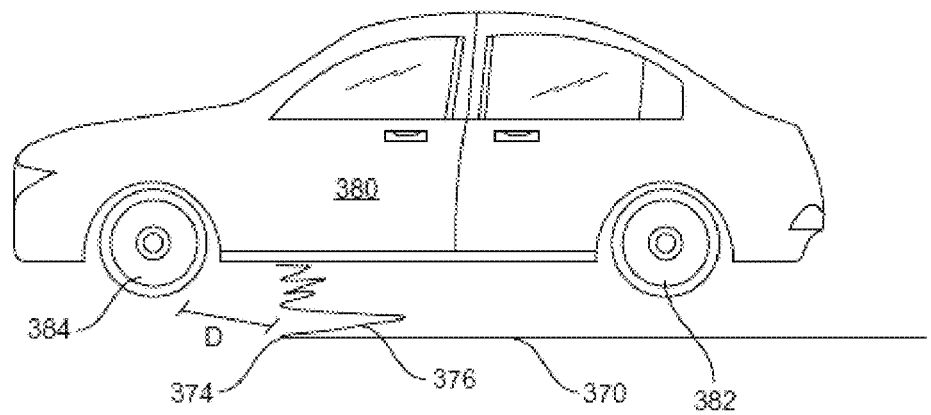
FIG. 31 is a side diagram view of the vehicle cover and vehicle of FIG. 30, illustrating only a bottom portion of the vehicle.
Figure 32:
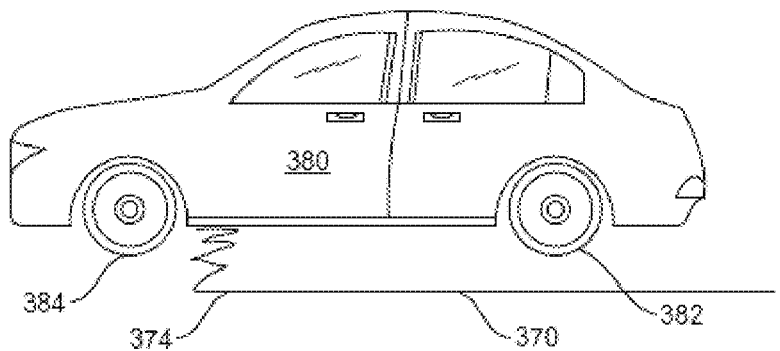
FIG. 32 is a side diagram view of the vehicle cover and vehicle of FIG. 31, illustrating only a bottom portion of the vehicle.
Figure 33:
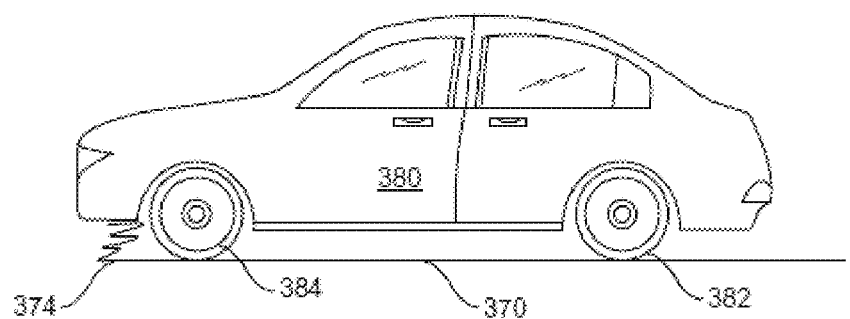
FIG. 33 is a side diagram view of the vehicle cover and vehicle of FIG. 32, illustrating only a bottom portion of the vehicle.
Figure 34:
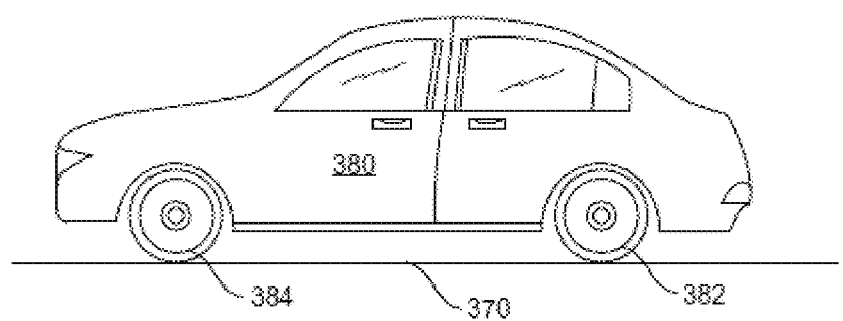
FIG. 34 is a side diagram view of the vehicle cover and vehicle of FIG. 33, illustrating only a bottom portion of the vehicle.

Additionally, instead of first reversing a vehicle then driving a vehicle forwards and finally making a last adjustment to ensure the vehicle is centered on a deployed cover, another method of deployment can be used that eliminates any last adjustment of the vehicle's position. As illustrated in FIGS. 29-34, a cover 370 (similar to the cover 100 discussed above) can be positioned underneath a vehicle 380 with rear wheels 382 and front wheels 384 (similar to the vehicle 110 discussed above). The cover 370 can also have an upper portion (not shown but similar to the cover 100 discussed above). As discussed above with respect to the cover 100, the cover 370 can have two folded sections 372, 374. The vehicle 370 can be driven forwards over the rear folded section 372 of the cover 370, as illustrated in FIG. 30. The rear folded section can be extended outwards, as illustrated in FIG. 31. At this point, a user can partially unfold the front folded section 374 such that the front folded section 374 is close to or rests against the front wheels 384, as illustrated in FIG. 32. The vehicle 380 can then be driven backwards to a center position of the cover 370, as illustrated in FIG. 33, and the front folded section 374 of the cover 370 can be extended, as illustrated in FIG. 34. This series of steps is advantageous because the vehicle 380 can eliminate any last step of repositioning the vehicle 380 on the cover 370 to be properly aligned with the cover 370 for deployment. The pre-folded cover 370 can either be pre-folded identically to the cover 100 or the pre-folded cover 370 can have an excess fold 376 on one or both of the folded sections 372, 374. As illustrated in FIGS. 29-31, the excess fold 376 is positioned with the front folded section 374. This excess fold 376 can allow a user to more easily manipulate the folded section 374 to close a distance D between the folded section 374 and the front wheels 384 to position the folded section 374 close to or directly against the front wheels 384, as best illustrated in FIG. 31. The asymmetrical lengths of the front and back sections 372, 374 created by the excess fold 376 can allow a user to avoid having to reposition or reorient the vehicle 380 and/or the cover 370 multiple times, and instead, the vehicle 380 can be positioned in the middle of the cover 370 quickly after only a few movements of the vehicle (for example after only moving the vehicle 380 twice by pulling the vehicle forwards once, as illustrated in FIG. 30, and then pulling the vehicle backwards once, as illustrated in FIG. 33).

While the covers discussed herein are deployed by first driving a vehicle forward over a rear folded section of a cover and then driving a vehicle backwards over a front folded section of the cover, the steps can be switched such that a vehicle is first driven backwards to extend a front portion of a cover and then driven forwards to deploy a rear portion of a cover. Additionally, lower portions of the covers discussed herein can be entirely unfolded and a vehicle can then be driven onto the lower portion of the cover and enclosed. This approach can allow rapid deployment of a cover if there is adequate space to maneuver a vehicle without requiring back and forth motion of the vehicle while the lower portion of the cover is unfolded in a step-by-step process.

Figure 35:
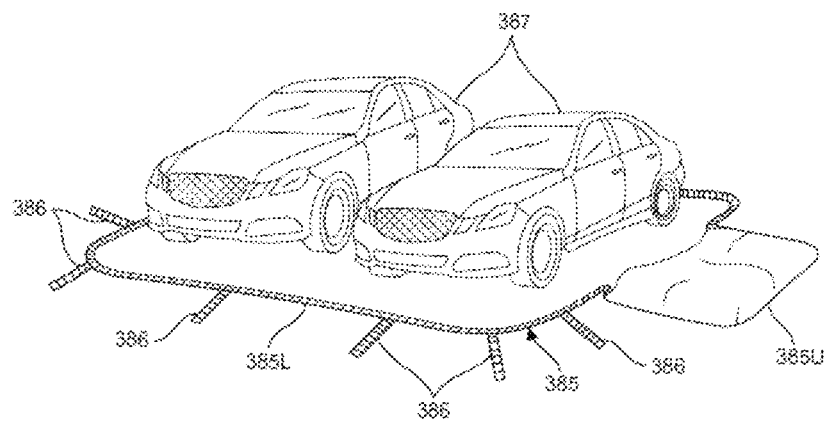
FIG. 35 is a perspective view of another embodiment of a vehicle cover underneath two exemplary vehicles.
Figure 36:
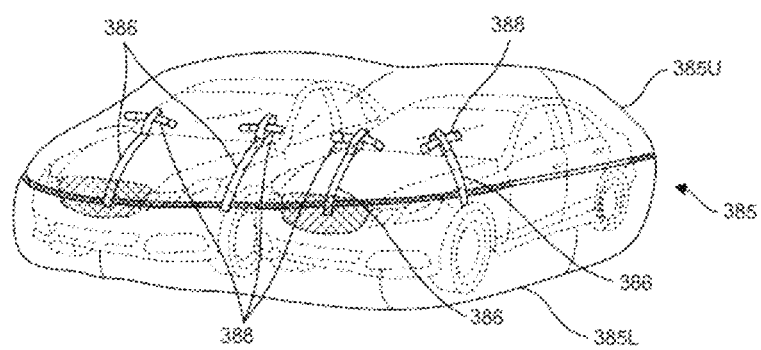
FIG. 36 is a perspective view of the vehicle cover and vehicles of FIG. 35.

In other embodiments, a single cover can be used on two or more vehicles. For example as illustrated in FIGS. 35-36, a cover 385 can be similar to the cover 100 discussed above with an upper portion 385u, a lower portion 385L, and a plurality of restraining means 386 attached to the lower portion 385L similar to the cover 100. Two or more vehicle 387 can be maneuvered onto the lower portion 385L of the cover 385, either through the steps discussed above with respect to the cover 100 or by entirely unfolding the lower portion 385L and driving the vehicles 387 thereon. The upper portion 385u can then be extended over a top of the vehicles 387 and the upper and lower portions 385u, 385L can be sealed together using a variety of means, as discussed above with respect to cover 100. The restraining means 386 can then engage the upper cover 385u through a variety of means, as discussed above with respect to cover 100. For example, the restraining means 386 can engage straps, loops, buckles, hooks, Velcro, engagement points, etc. such as straps 388 on the upper portion 385u.

Figure 37:
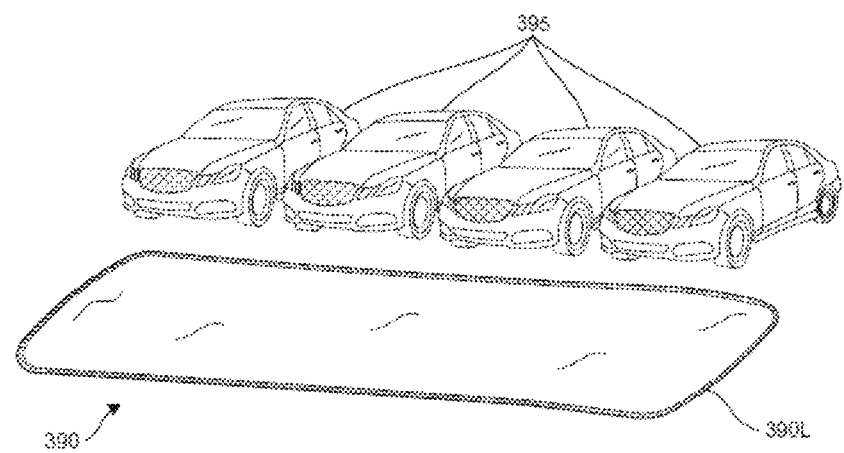
FIG. 37 is a perspective view of another embodiment of a vehicle cover underneath multiple exemplary vehicles.
Figure 38:
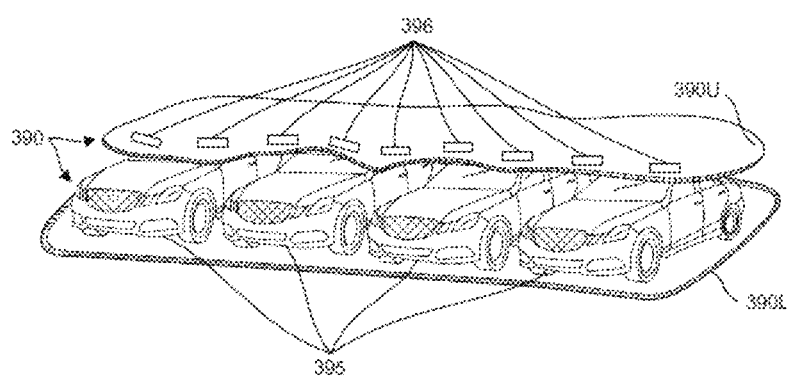
FIG. 38 is a perspective view of the vehicle cover and vehicles of FIG. 37.
Figure 39:
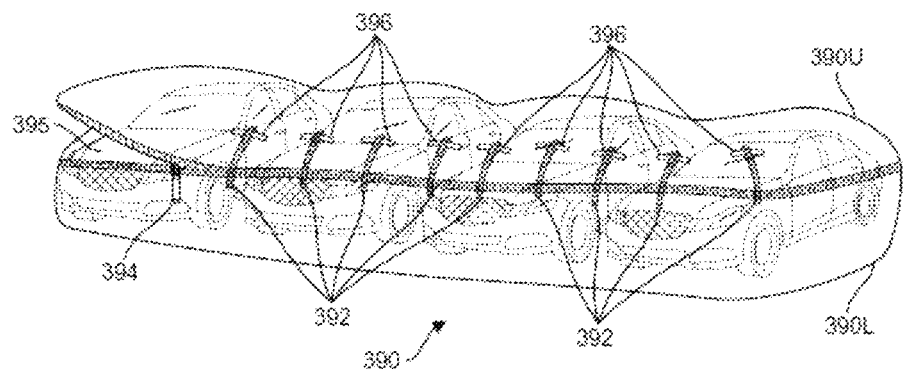
FIG. 39 is a perspective view of the vehicle cover and vehicles of FIG. 38.

While the covers discussed herein have provided lower portions and upper portions engaged therebetween, the covers can have upper and lower portions that are initially entirely separate and are engaged with one another by sealing the two portions together by the user, using a variety of means discussed herein. This embodiment can be useful in maneuvering and deploying the covers. For example, as illustrated in FIGS. 37-39, numerous vehicles 395 can be covered together by using a cover 390 (similar to the cover 100) that has an upper portion 390u that is separate and distinct from the lower portion 390L. In such an example, the lower portion 390L can be placed first. The vehicles 395 are driven onto the lower portion 390L. The upper portion 390u can then be extended across the vehicles 395 and sealed to the lower portion 390L using any of the means discussed herein, such as by a zipper 394. Restraining means 392 can be extended from the lower portion 390L to engage straps 396 on the upper portion 395u. This embodiment can be useful when covering an entire row of vehicles together, such as in a rental car lot.

When a single cover is used to cover more than one vehicle, the dimensions and weights of the cover may be increased beyond ranges discussed above regarding covers for single vehicles. For example, a weight of a cover used for more than one vehicle may be greater than approximately 25 pounds or 30 pounds.

While specific examples and embodiments of covers with a variety of configurations, engagements, features, and orientations are discussed herein, it should be understood that any configurations, engagements, features, and orientations can be used with any other cover. The examples given above are not meant to be limiting to any one cover. Configurations, engagements, features, and orientations of one cover can be used with another cover without straying from the disclosure herein.

Figure 40:
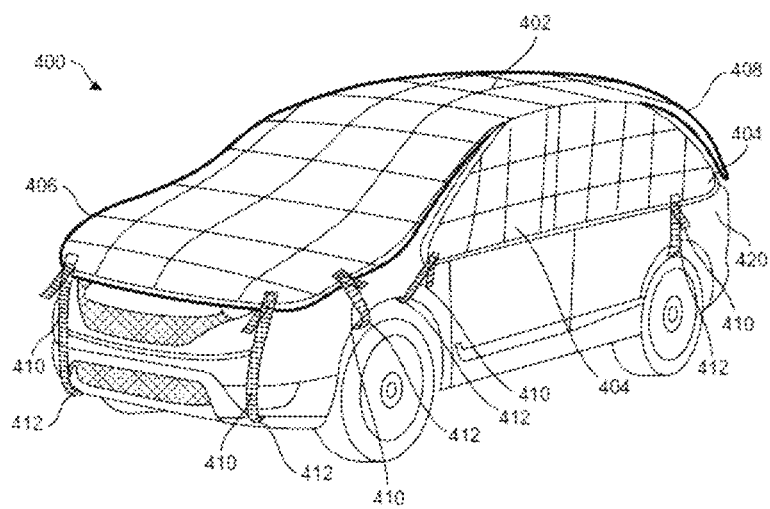
FIG. 40 is a perspective view of one embodiment of a vehicle cover on an exemplary vehicle to protect against hail.

FIGS. 40-46 illustrate multiple embodiments of vehicle covers configured to protect against impact forces, such as from hail, and that can be used independently or used with and/or incorporated into any the covers discussed herein, such as cover 100. It should be understood that each of the features, designs, properties, structures, etc. described for each cover of FIGS. 40-46 can be used with and/or incorporated into any of the other covers described in FIGS. 40-46 or in any of the covers described above. FIG. 40 illustrates one embodiment of a vehicle cover 400 that is configured to cover a top of a vehicle 420 and protect the vehicle 420 from an impact force. The cover 400 can have a top panel 402, two side panels 404, a front panel 406, and a back panel 408. The panels of the cover 400 can be sized and shaped and configured to be positioned on and cover respective parts of the vehicle 420, with the top panel 402 covering a top of the vehicle 420, the side panels 404 covering sides of the vehicle 420, the front panel 406 covering a front of the vehicle 420, and the back panel 408 covering a back of the vehicle 420. In such as example, the windows, hood, and trunk of the vehicle 420 can be protected. Thus the exact size and shape of the cover 400 can change depending on the vehicle to be covered. The cover 400 can have a plurality of straps 410 engaged at peripheral edges of each of the front, side, and back panels 404, 406, 408 and that are configured to engage the vehicle 420. The straps 410 can engage the panels 404, 406, 408 through a variety of means, such as stitching, buckles, Velcro, snaps, buttons, hooks, adhesive, suction cups, etc. The straps 410 can have engagement means 412 on distal ends thereof, for example hooks, brackets, adhesive, Velcro, snaps, magnets, webbing, elastic, etc., that are configured to engage the vehicle 420, such as engaging edges of wheel bases, edges of a front bumper, and edges of a back bumper. In use, a user can cover the top of the vehicle 420 with the cover 400 and couple the cover 400 to the vehicle 420 using the straps 410 and the engagement means 412. The cover 400 can be made from a variety of materials, such as the materials discussed above including various plastics, polymers, polypropylene, latex, natural rubber, any elastic hydrocarbon polymer, Gore-Tex, vinyl, a variety of types of plastic derived from ethylene and chlorine, fluoropolymer fabrics (such as any textile coated with fluoropolymers), any fluorinated plastics, various block copolymers, surface modified polymers, textiles covered with polyurethane compositions, textiles treated with various hydrophobic components, hydrophilic resins, water-repellent fibrous sheets and/or textiles impregnated with a water-repellent material, waterproof thermoplastic resin film layers firmly bonded to the surfaces of textiles, Kevlar and para-aramid synthetic fibers generally, other aramids such as Nomex and Technora, rigid plastics such as polyvinyl chloride, high-density polyethylene, and high-density polypropylene, common textile fibrous fabrics such as cotton and wool, various natural and/or synthetic foams, and a variety of other materials. The cover 400 can have one or more layers, for example having an outer layer of water proof or water resistant material and an inner layer of absorbent material, such as foam, configured to absorb an impact of hail. The cover 400 can also have a hard outer layer configured to deflect the impact of hail. Layers can be stacked like a sandwich or fully enclosing one another. The cover 400 can be formed from one single piece of material, resulting in a fully integrated cover, or can be formed from one or more separate pieces of material joined together through a variety of means, such as stitching, adhesive, binding, melting, etc. As discussed above, the cover 400 can be incorporated into or used with any of the covers discussed above. For example, the cover 100 can be deployed such that a vehicle is positioned on the lower portion 100L. Before the upper portion 100u covers the vehicle, the cover 400 can be deployed on the vehicle. Afterwards, the upper portion 100u can be engaged with the lower portion 100L to seal the vehicle, thus protecting the vehicle from water damage and damage from external force such as hail.

Figure 41:
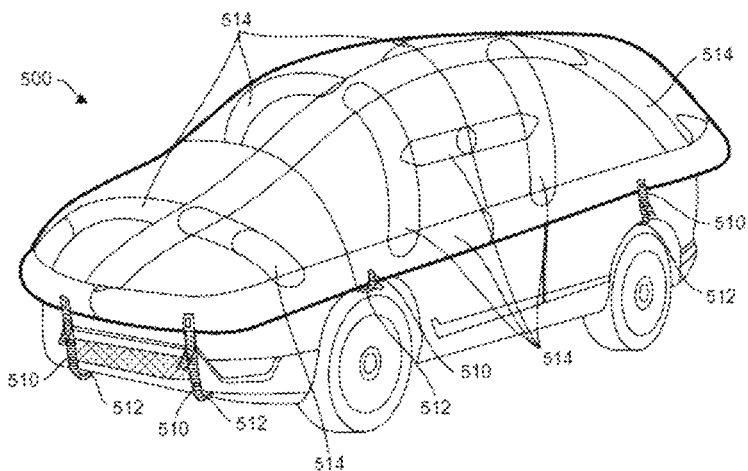
FIG. 41 is a perspective view of another embodiment of a vehicle cover on an exemplary vehicle to protect against hail.
Figure 42:
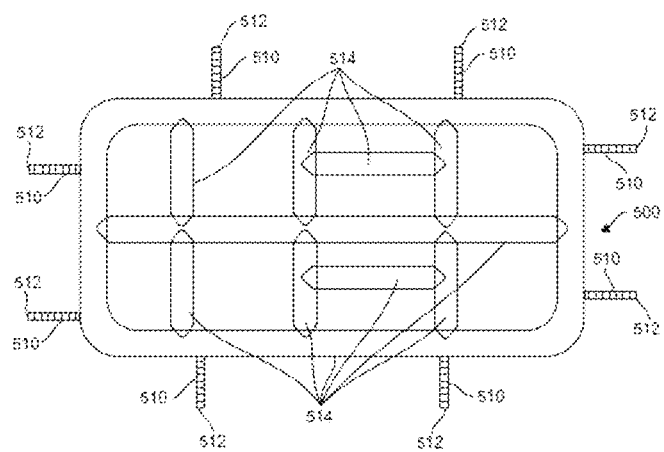
FIG. 42 is a bottom-up view of the vehicle cover of FIG. 41.

FIGS. 41-42 illustrate another embodiment of a vehicle cover 500 configured to protect a vehicle 520 against impact, such as from hail, that can have identical and/or similar properties and features as the cover 400, for example having the cover 500 with straps 510 and engagement means 512. The cover 500 however can incorporate a plurality of shafts 514 that are configured to absorb an impact of hail to prevent hail from damaging the vehicle 520. As seen in FIG. 42, the shafts 514 can have a grid-work arrangement that is configured to cover vulnerable parts of a top of the vehicle 520, for example having one or more shafts 514 extending along the cover 500 from a front to a back thereof, having one or more shafts extending sideways along the cover from a right side to a left side thereof, having one or more shafts 514 arranged between other shafts 514 such that they do not extend entirely across the cover 500, and/or having one or more shafts 514 extending around at least a portion of a peripheral edge of the cover 500. The shafts 514 can be positioned on a lower or interior surface of the cover 500 while an upper or exterior surface of the cover 500 is directed outward, resulting in the shafts 514 being positioned between the cover 500 and the vehicle 520. The shafts 514 can have a variety of configurations, such as being expanding tubes or cells filled with air to assist to dissipate an exterior force of impact, such as from hail striking the cover 500. The shafts 514 can be self-inflating or can require manual inflating. For example, the shafts 514 can be inflated with a foot-driven inflator, from the power of a battery of the vehicle 520, or a carbon dioxide inflator device. One or more battery-powered or vehicle-powered motors and/or pumps can be incorporated into the cover 500 to allow the shafts 514 to be self-inflating. While the illustrated shafts 514 are air tubes, a variety of other structures can be used, such as rolled foam, cylindrical material, pegs or stands configured to keep the cover 500 away from a surface of the vehicle 520 and act as a barrier, etc. The shafts 514 can also be permanently fixed in place relative to the cover 500 or they can be removable and replaceable to allow customized arrangement of the shafts 514 for each vehicle in question. The shafts 514 can thus be attached to the cover 500 through stitching, Velcro, hooks, adhesive, bonding, buttons, snaps, etc., depending on the desired configuration. The shafts 514 can each be self-contained or can be interconnected such that inflating one shaft 514 inflates at least one other shaft 514. The shafts 514 can also be the same material as the cover 500 or different material.

Figure 43:
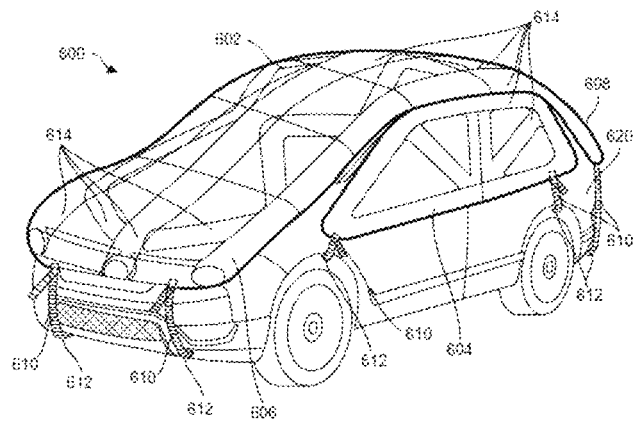
FIG. 43 is a perspective view of another embodiment of a vehicle cover on an exemplary vehicle to protect against hail.
Figure 44:
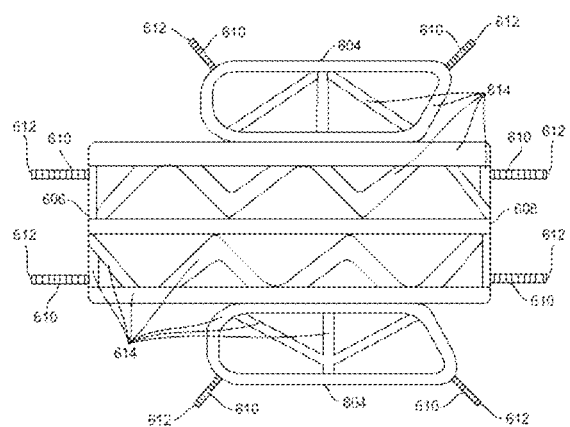
FIG. 44 is a bottom-up view of the vehicle cover of FIG. 43.

FIGS. 43-44 illustrate another embodiment of a vehicle cover 600 configured to protect a vehicle 620 against impact, such as from hail, that can have identical and/or similar properties and features as the covers 400, 500, for example having the cover 600 with straps 610, engagement means 612, and top, side, front, and back panels 602, 604, 606, 608. As with the cover 500, the cover 600 can have shafts 614 that can be air-filled tubes coupled to the cover 600 and positioned between the cover 600 and the vehicle 620. The shafts 614 can be positioned along peripheral edges of each of the side, front, and back panels 604, 606, 608, can be positioned along the cover 600 from a front to a back thereof, and can be positioned in zig-zag or triangular patterns within any remaining space to entirely protect vulnerable surfaces of the vehicle 620.

Figure 45:
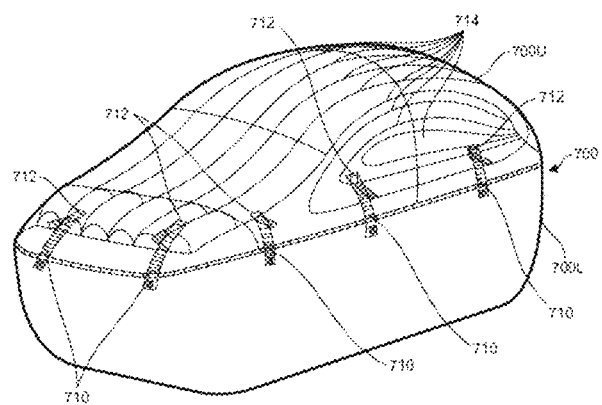
FIG. 45 is a perspective view of another embodiment of a vehicle cover on an exemplary vehicle to protect against hail and flooding.
Figure 46:
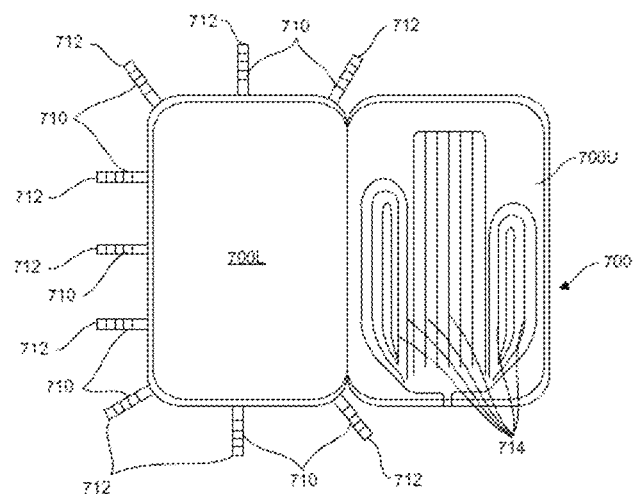
FIG. 46 is a bottom-up view of the vehicle cover of FIG. 45.

FIGS. 45-46 illustrate another embodiment of a vehicle cover 700 configured to protect a vehicle 720 against impact, such as from hail, that can have identical and/or similar properties and features as the covers 400, 500, 600, for example having the cover 700 with straps 710 and engagement means 712. The cover 700 can incorporate a lower portion 700L and an upper portion 700u, similar to the cover 100. The upper portion 700u of the cover 700 can have shafts 714 that can be air-filled tubes coupled to the upper portion 700u and positioned between the cover 700 and the vehicle 720. The shafts 714 can be positioned in a continuous pattern, similar to an inflatable raft, such that the shafts 714 extend entirely along a top and sides of the vehicle 720, for example forming loops along sections of the cover 700 that are configured to be aligned with sides of the vehicle 720, as illustrated in FIG. 46. The cover 700 can be deployed in a similar way to the cover 100 such that the lower portion 700L encloses a bottom part of the vehicle 720 and the upper portion 700u encloses a top part of the vehicle 720 to resist or entirely repel water, and the shafts 714 can be positioned along the top part of the vehicle 720 and incorporated with the upper portion 700u of the cover 700 to limit or entirely prevent damage to the vehicle 720 from external forces, such as falling hail and/or debris. As provided above, any of the covers discussed herein that are configured to limit or prevent damage from external forces can be used with or incorporated into any of the covers discussed herein that are configured to resist or prevent water damage.

Figure 47:
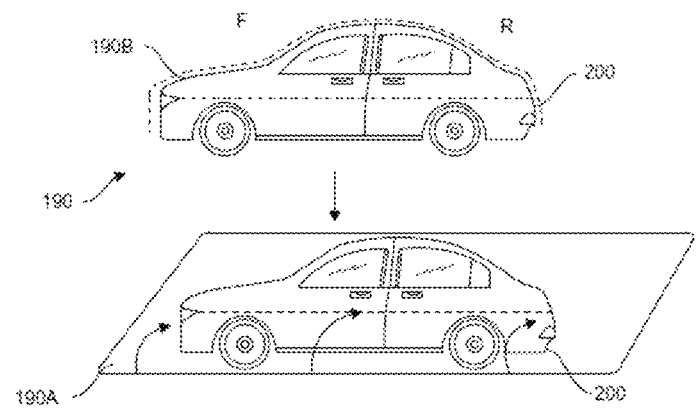
FIG. 47 is a perspective view of an embodiment of an exemplary vehicle enclosed by an exemplary vehicle cover having two pieces.

FIG. 47 illustrates an embodiment of a vehicle cover 190 with an upper portion 190B and a lower portion 190A enclosing a vehicle 200. The upper portion 190B can envelop a cab, hood, grill, and trunk of the vehicle 200, and the upper portion 190B can extend to a bottom of a frame of the vehicle 200. The lower portion 190A can be placed in front of or behind the vehicle 200, and the vehicle 200 can be driven onto the lower portion 190A. The vehicle 200 can be driven onto the lower portion 190A either before or after the upper portion 190B is placed on the vehicle 200. Once the vehicle 200 is on the lower portion 190A, sides of the lower portion 190A can be raised around the vehicle 200, and the lower portion 190A and the upper portion 190B can be sealed, joined, and/or coupled together. This joining can be water-resistant and/or watertight. Once the lower portion 190A and the upper portion 190B are joined, a barrier is formed between the vehicle 200 and the outside world. As with the embodiments described above, the lower portion 190A and the upper portion 190B can be sealed, joined, and/or coupled together using a variety of mechanisms, such as Velcro, tape, zippers, hooks, clasps and/or buttons. The cover 190 can be made of a variety of materials and have a variety of variations, as discussed above with relation to the cover 100 that equally apply to the cover 190 and should be understood to be incorporated herein.

The upper portion 190B can have a transparent portion in a front and/or side of the upper portion 190B that corresponds with a windshield and/or a side window of the vehicle 200, allowing a user to drive the vehicle 200 short distances with the upper portion 190B in place. The upper portion 190B can also have enough space between the upper portion 190B and the vehicle 200 to allow a user to exit the vehicle 200 with the upper portion 190B in place. The upper portion 190B extends to the bottom of the frame of the vehicle 200, but in other embodiments the upper portion can extend to a variety of points, such as the level of door handles of the vehicle 200.

Figure 48:
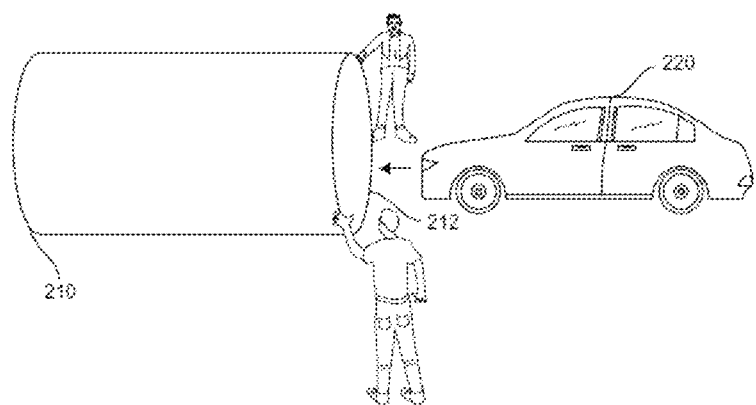
FIG. 48 is a perspective view of an embodiment of an exemplary vehicle enclosed by an exemplary vehicle cover.
Figure 49:
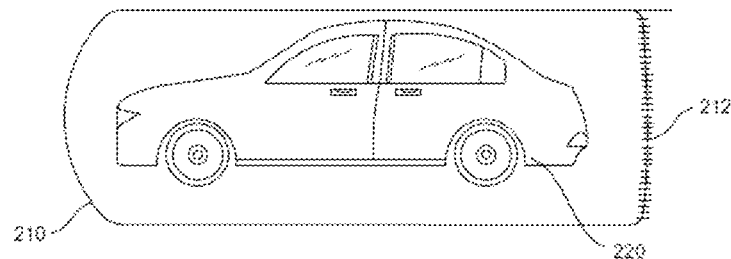
FIG. 49 is a perspective view of the vehicle and cover of FIG. 48.

FIGS. 48-49 illustrate an embodiment of a vehicle cover 210 enclosing a vehicle 220. Users can hold open an open end 212 of the cover 210 while the vehicle 220 is driven inside the cover 210. The cover 210 entirely envelopes the vehicle 220, and the open end 212 is then closed, creating a barrier between the vehicle 220 and the outside world. As with the embodiments described above, the open end 212 can be closed using a variety of mechanisms, such as Velcro, tape, zippers, hooks, clasps and/or buttons. The cover 210 can be made of a variety of materials and have a variety of variations, as discussed above with relation to the cover 100 that equally apply to the cover 210 and should be understood to be incorporated herein.

Figure 50:
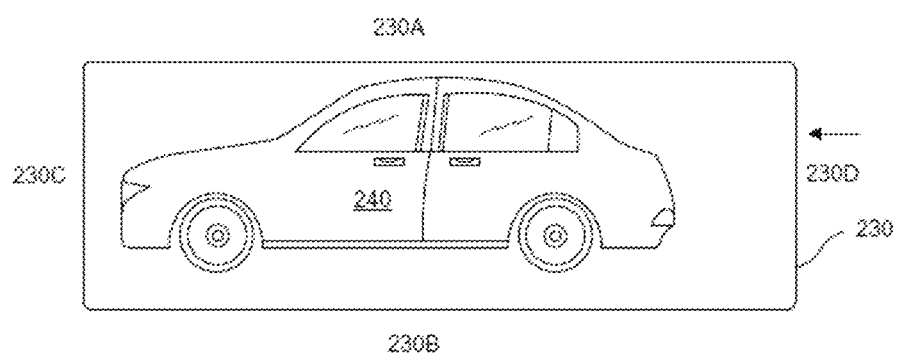
FIG. 50 is a perspective view of an embodiment of an exemplary vehicle enclosed by an exemplary vehicle cover.
Figure 51:
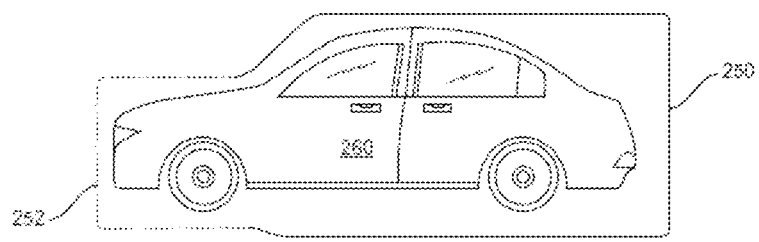
FIG. 51 is a perspective view of an embodiment of an exemplary vehicle enclosed by an exemplary vehicle cover.

FIG. 50 illustrates an embodiment of a vehicle cover 230 enclosing a vehicle 240. The cover 230 is placed flat on the ground, and the vehicle 240 is driven over it. Edges 230A, 230B, 230C, and 230D of the cover 230 are then drawn over the vehicle 240 and sealed, joined, and/or coupled together to enclose the vehicle 240. As with the embodiments described above, the edges 230A, 230B, 230C, and 230D can be closed using a variety of mechanisms, such as Velcro, tape, zippers, hooks, clasps and/or buttons. While the cover 230 is placed flat on the ground, the cover can also include a sleeve. As illustrated in FIG. 51, a cover 250 has a sleeve 252 configured to fit over an engine and hood of a vehicle 260, while the rest of the cover 250 is then fastened around the vehicle 260. The covers 230, 250 can be made of a variety of materials and have a variety of variations, as discussed above with relation to the cover 100 that equally apply to the covers 230, 250 and should be understood to be incorporated herein.

Figure 52:
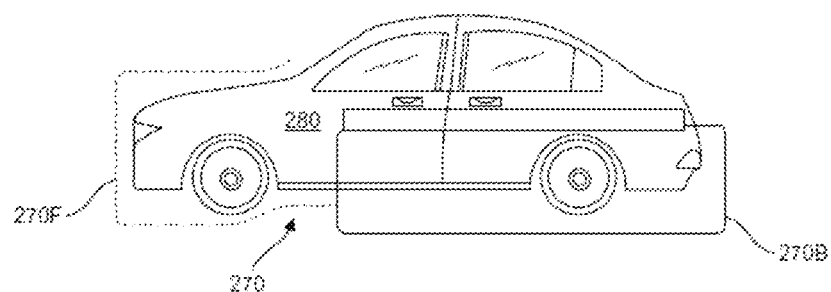
FIG. 52 is a perspective view of an embodiment of an exemplary vehicle enclosed by an exemplary vehicle cover.

FIG. 52 illustrates an embodiment of a vehicle cover 270 enclosing a vehicle 280. The vehicle 280 is driven into a front portion 270f of the cover 270 such that an engine and hood of the vehicle 280 are covered and the cover 270 extends underneath the vehicle 280. A back portion 270b is then extended around sides of the vehicle 280 and attached thereto. The back portion 270b can attach to windows or sides of the vehicle 280 by use of a variety of mechanisms, such as Velcro, tape, elastic, hooks, and/or clasps. The cover 270 can also be placed in the windows of the vehicle 280 when the windows are open and then compressed as the windows of the vehicle 280 are closed. The cover 270 can be made of a variety of materials and have a variety of variations, as discussed above with relation to the cover 100 that equally apply to the cover 270 and should be understood to be incorporated herein.

Figure 53:
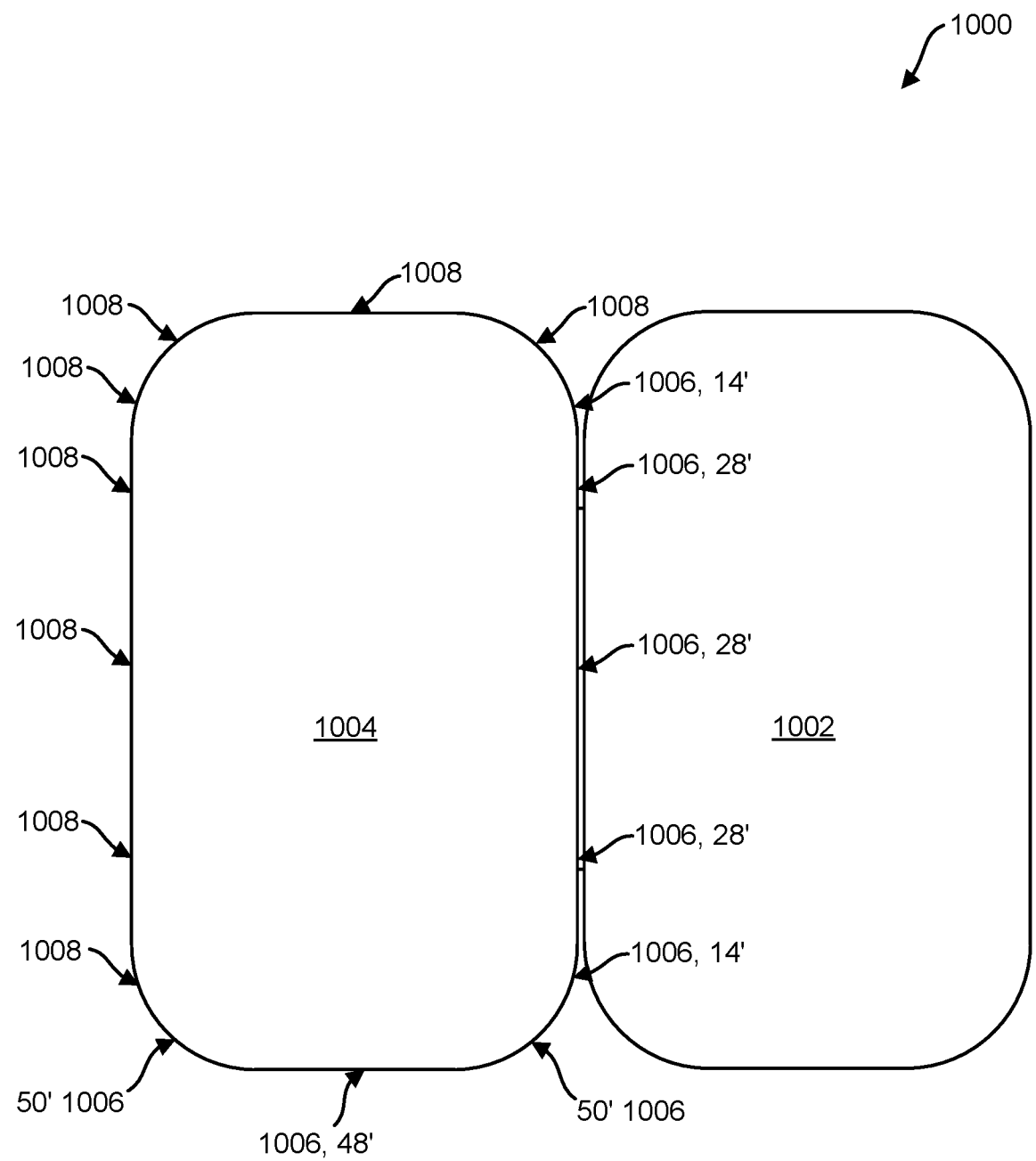
FIG. 53 is a simplified top-down illustration of another embodiment of a vehicle cover.
Figure 54:
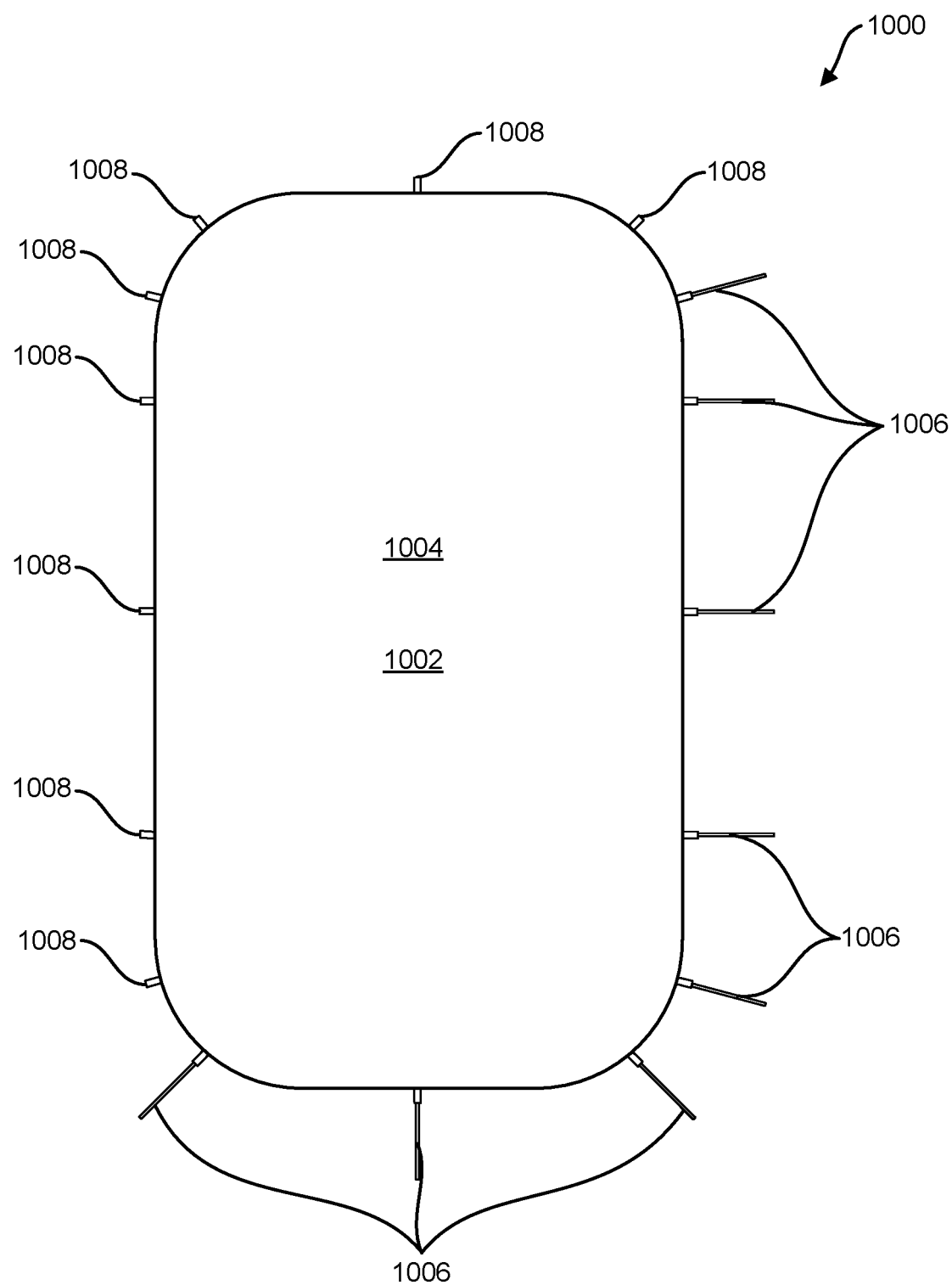
FIG. 54 is a simplified top-down illustration of the vehicle cover of FIG. 53.
Figure 55:
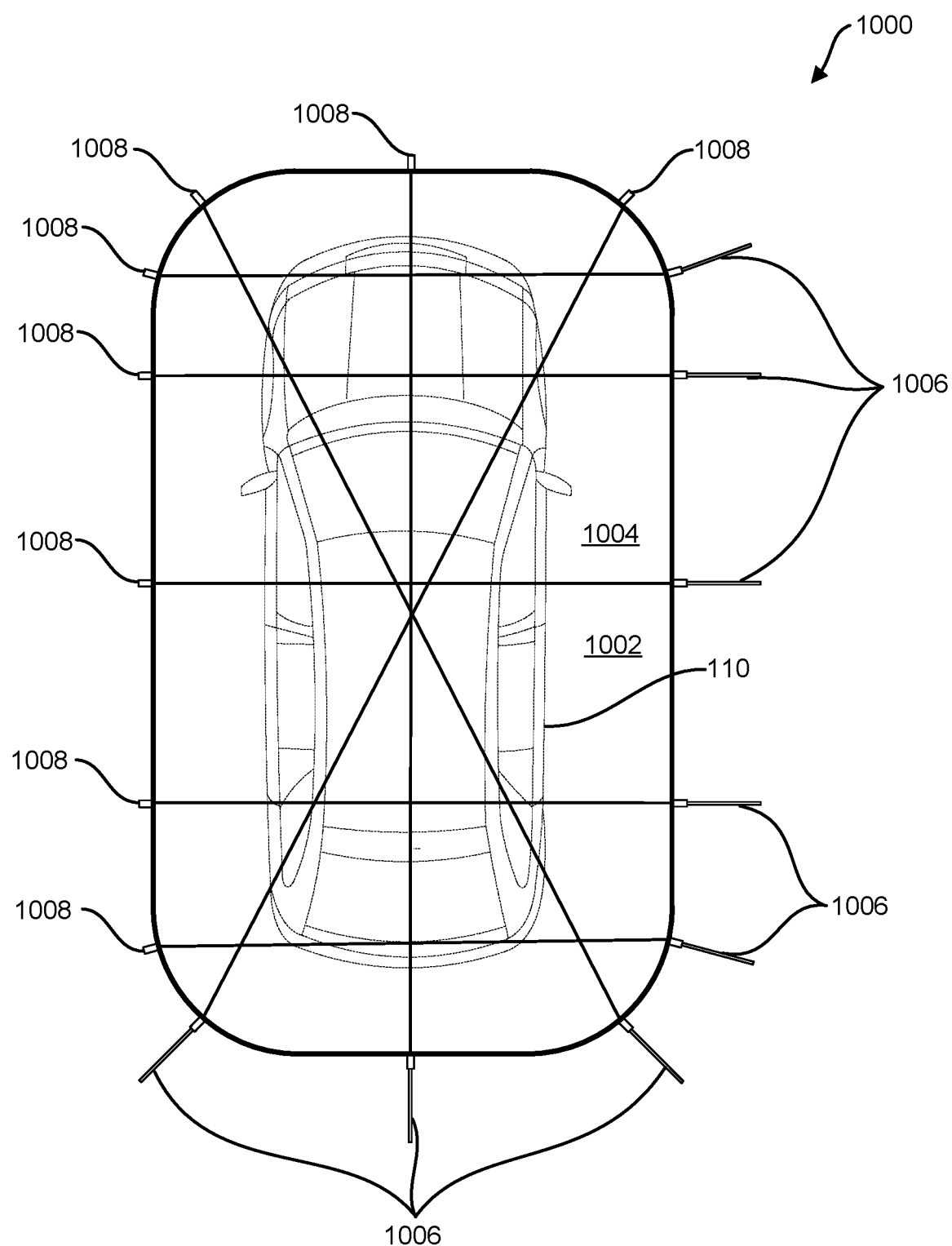
FIG. 55 is a simplified top-down illustration of the vehicle cover of FIG. 53 with a vehicle shown.
Figure 56:
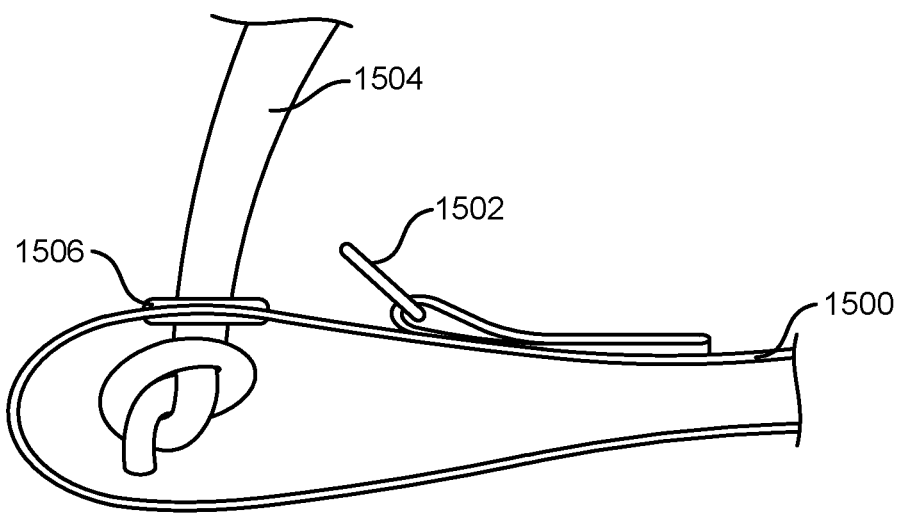
FIG. 56 is a side view of one embodiment of a rope-and-engagement-member combination that can be used with the vehicle cover of FIG. 53.
Figure 57:
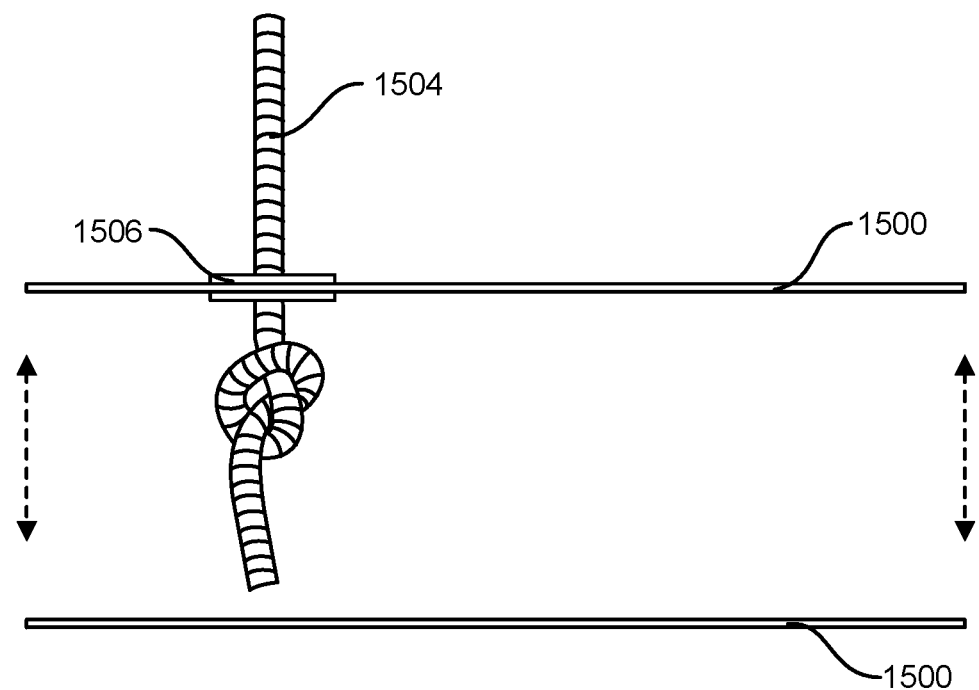
FIG. 57 is a side view of the rope-and-engagement-member combination of FIG. 56.
Figure 58:
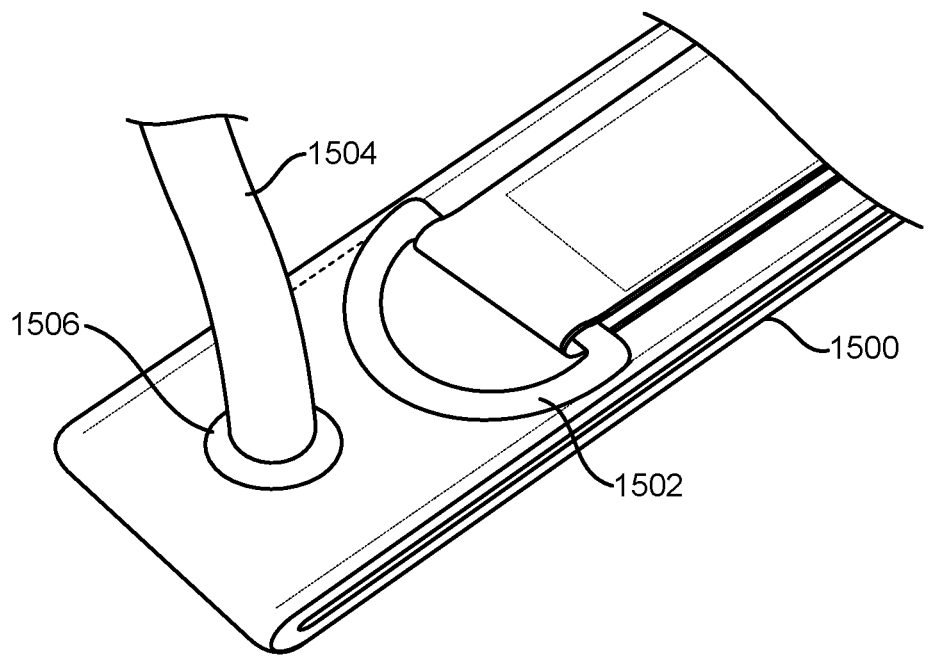
FIG. 58 is a perspective view of the rope-and-engagement-member combination of FIG. 56.
Figure 59:
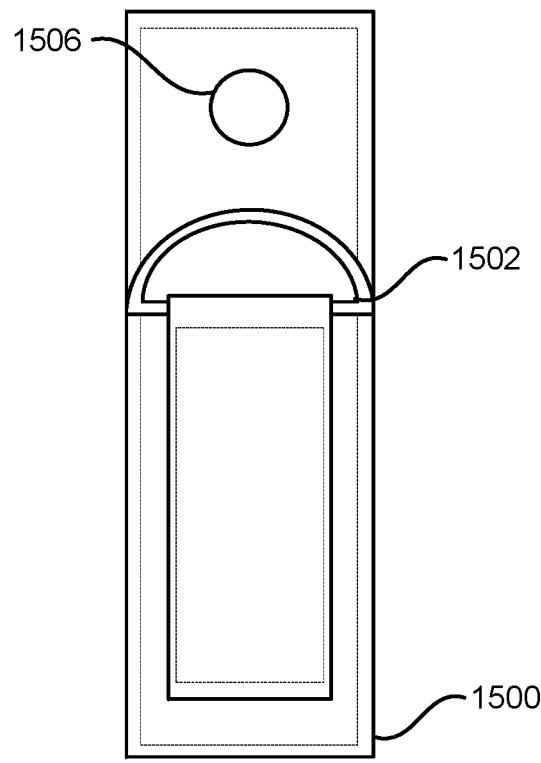
FIG. 59 is a top-down view of the rope-and-engagement-member combination of FIG. 56.

FIGS. 53-55 illustrate another embodiment of a vehicle cover 1000 that is similar to the vehicle covers discussed above, such as vehicle cover 100. The vehicle cover 1000 has an upper portion 1002 and a lower portion 1004. In this embodiment, excess material of the cover 1000 can be drawn up or bound against the cover 1000 through webbing or rope to remove excess material and allow for a snug, efficient fit of the cover 1000 to take up less space and provide a greater enclosure against the elements. There can be a plurality of rope-and-engagement-member combinations 1006 attached to the lower portion 1004, and a plurality of engagement members 1008 that are attached on an opposite side of the lower portion 1004 and that each correspond to a rope. The rope-and-engagement-member combinations 1006 can take a variety of forms, such as a D-ring or loop on a piece of material attached to an edge of the lower portion 1004 and a piece of rope of various lengths extending therefrom, examples of which are provided below. The engagement members that are part of the rope-and-engagement-member combinations 1006 and the engagement members 1008 can have various forms, such as loops, D-rings, tabs, closures, clasps, etc. FIG. 53 illustrates green arrows identifying possible engagement locations of the rope-and-engagement-member combinations 1006 and red arrows identifying possible engagement locations of the engagement members 1008. While the rope-and-engagement-member combinations 1006 and the engagement members 1008 are shown grouped together on respective sides of the cover 1000 through use of the arrows in FIG. 53, the location of each of the plurality of rope-and-engagement-member combinations 1006 and each of the plurality of engagement members 1008 can be varied depending on desired locations or ease of use for a user, such as alternating every other one, etc. While rope is discussed herein, a variety of material and shapes can be used, such as straps, webbing, nylon, etc. The plurality of ropes can have a variety of lengths, such as between about 5 feet and about 75 feet, and more preferably between about 14 feet and about 50 feet. While specific lengths of rope are provided on FIG. 53 for illustrative purposes, various different lengths can be used as desired. Longer lengths of rope can be used at points that require stretching over a top of the vehicle 110, and shorter lengths can be used at points that require a short connection across the vehicle 110.

The material can have a variety of different features and varieties. For example, a weave material that can be used for the cover, such as the Strong Weave 77 mentioned above, can have a triple laminate (such as 3 laminae bonded together) of polyethylene strips woven together. The weave can be a balanced plain weave, such as a simple crisscross pattern of weft (transverse) strips that follow an over/under/over/etc. pattern with respect to the warp (longitudinal) strips. The weave can be a 7×7 weave. Various strips used can be formed from low density polyethylene. There can be reinforcement features, such as scrim reinforcements created by adding one or more strings (such as polyester strings) that are laminated into the weave to provide extra strength (e.g., tear resistance). The material can optionally be fire resistant and/or fire retardant. The material can have a variety of different material properties depending on the exact composition. For example, exemplary material property values are provided in Table 1 below for various poly materials. These values are provided as examples only and are not limiting.

TABLE 1

| Properties | Test Method | Woven Clear Poly MD | Woven Clear Poly CD | String Reinforced Poly MD | String Reinforced Poly CD |
|---|---|---|---|---|---|
| 1″ Tensile Strength | ASTM D751 | 40.9 lbf. | 34.9 lbf. | 48.8 lbf. | 25.6 lbf. |
| Elongation at Break | ASTM D751 | 26.6% | 23.0% | 29.2% | 27.0% |
| Grab Tensile Strength | ASTM D751 | 55.7 lbf. | 48.8 lbf. | 59.1 lbf. | 48.2 lbf. |
| Trapezoidal Tear | ASTM D4533 | 21.5 lbf. | 17.1 lbf. | 22.0 lbf. | 14.2 lbf. |
| Hydrostatic Resistance | ASTM D751 | 142 mbar | 148 mbar | 293 mbar | 278 mbar |
| Mullen Burst | ASTM D751 | 122.5 psi | 118.5 psi | 125.6 psi | 119.6 psi |

The cover 1000 can be deployed onto a vehicle by using any of the methods discussed above, such as the method illustrated in FIGS. 1-16. A sealing mechanism, such as a zipper similar to the zipper 118, can be used to seal the upper and lower portions 1002, 1004 together. Once the sealing mechanism has been used to engage the upper and lower portions 1002, 1004 of the cover 1000, a vehicle such as vehicle 110 will be enveloped by the cover 1000 and surrounded by an at least water resistant barrier, as illustrated in FIGS. 54 and 55. FIG. 54 shows the cover 1000 deployed with the vehicle 110 hidden inside, and FIG. 55 illustrates the cover 1000 deployed with the vehicle 110 shown in place. Once the cover 10000 is deployed and sealed around the vehicle 110, a user can then use the plurality of rope-and-engagement-member combinations 1006 and the plurality of engagement members 1008 to secure excess material of the cover 1000 onto the vehicle 110. For example, the user can find and grasp a rope of one of the rope-and-engagement-member combinations 1006, and the user can walk the grasped rope around the vehicle 110 to an opposite point with a corresponding engagement member 1008. The user can then feed the rope 1006 into the engagement member 1008, and the user can then bring the rope 1006 back to the original point of the rope-and-engagement-member combination 1006 on the other side of the vehicle 110. The user can then feed the rope through the engagement member portion that is part of that particular rope-and-engagement-member combination 1006. The user can then pull the rope tight and tie the rope with a variety of different knots, such as a simple knot, onto that particular rope-and-engagement-member combinations 1006 to secure the rope in place and to draw the corresponding rope-and-engagement-member combination 1006 and engagement member 1008 together to tighten down excess material from the cover 1000. As illustrated in FIG. 55, this process can be repeated over and over until each of the plurality of ropes extends across a top of the vehicle 110, connecting all of the corresponding pairs of rope-and-engagement-member combinations 1006 and engagement members 1008 together. In various embodiments, a color-coded system can be used to identify each pair of the opposite corresponding pairs of rope-and-engagement-member combinations 1006 and engagement member 1008, with each corresponding pair being represented by a different color to assist the user in matching each pair. Alternatively and/or additionally, other designations can be used, such as numbering, labeling, using various symbols, etc.

Figure 60:
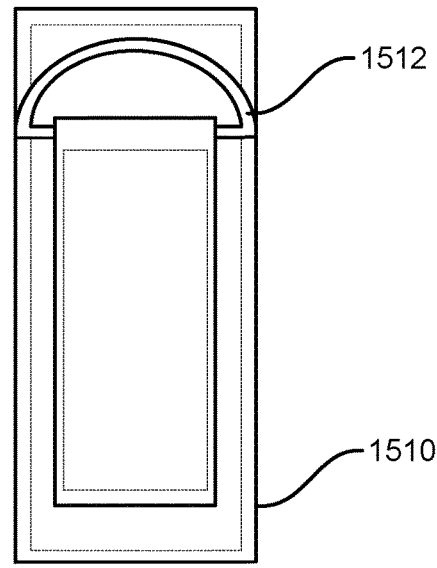
FIG. 60 is a top-down view of one embodiment of an engagement member that can be used with the vehicle cover of FIG. 53.
Figure 61:
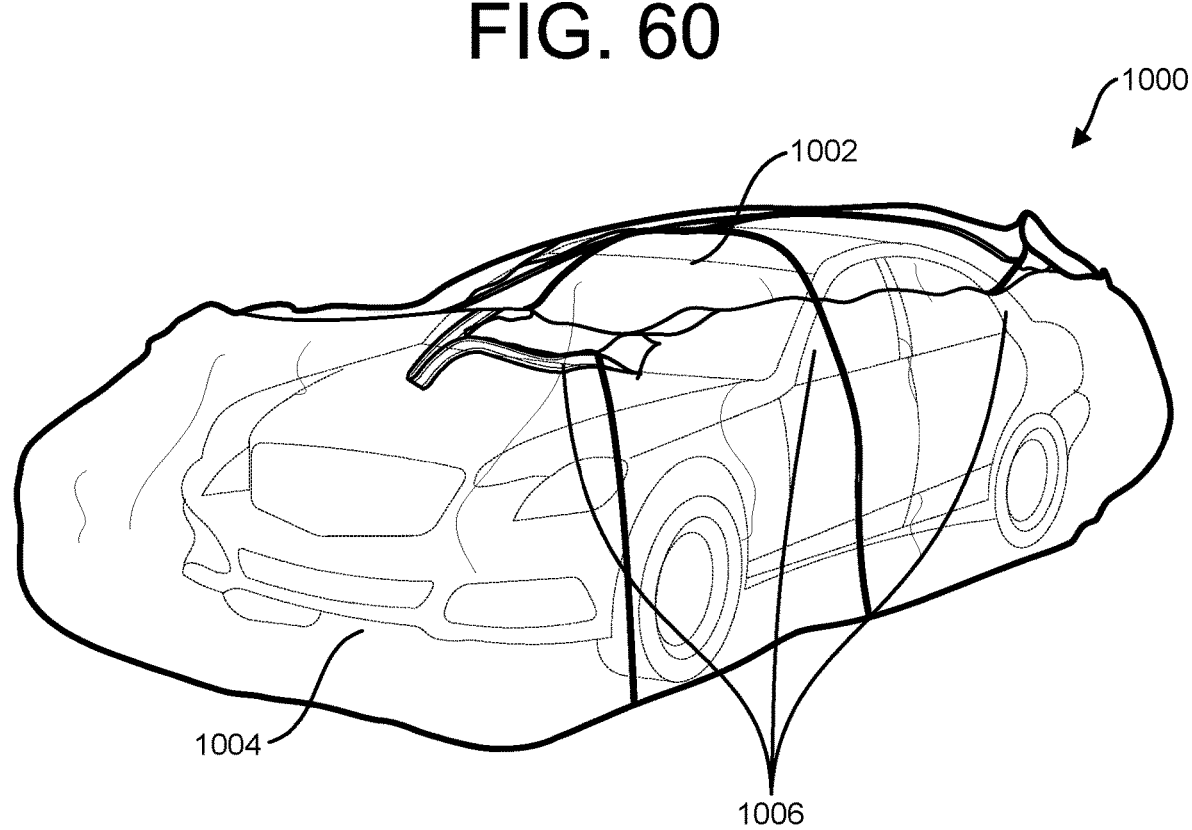
FIG. 61 is a perspective view of the vehicle cover of FIG. 53 secured around a vehicle.
Figure 62:
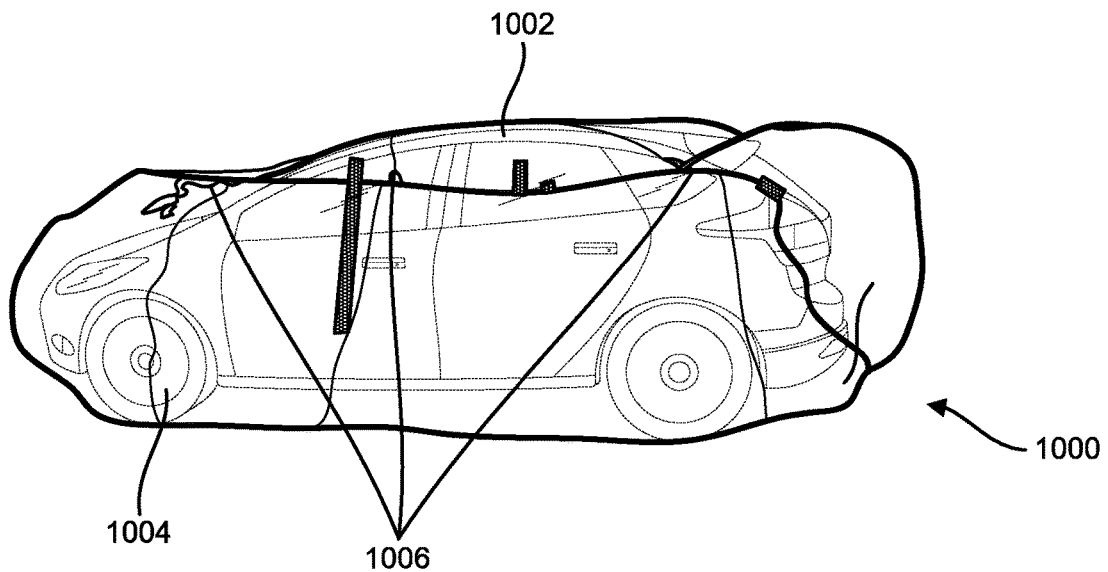
FIG. 62 is a side view of the vehicle cover of FIG. 53 secured around the vehicle of FIG. 61.
Figure 63:
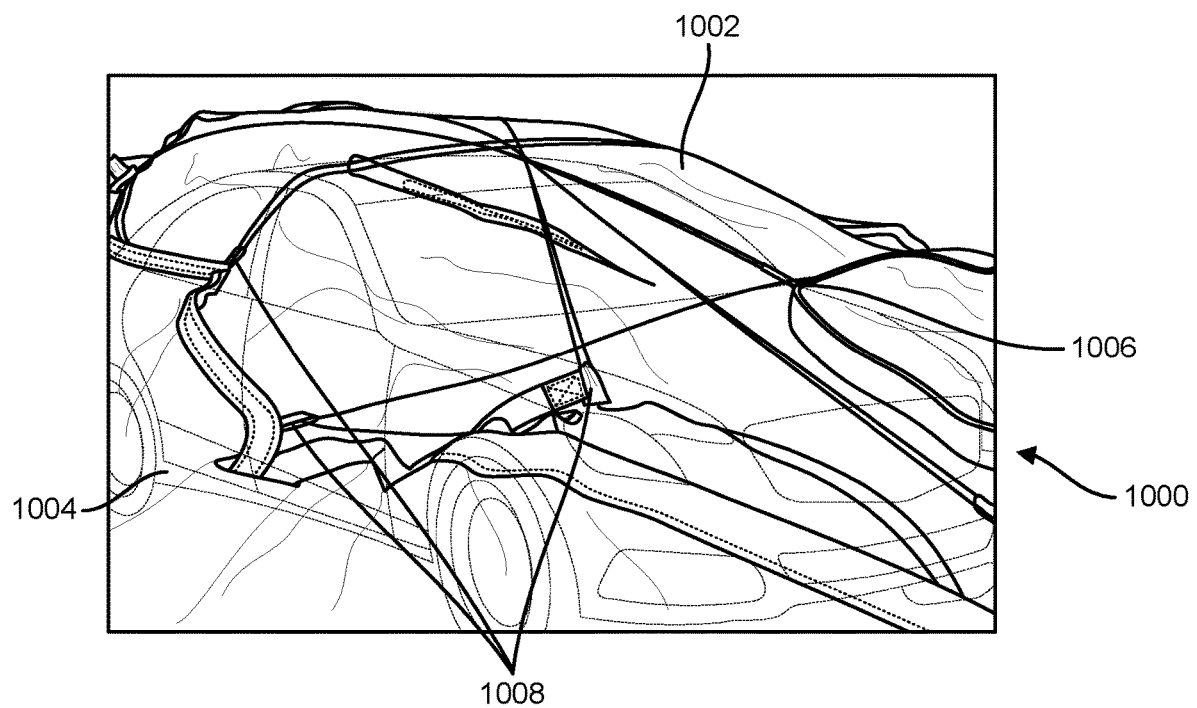
FIG. 63 is a perspective view of the vehicle cover of FIG. 53 secured around the vehicle of FIG. 61.

The rope-and-engagement-member combinations 1006 and the engagement members 1008 can take a variety of forms. FIGS. 56-63 illustrate various embodiments of rope-and-engagement-member combinations and engagement members. For example as illustrated in FIGS. 56-60, a piece of material 1500, such as cloth, nylon, rigid plastic, metal, etc., can be formed into a rectangular shape and folded over on itself. The engagement member portion 1502 can be in the shape of a D-ring and attached to the material 1500, and the rope 1504 can pass through a grommet 1506 and be knotted within an interior of the material 1500 formed by folding it over on itself. The knot can have various forms, such as an overhand knot, a ball knot, etc., and the material 1500 can then be sewn shut to seal the knot inside. The material 1500 can then be attached to the lower portion 1004 of the cover 1000 through a variety of means, such as by sewing, adhesive, staples, etc. FIG. 60 illustrates an embodiment of the engagement members 1008 that has a piece of material 1510, such as cloth, nylon, rigid plastic, metal, etc., formed into a rectangular shape and folded over on itself. The engagement member portion 1512 can be in the shape of a D-ring and attached to the material 1510. The material used for both the material 1500 and the material 1510 can optionally be webbing that is about 1.5 inches wide and/or about 1 inch wide, for example having the largest part of the material being about 1.5 inches wide and a part of the material that engages with the D-ring be about 1 inch wide. While FIGS. 56-60 provide one embodiment of the rope-and-engagement-member combination 1006 and the engagement member 1008, the rope-and-engagement-member combinations 1006 and the engagement members 1008 are not limited to such a design. For example, the materials can take a variety of shapes and forms, the various engagement member portions can be various loops, clasps, hooks, etc., and rope can be attached to material in a variety of ways, such as through adhesives, stitches, staples, etc. FIGS. 61-63 illustrate the cover 1000 closed around a vehicle with excess material secured against the vehicle using engagements similar to those shown in FIGS. 56-60.

Figure 64:
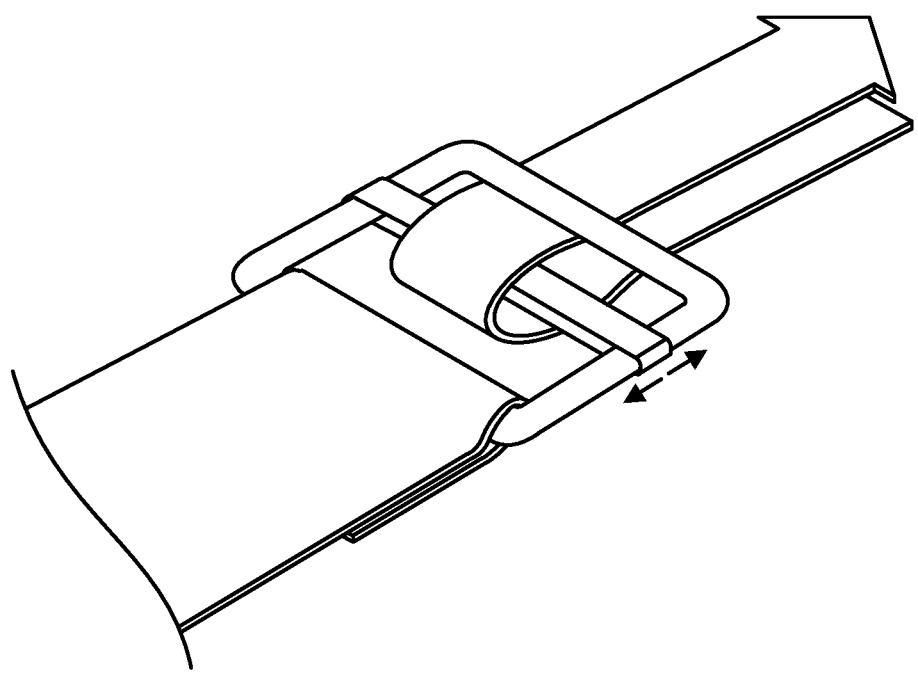
FIG. 64 is a perspective view of one embodiment of a slide bar buckle that can be used to secure webbing of a vehicle cover, such as the vehicle cover of FIG. 53.
Figure 65:
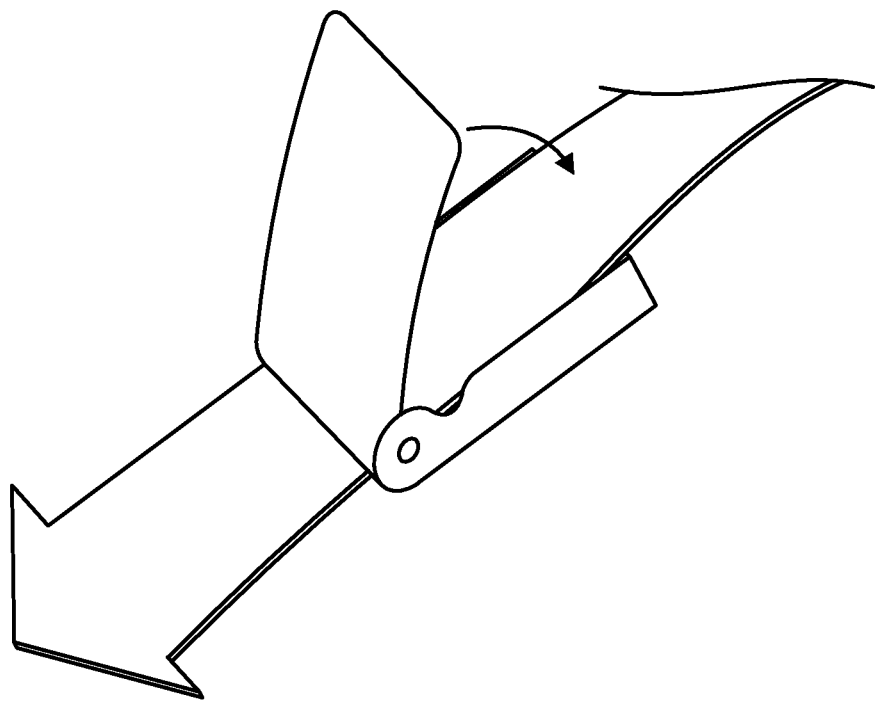
FIG. 65 is a perspective view of one embodiment of a cam buckle that can be used to secure webbing of a vehicle cover, such as the vehicle cover of FIG. 53.
Figure 66:
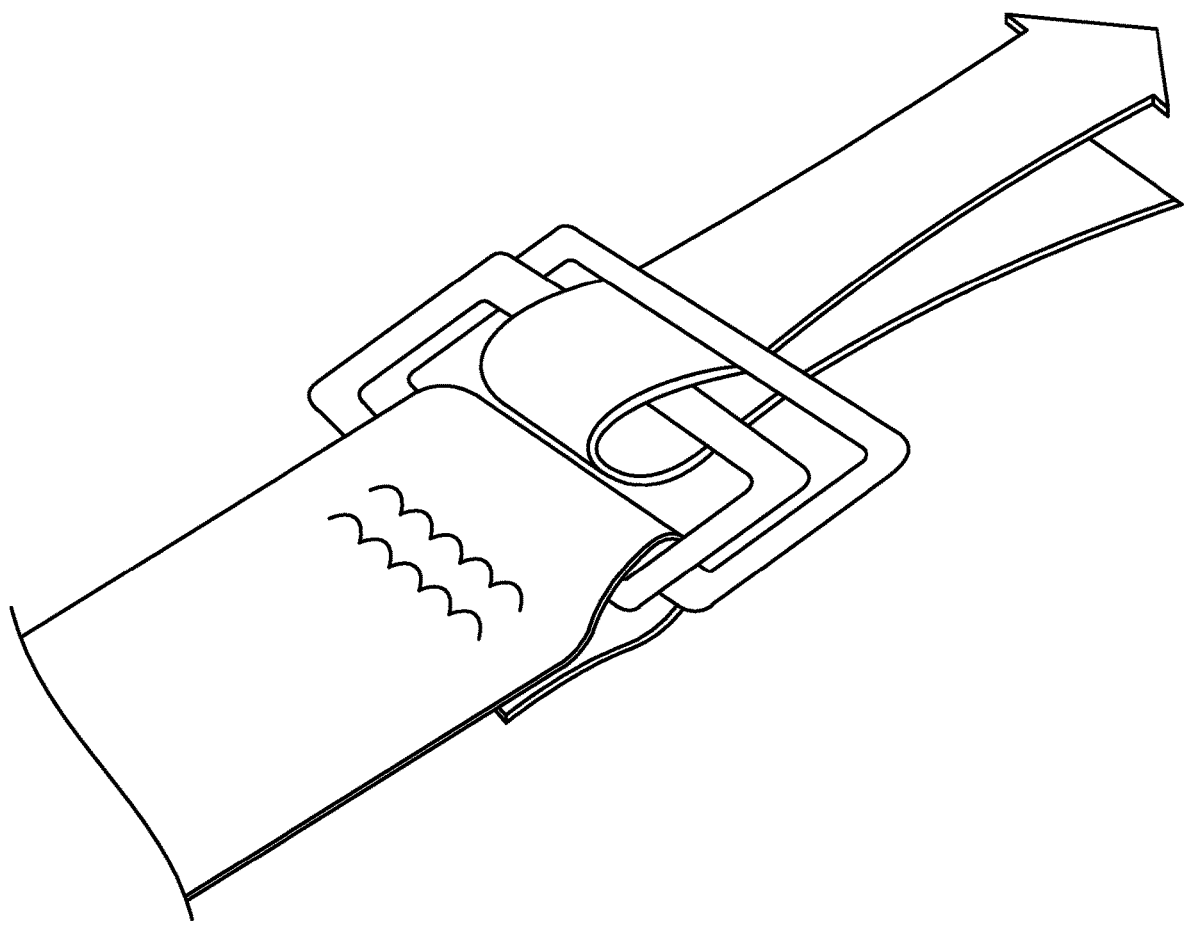
FIG. 66 is a perspective view of one embodiment of a double ring that can be used to secure webbing of a vehicle cover, such as the vehicle cover of FIG. 53.

Instead of and/or in addition to using rope, various webbing can be used in some embodiments. When using webbing, the webbing can be fixed to the same locations as the ropes on the lower portion 1002 of the cover 1000. However, in some embodiments the grommets can be removed. The engagement portion of the engagement member can take various forms, such as rectangular rings, loops, closures, etc. FIGS. 64-66 illustrate various possible engagements that can be used to secure the webbing, such as a side bar buckle of FIG. 64, a cam buckle of FIG. 65, and a double ring of FIG. 66. The side bar buckle can provide significant strength and size for use in securing excess material, and the cam buckle can allow a user to pull webbing in a downwards motion while tightening. A variety of materials can be used for one or more components discussed throughout the application, such as polymers, cloth, rope, vinyl, plastic weaves, Strong Weave 77 Reinforced Poly, String-reinforced poly by Kotap America Ltd., Dura Skrim 6 mil or 10 mil fire retardant string reinforced polyethylene, various polymer sheeting, reinforced poly sheeting with scaffold wrap, etc.

Thus through use of rope and/or webbing, the user can secure excess material from the cover by passing rope and/or webbing across a vehicle to attach the rope and/or webbing to mounting points and cinch or secure the cover. After sealing the cover around a vehicle, the user crosses the ropes and/or webbing to matching or corresponding mounting points, which can be color coordinated. The user then passes the rope or webbing back over the vehicle to the original fixed point to pull the rope and/or webbing tight and secure it.

Figure 67:
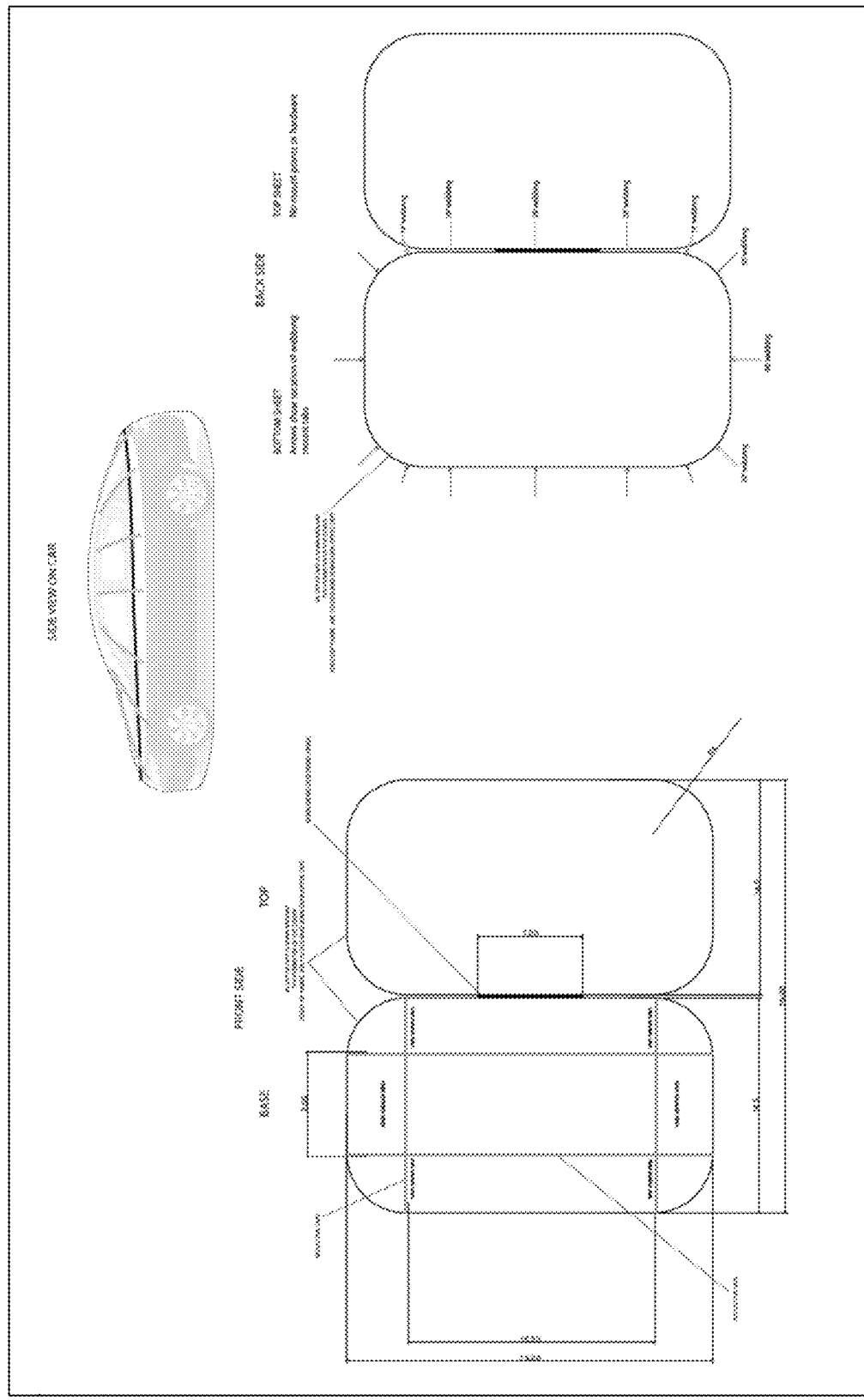
FIG. 67 is a diagram of the vehicle cover of FIG. 53.
Figure 68:
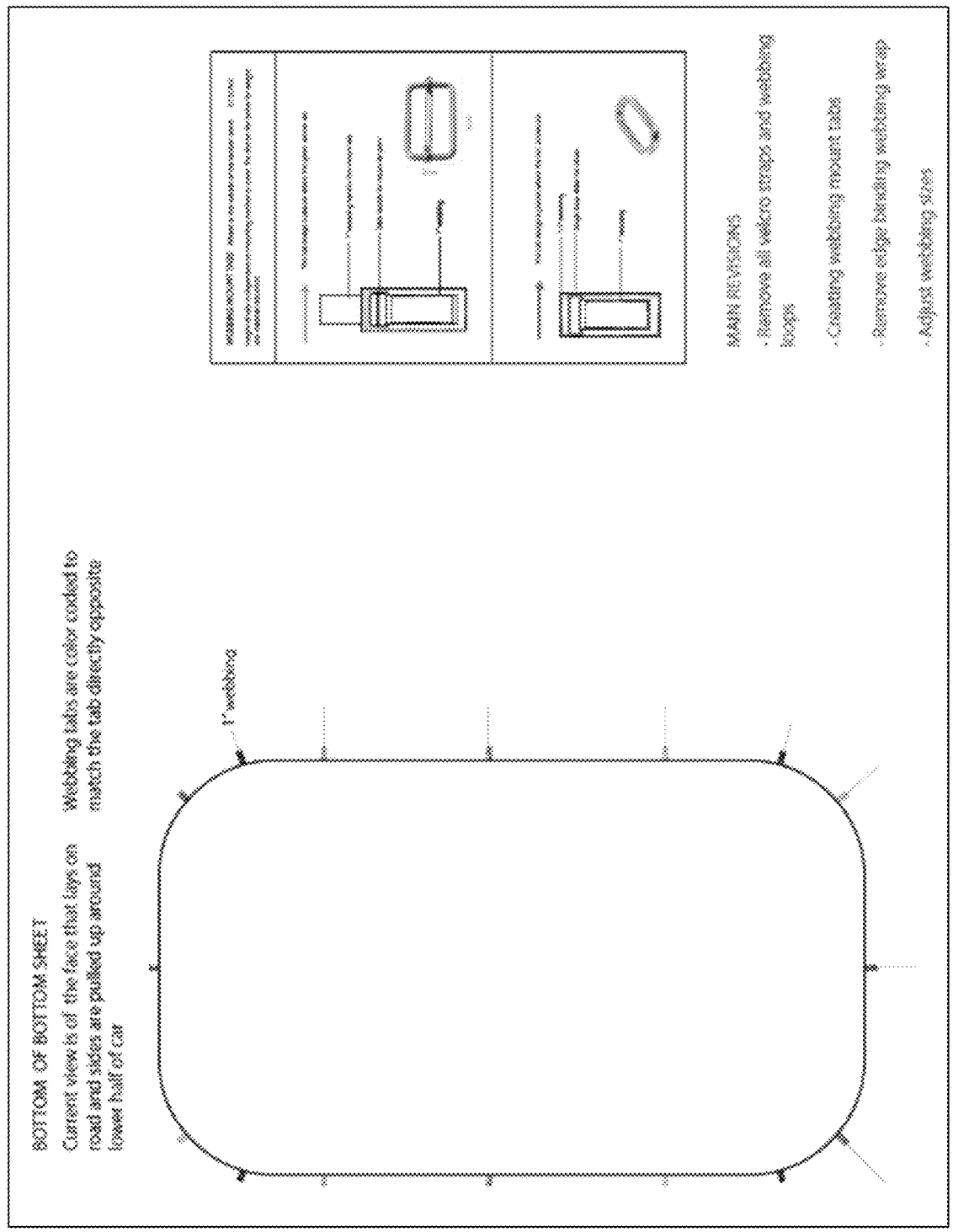
FIG. 68 is a diagram of the vehicle cover of FIG. 53.
Figure 69A:
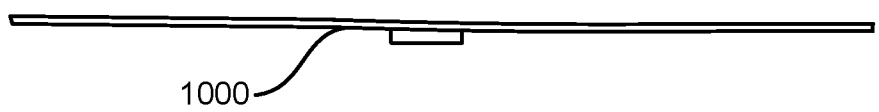
FIGS. 69A-69D illustrate one embodiment of a process of folding the vehicle cover of FIG. 53.
Figure 69B:
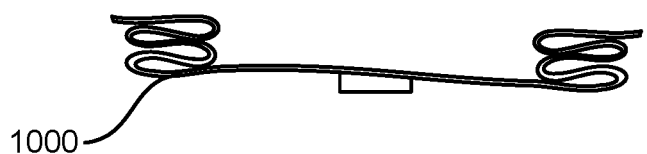
Figure 69C:
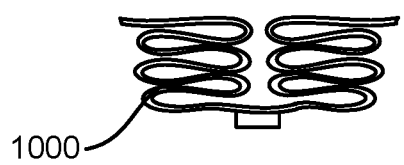
Figure 69D:
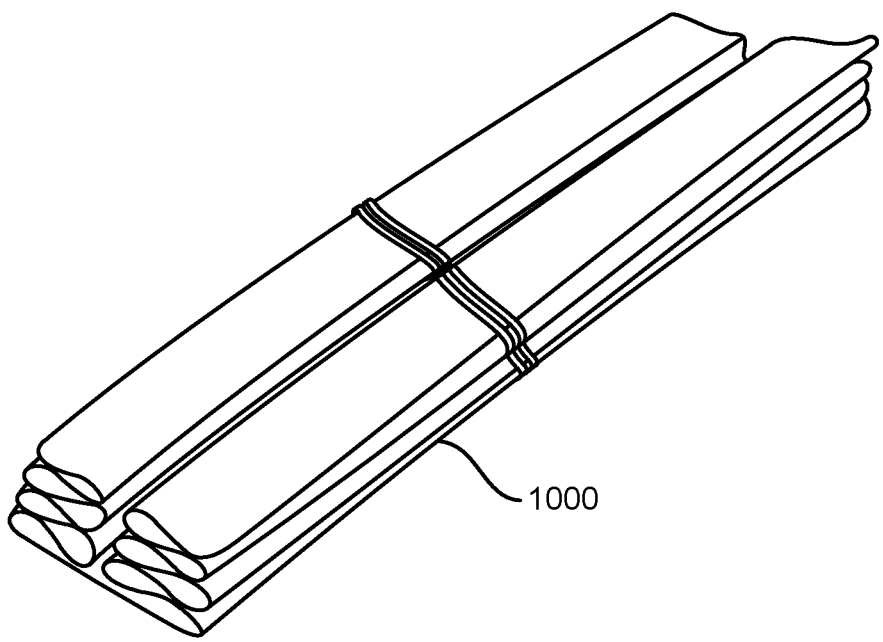
Figure 70A:
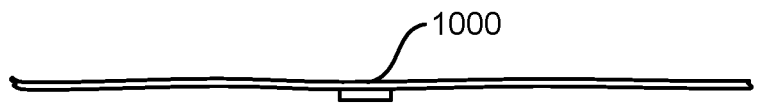
FIGS. 70A-70B illustrate another embodiment of a process of folding the vehicle cover of FIG. 53.
Figure 70B:
Figure 71A:
FIGS. 71A-71D illustrate another embodiment of a process of folding the vehicle cover of FIG. 53.
Figure 71B:
Figure 71C:
Figure 71D:
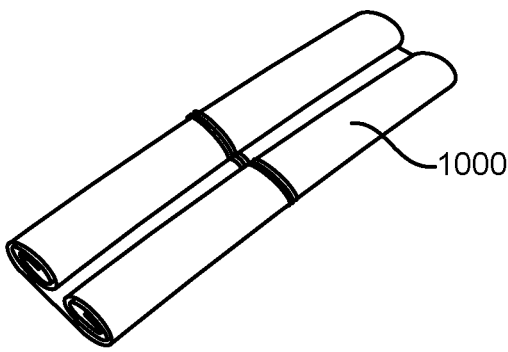

FIGS. 67 and 68 illustrate diagrams or schematics of an embodiment of a vehicle cover as discussed above, such as the vehicle cover 1000 illustrated in FIGS. 53-55. FIG. 67 details that the primary fabric used in the schematic is Strong weave 77-Woven Reinforced Ploly FR White, the hardware includes #5 YKK Racket Coil Zipper Tape, #5 Zipper Pull (Black Metal Slider With Oversized Webbing Loop Pull), 1" Polyester Webbing (Total Of 7 Colors), 1" Metal Adjustor/Slide Buckles, and 1" Metal Rectangular Rings, and that 2" Wide, 3M Reflective Tape is used. Throughout this application, a double quotation mark represents inches, and a single quotation mark represents feet. The cover illustrated is a size S/M. FIG. 68 notes that the webbing must have very little to no stretch and low friction as to allow the user to easily apply force through the single loop slider, and the webbing can be permanently affixed to the webbing mount tabs at the green arrows in some embodiments.

Figure 72:
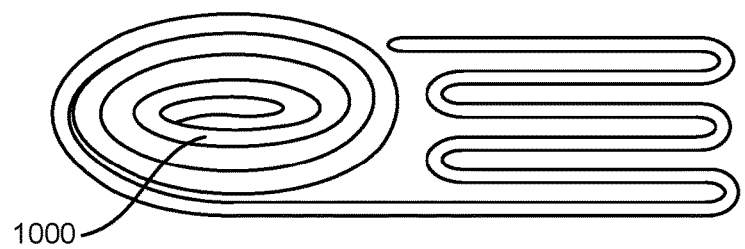
FIG. 72 illustrate one embodiment of a possible folding approach to package the vehicle cover of FIG. 53.
Figure 73:
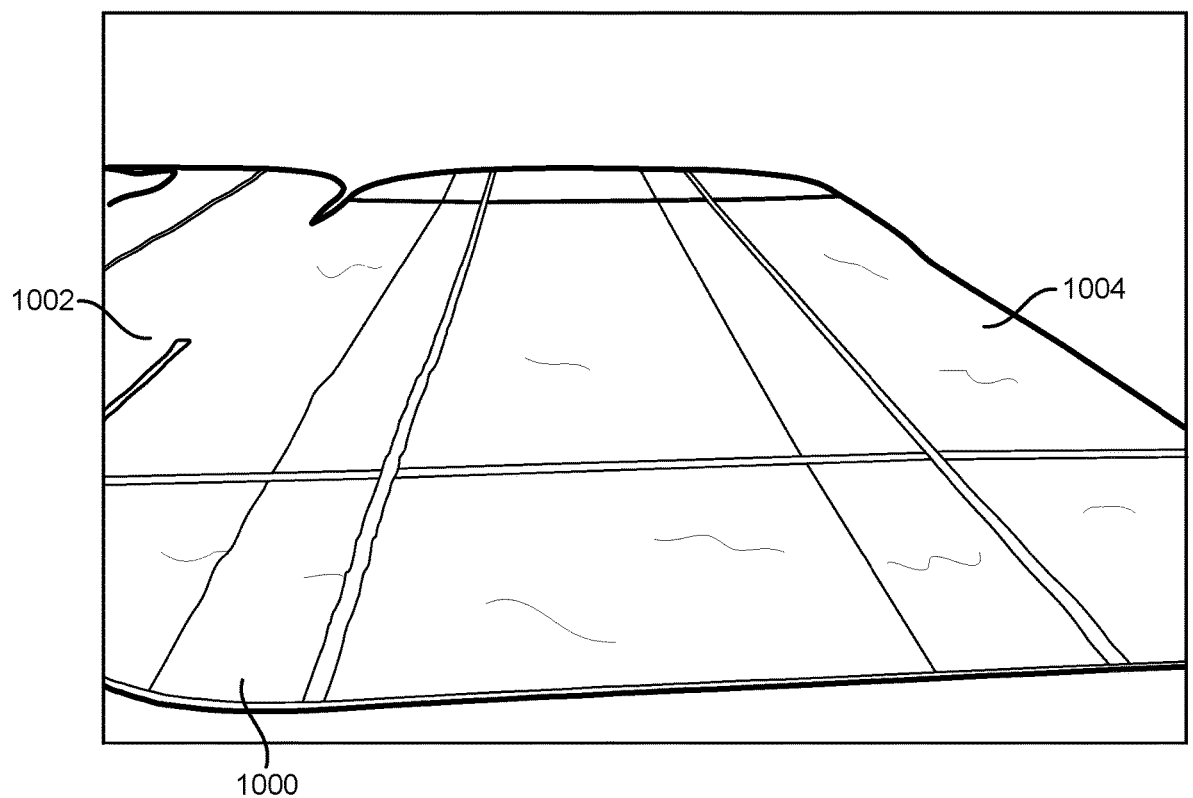
FIG. 73 is a perspective view of the vehicle cover of FIG. 53.

FIGS. 69A-72 illustrate various unfolding (deployment) and/or folding concepts for one or more embodiments of vehicle covers, such as the vehicle covers 100, 1000 discussed above. FIGS. 69A-69D illustrate the vehicle cover 1000 with both the upper and lower portions being folded in an accordion style in 1' increments until the two folded sides meet at the center, as illustrated in FIG. 69D. FIGS. 70A-70B illustrate an asymmetrical accordion fold of the cover 1000, with one side including a larger (3') fold (which is started at the 7' mark) that allows the user to span the distance of the moved vehicle (for example, refer back to FIGS. 29-34 with the method illustrated in those figures producing an asymmetrical movement of the vehicle being covered). FIGS. 71A-71D illustrate a rolling method assembly of the cover 1000 in which both the upper and lower portions are rolled in 1' increments until they meet at the center, for example as illustrated in FIG. 71D. When a vehicle cover, such as the cover 1000, is packaged for storage, transportation, sale, etc., the packaging assembly can take a variety of forms. For example, FIG. 72 illustrates a packaging assembly in which the upper portion is rolled and the lower portion is folded in an accordion style. Throughout this application, any of the covers discussed herein can be deployed, folded, unfolded, packaged, etc. using any technique, such as the techniques discussed above. Generally, a rolling method assembly (illustrated in FIGS. 71A-71D) can help the user by being easier to package and assemble such that usability by one person is achievable. Additionally, a hybrid approach that uses both the rolling method and accordion folding can also work well. For example, both the upper portion and the lower portion can be rolled until they meet at a center. The upper portion (still rolled) can then be rolled again in the opposite direction, and the lower portion (still rolled) can then be folded in an accordion style for easy sliding access when feeding it under the vehicle.

Figure 74:
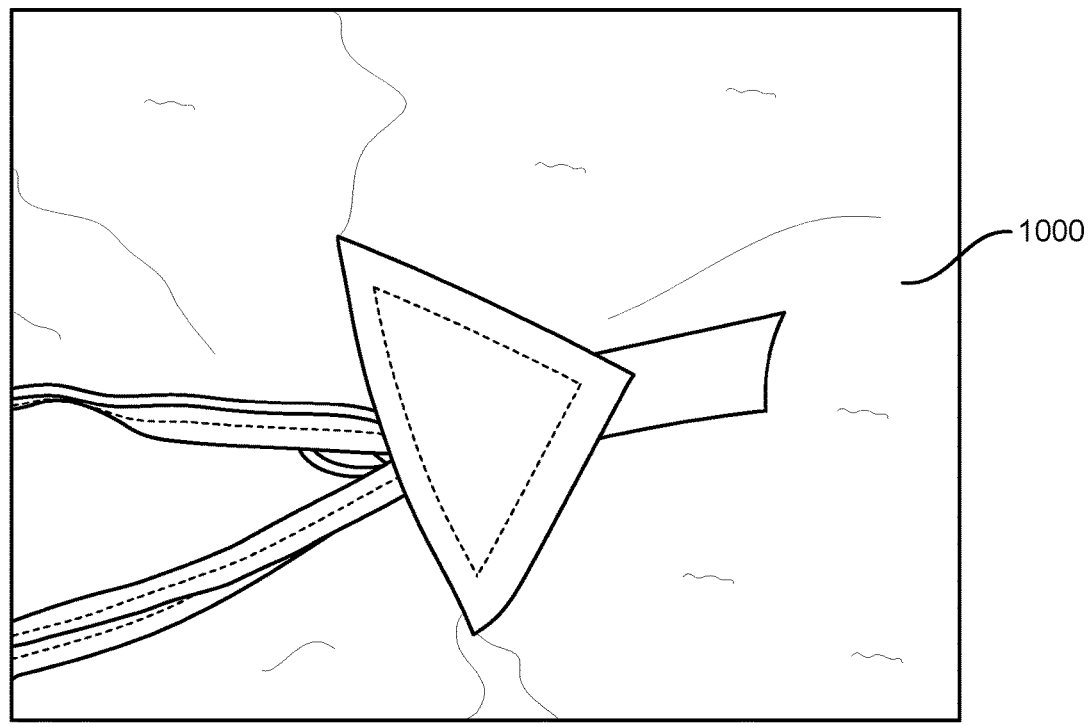
FIG. 74 is a perspective view of a reinforced end of a zipper of the vehicle cover of FIG. 53.
Figure 75:
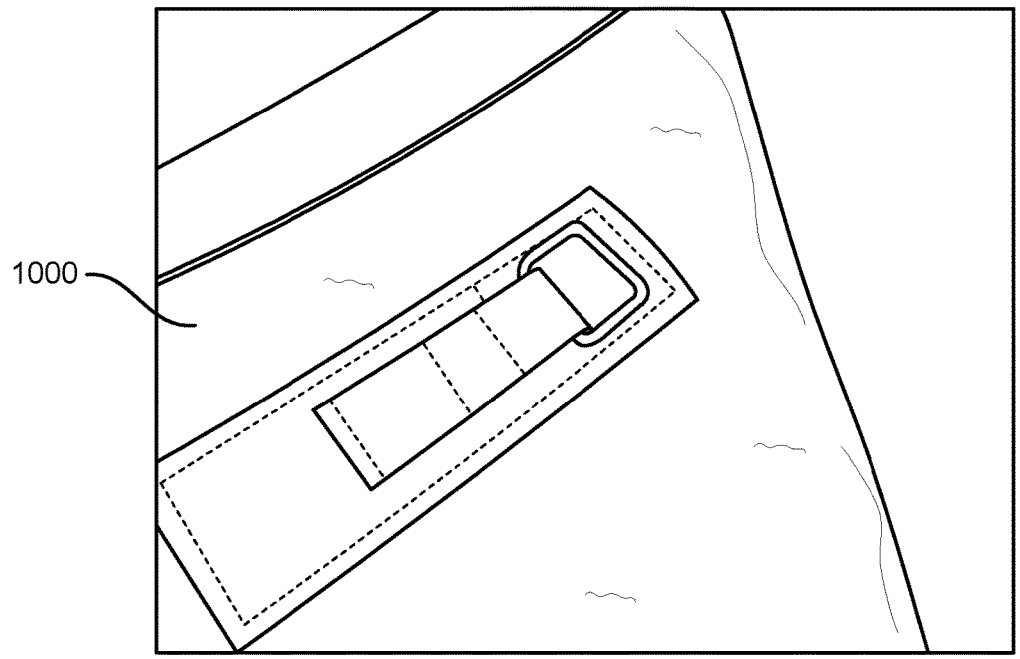
FIG. 75 is a perspective view of one embodiment of an engagement member on the vehicle cover of FIG. 53.
Figure 76:
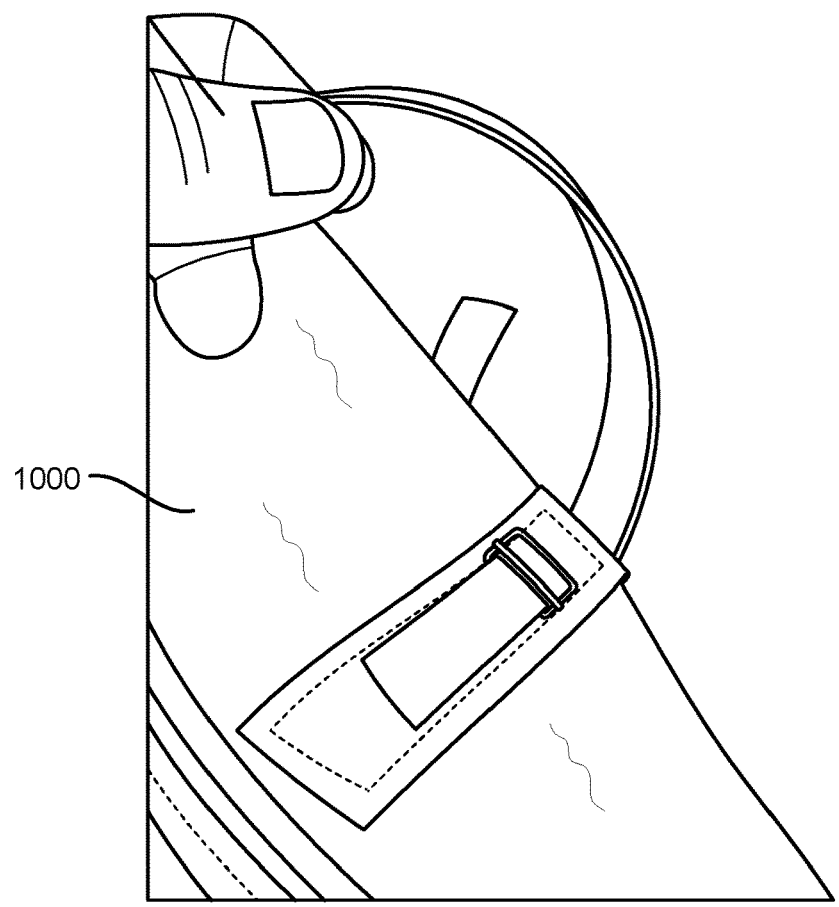
FIG. 76 is a perspective view of one embodiment of a rope-and-engagement-member on the vehicle cover of FIG. 53.
Figure 77:
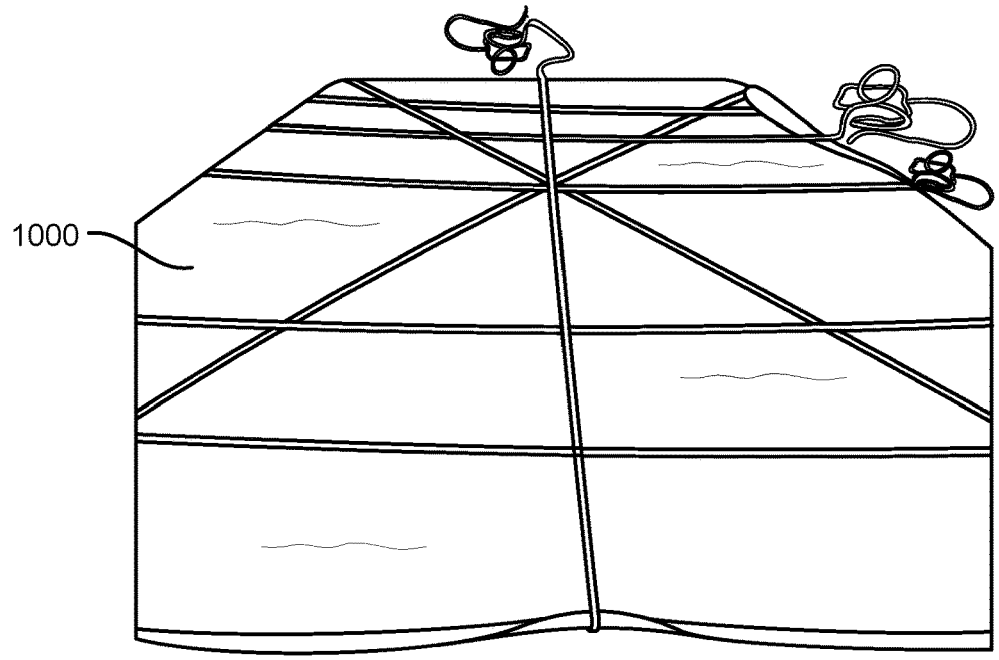
FIG. 77 is a perspective view of the vehicle cover of FIG. 53.
Figure 78:
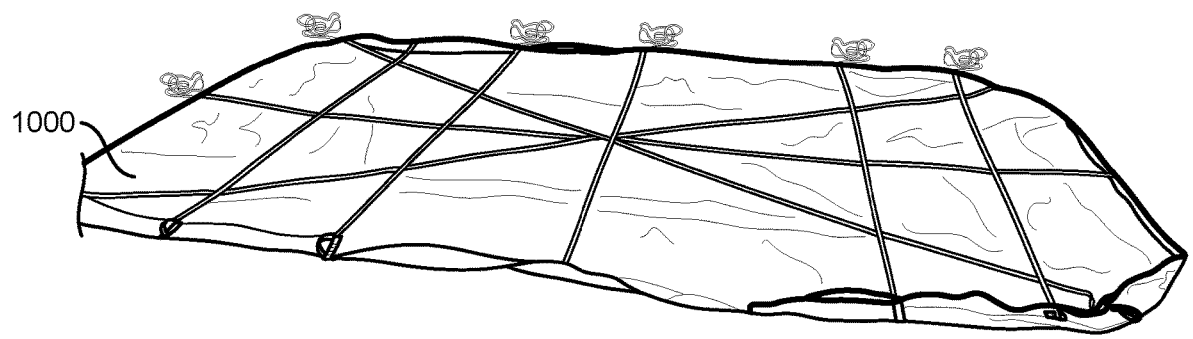
FIG. 78 is a perspective view of the vehicle cover of FIG. 53.
Figure 79:
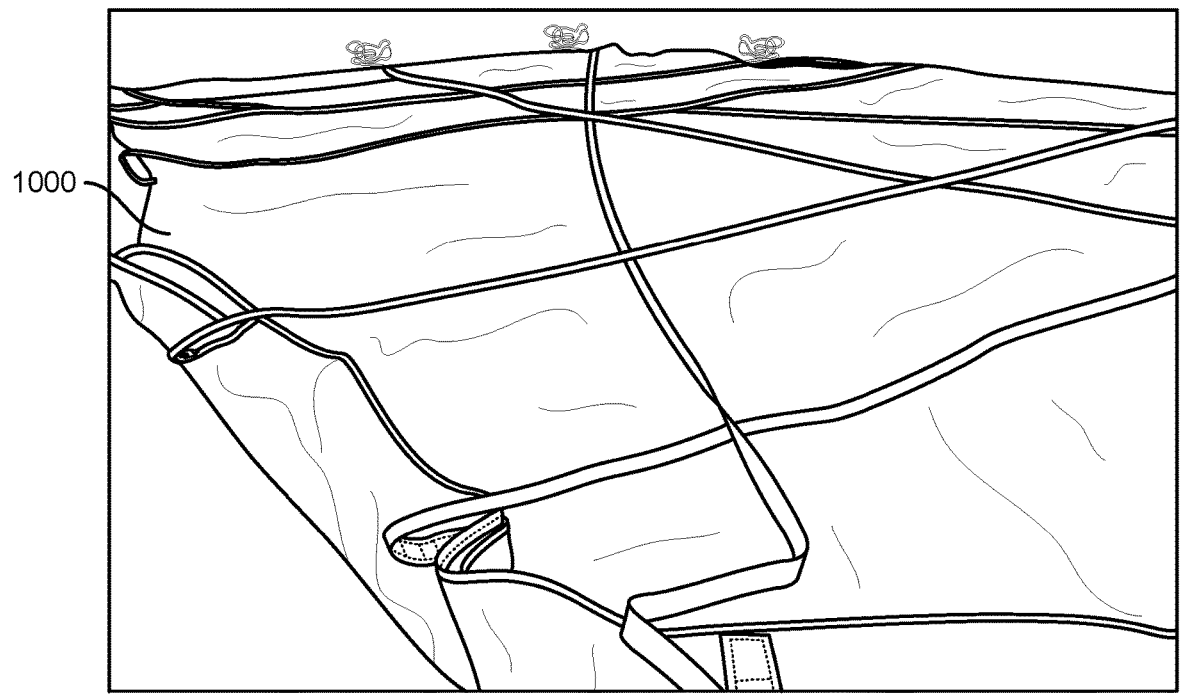
FIG. 79 is a perspective view of the vehicle cover of FIG. 53.
Figure 80:
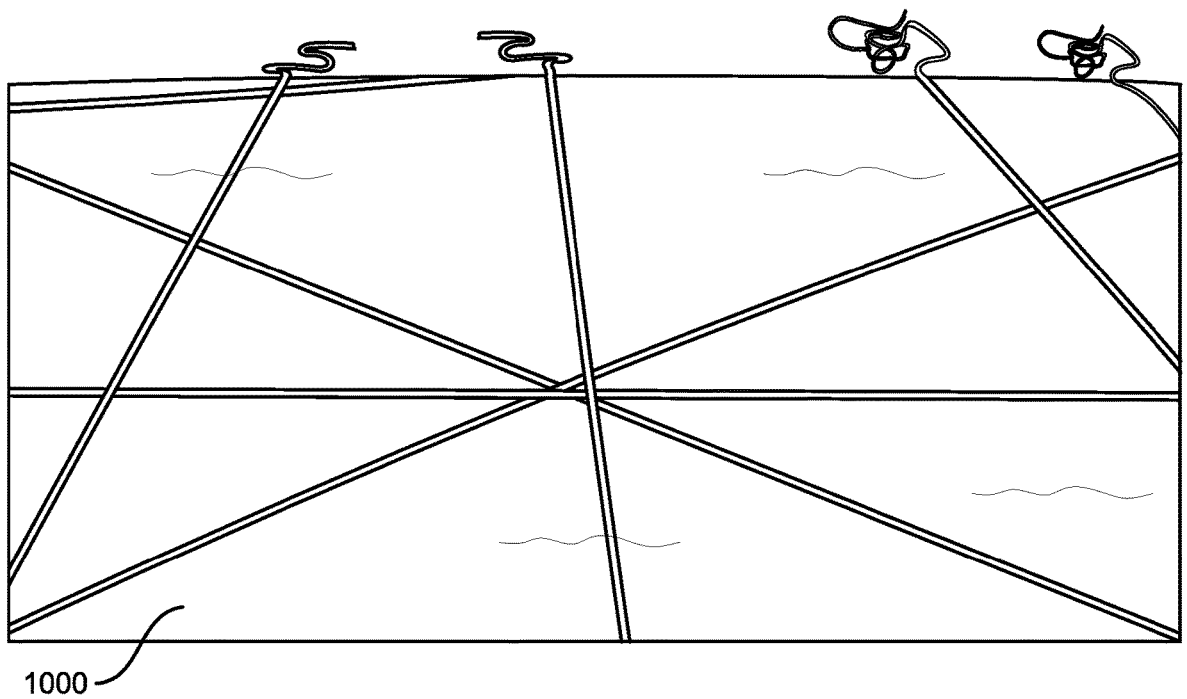
FIG. 80 is a perspective view of the vehicle cover of FIG. 53.
Figure 81:
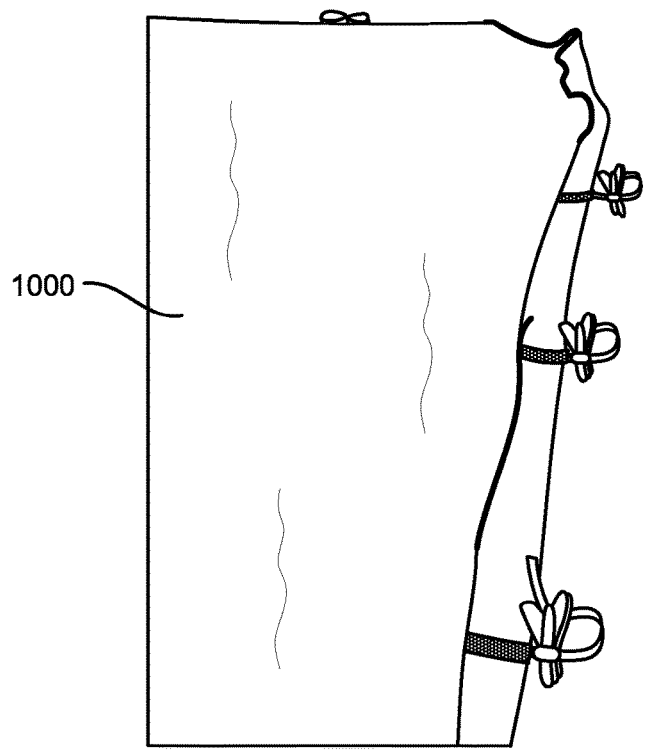
FIG. 81 is a perspective view of the vehicle cover of FIG. 53.
Figure 82:
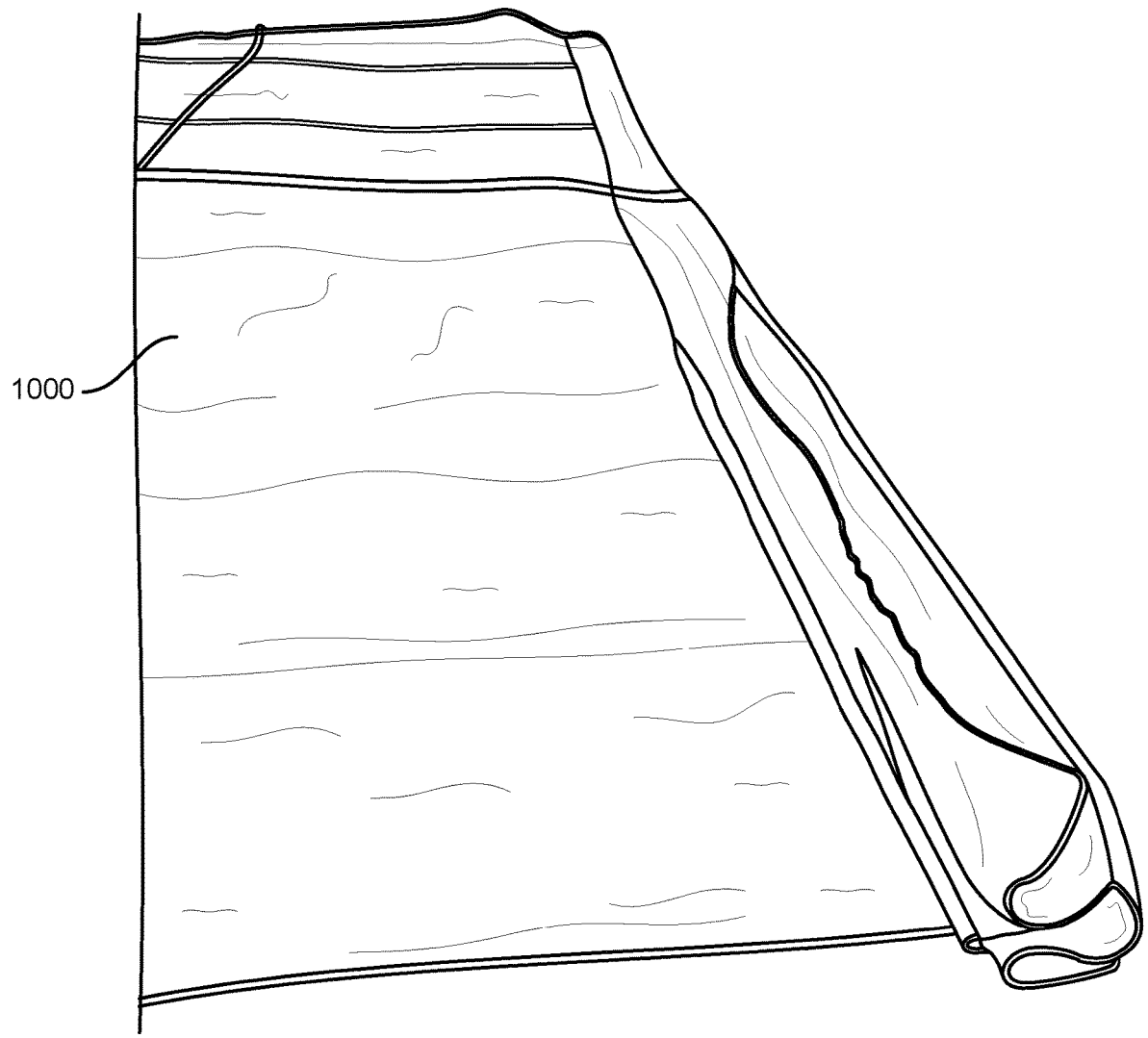
FIG. 82 is a perspective view of the vehicle cover of FIG. 53.
Figure 83:
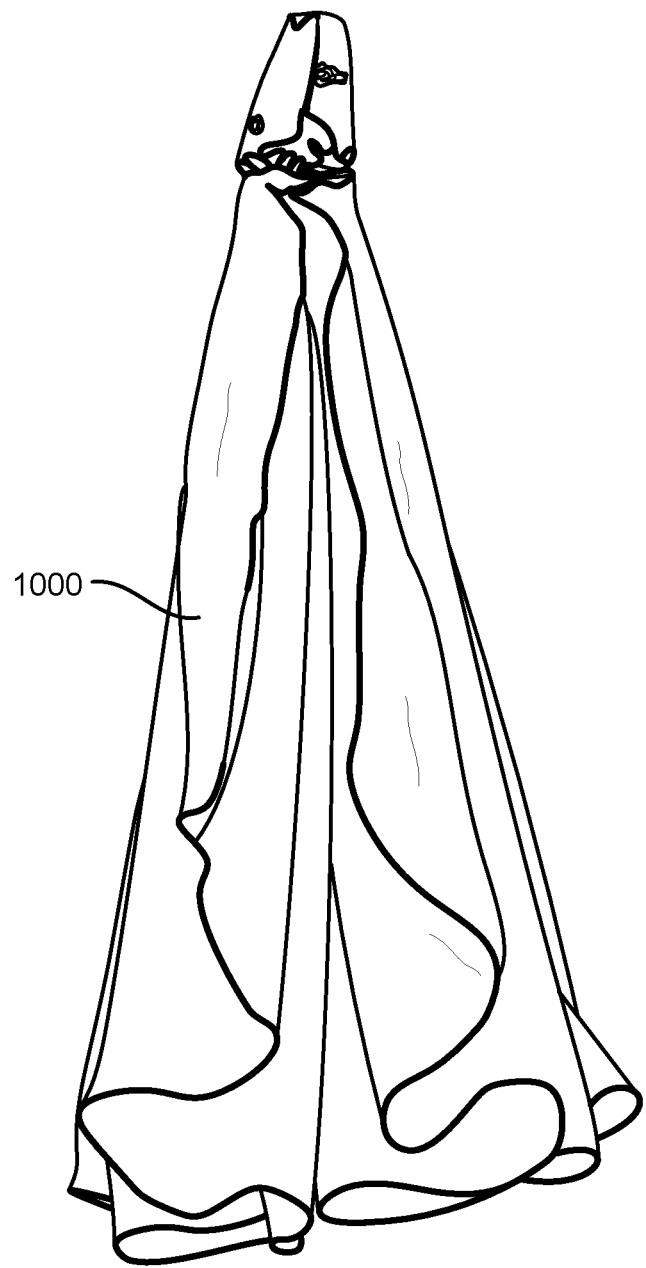
FIG. 83 is a perspective view of the vehicle cover of FIG. 53.
Figure 84:
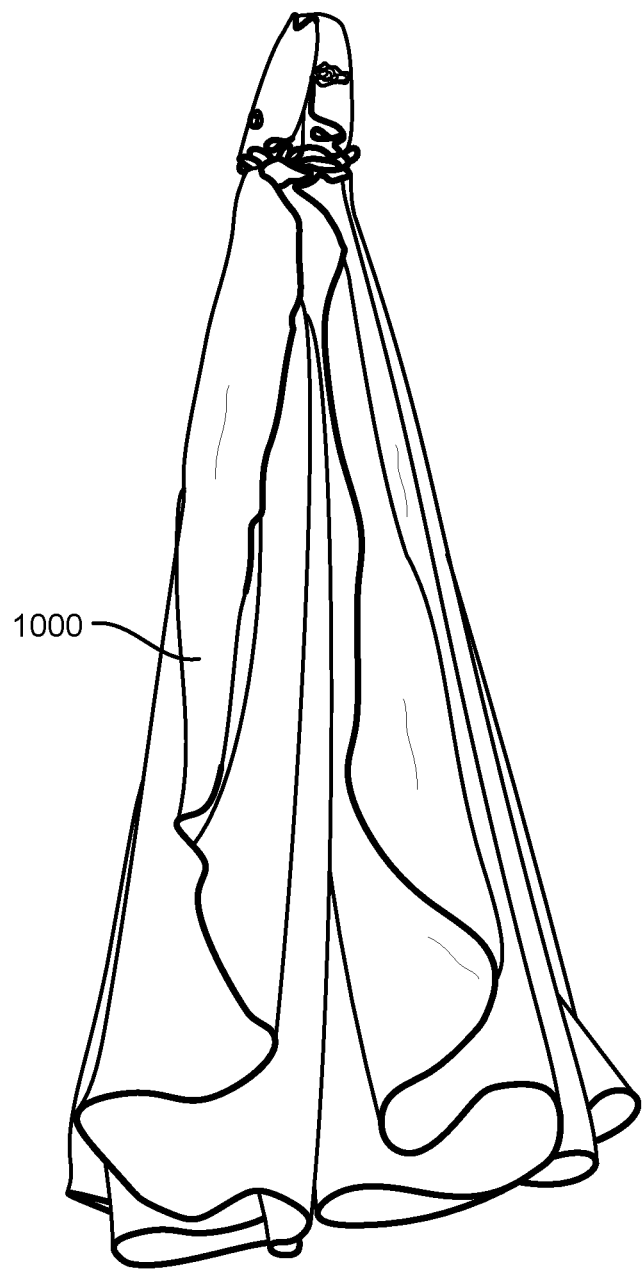
FIG. 84 is a perspective view of the vehicle cover of FIG. 53.
Figure 85:
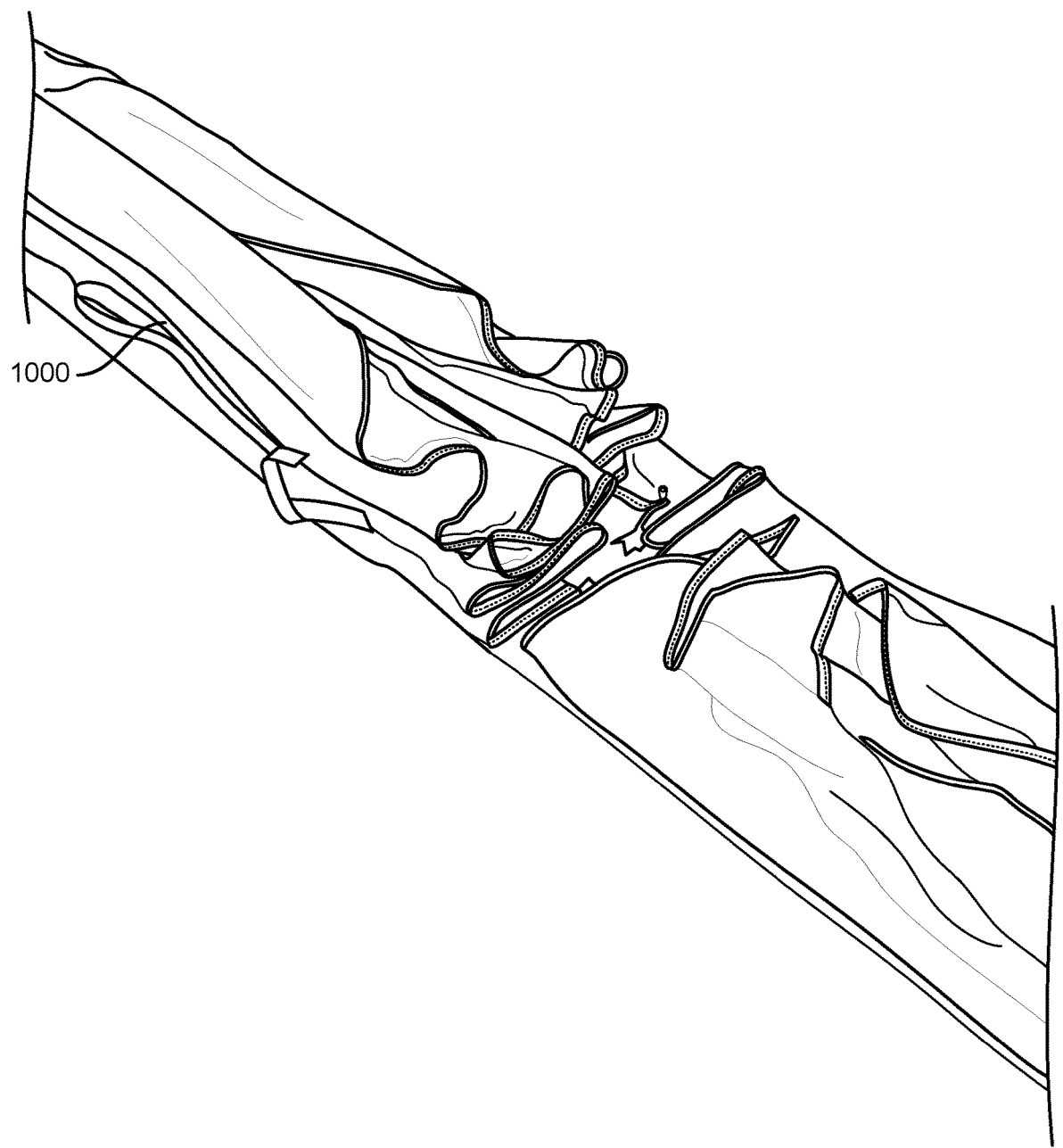
FIG. 85 is a perspective view of the vehicle cover of FIG. 53.
Figure 86:
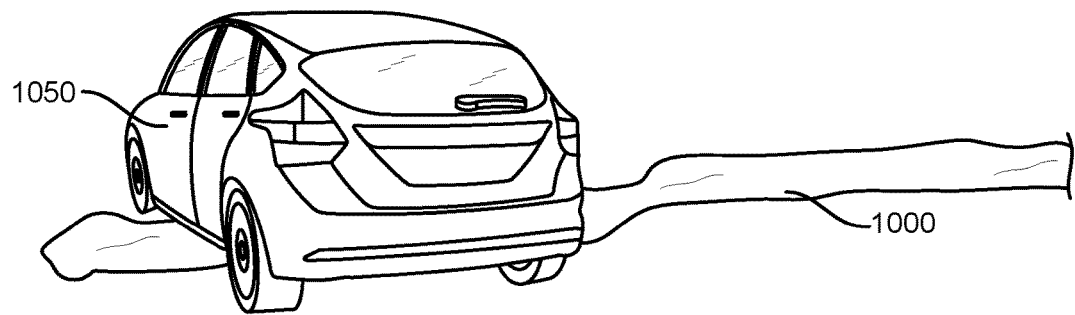
FIG. 86 is a perspective view of the vehicle cover of FIG. 53 with a vehicle.
Figure 87:
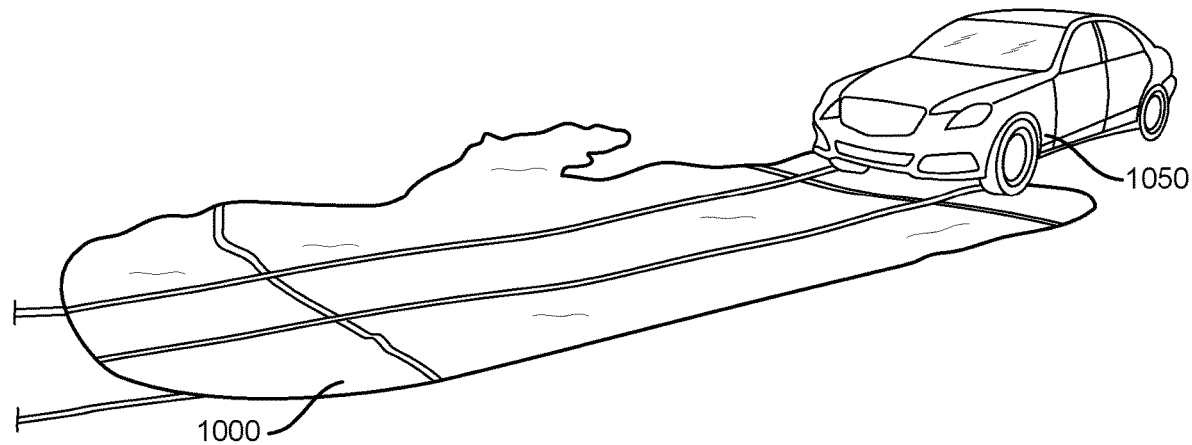
FIG. 87 is a perspective view of the vehicle cover of FIG. 53 with the vehicle of FIG. 86.
Figure 88:
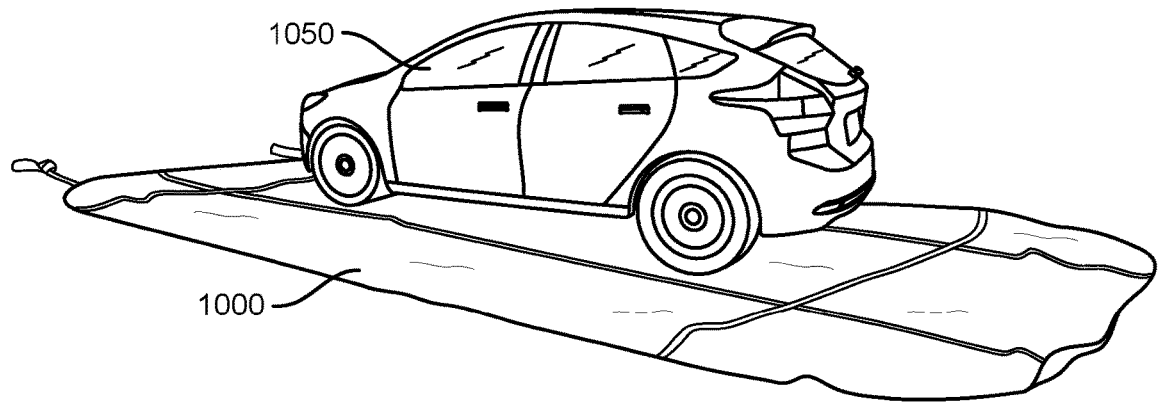
FIG. 88 is a perspective view of the vehicle cover of FIG. 53 with the vehicle of FIG. 86.
Figure 89:
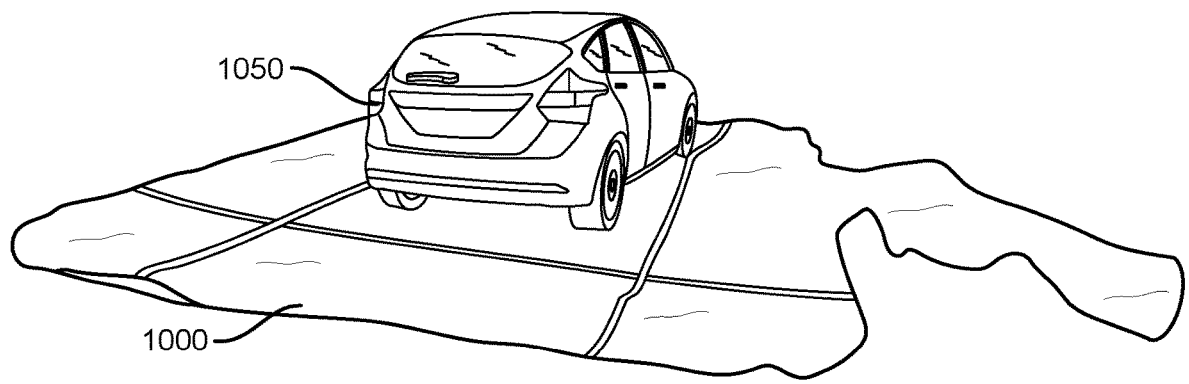
FIG. 89 is a perspective view of the vehicle cover of FIG. 53 with the vehicle of FIG. 86.

FIGS. 73-85 illustrate the vehicle cover 1000 detailed above and also illustrated in FIGS. 53-55. FIGS. 73-85 illustrate the vehicle cover 1000 with the upper portion 1002 and the lower portion 1004. FIG. 74 illustrates a reinforced end of the zipper configured to close the upper and lower portions 1002, 1004 together, and FIGS. 75 and 76 illustrate the various rope-and-engagement-member combinations illustrated in FIGS. 53-63 discussed above. The color-coded system discussed above and illustrated in FIGS. 53-55 can be seen in FIGS. 77-81, in which each pair of the opposite corresponding pairs of rope-and-engagement-member combinations 1006 and engagement member 1008 are represented by a different color to assist the user in matching each pair when closing the cover 1000 over the top of a vehicle. FIGS. 82-85 illustrate folding the cover 1000 in an accordion style, as detailed in FIGS. 69A-69D.

Figure 90:
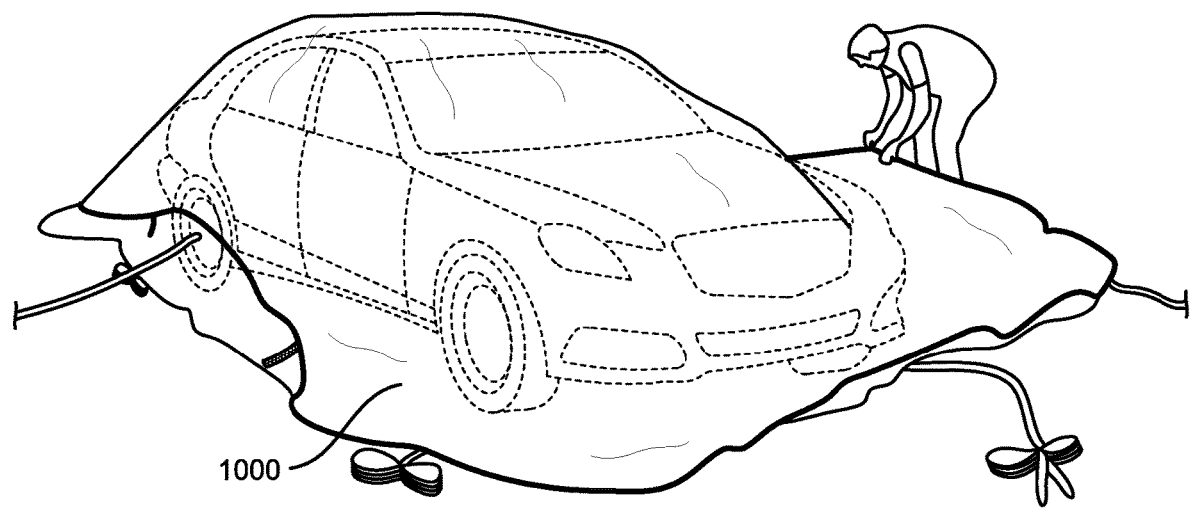
FIG. 90 is a perspective view of the vehicle cover of FIG. 53 with the vehicle of FIG. 86 inside the cover.
Figure 91:
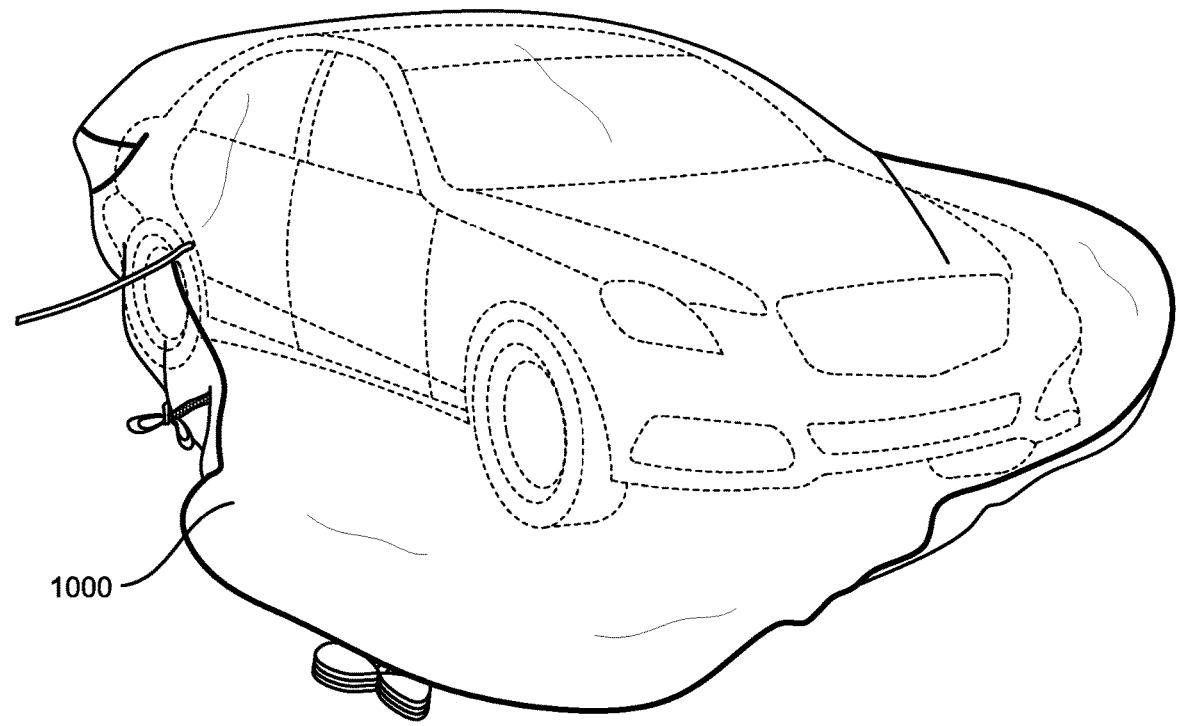
FIG. 91 is a perspective view of the vehicle cover of FIG. 53 with the vehicle of FIG. 86 inside the cover.
Figure 92:
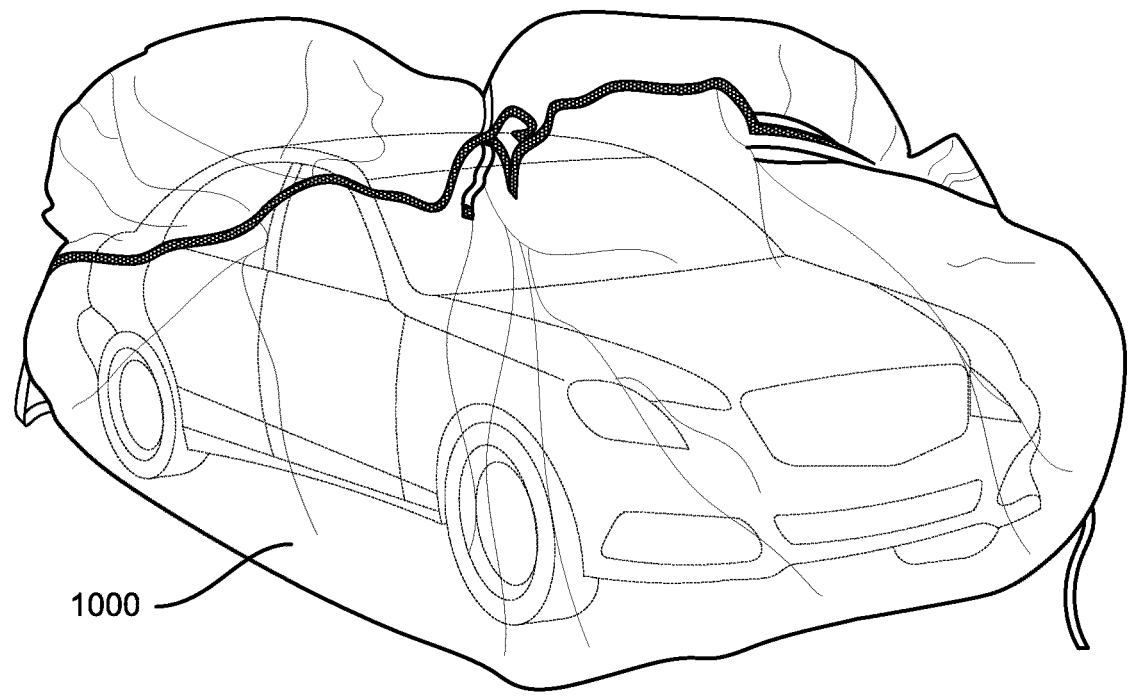
FIG. 92 is a perspective view of the vehicle cover of FIG. 53 with the vehicle of FIG. 86 inside the cover.
Figure 93:
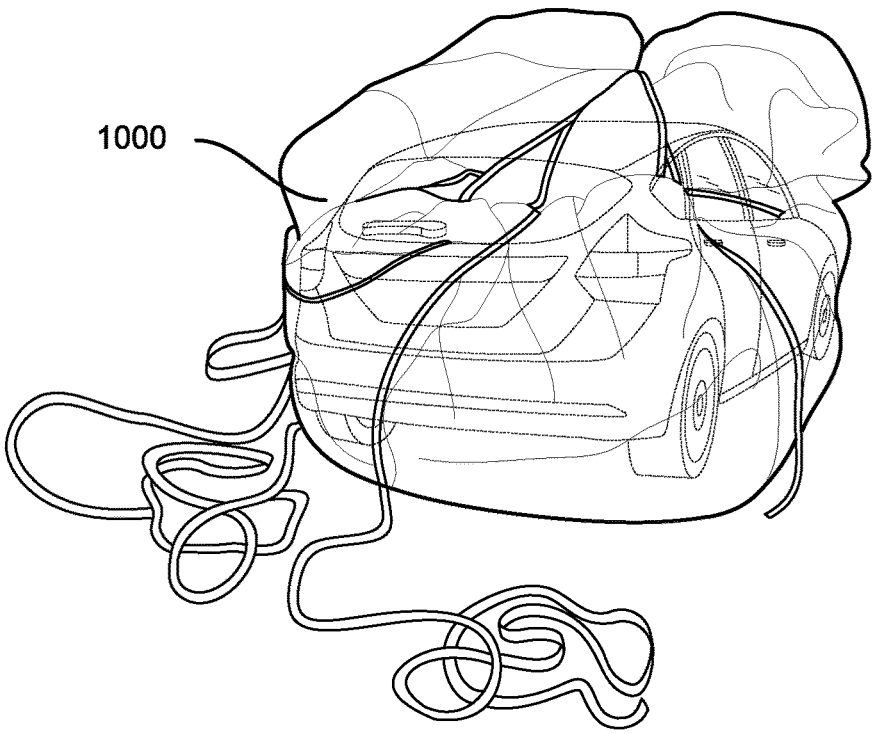
FIG. 93 is a perspective view of the vehicle cover of FIG. 53 with the vehicle of FIG. 86 inside the cover.

FIGS. 86-93 illustrate the vehicle cover 1000 detailed above being placed on a vehicle 1050. FIGS. 86-89 illustrate various methods of deployment of the lower portion 1004 of the cover 1000 underneath the vehicle 1050. FIGS. 90 and 91 illustrate covering the vehicle 1050 with the upper portion 1002 of the cover 1000. FIGS. 92 and 93 illustrate strapping down excess cover material of the cover 1000 onto the vehicle 1050 to allow for a snug, more secure fit to the vehicle 1050. The straps used are the rope-and-engagement-member combinations 1006 and engagement members 1008, and they are paired together such that each pair of the opposite corresponding pairs of rope-and-engagement-member combinations 1006 and engagement member 1008 are represented by a different color to assist the user in matching each pair when closing the cover 1000 over the top of the vehicle 1050.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A covering for a vehicle, comprising:
a vehicle having a right side, a left side, a bottom, a front set of wheels, and a back set of wheels;
an at least water resistant upper cover including a top panel dimensioned to cover at least a top of the vehicle and a plurality of upper side portions that extend from the top panel; and
an at least water resistant lower cover including a bottom panel dimensioned to cover at least the bottom of the vehicle and a plurality of lower side portions that extend from the bottom panel, the lower cover being coupled to the upper cover on a side thereof; wherein:
a plurality of upper fasteners are coupled to peripheral edges of the upper cover,
a plurality of lower fasteners are coupled to peripheral edges of the lower cover and are complementary to the upper fasteners such that the upper and lower fasteners form an at least water resistant seal when the upper and lower fasteners engage each other, the upper cover and the lower cover being configured to fully envelop the vehicle and the upper and lower fasteners being configured to provide an at least water resistant barrier between the vehicle and external elements, and
the upper cover has a proximal-most end and a distal-most end and is pre-folded therebetween such that the upper cover is configured to extend to the right or left side of the vehicle during initial deployment of the covering,
the lower cover has a proximal-most end and a distal-most end and is pre-folded therebetween such that the lower cover is configured to extend underneath the vehicle between the front set of wheels and the back set of wheels of the vehicle during initial deployment with a front folded portion configured to be positioned proximal to and in contact with the front set of wheels and a back folded portion configured to be positioned distal to and in contact with the back set of wheels, and
the upper and lower covers are pre-folded such that each of the upper and lower covers is selectively unfoldable without unfolding the other of the upper and lower covers.

2. The covering for the vehicle of claim 1, wherein the front portion of the lower cover is pre-folded in an accordion fold, and the back portion of the lower cover is pre-folded in an accordion fold.

3. The covering for the vehicle of claim 1, wherein the front portion of the lower cover is pre-folded in a rolled formation, and the back portion of the lower cover is pre-folded in a rolled formation.

4. The covering for the vehicle of claim 1, further comprising one or more markings on the lower cover configured to indicate placement of the vehicle and the lower cover relative to each other.

5. The covering for the vehicle of claim 1, further comprising a pulling member engaged with the lower cover and configured to move the lower cover.

6. The covering for the vehicle of claim 5, wherein the pulling member is selected from a rope, a string, a cloth, a strap, and a handle.

7. The covering for the vehicle of claim 1, further comprising a pushing member engaged with the lower cover and configured to move the lower cover.

8. The covering for the vehicle of claim 7, wherein the pushing member is selected from a collapsible rod, a telescoping rod, a fixed rod, a stick, a bar, and a handle.

9. The covering for the vehicle of claim 1, wherein the plurality of upper fasteners and the plurality of lower fasteners are selected from a zipper, Velcro, elastic bands, adhesives, ropes, tethers, hooks, snaps, buttons, tape, straps, webbing, webbed straps, and magnets.

10. The covering for the vehicle of claim 1, wherein the upper cover and the lower cover are made from one or more materials selected from flexible polymer, a cloth, or plastic.

11. The covering for the vehicle of claim 1, wherein the lower cover has different material properties than the upper cover.

12. The covering for the vehicle of claim 1, wherein a total weight of the lower and upper covers does not exceed 25 pounds.

13. The covering for the vehicle of claim 1, further comprising one or more expandable shafts attached to an inside surface of the upper cover and configured to be positioned between the upper cover and the vehicle.

14. The covering for the vehicle of claim 13, wherein the one or more expandable shafts are inflatable tubes.

15. The covering for the vehicle of claim 1, further comprising at least one upper engagement on the upper cover and at least one corresponding lower engagement on the lower cover, the upper and lower engagements being configured to engage with each other after the upper and lower covers have surrounded the vehicle and while the plurality of upper fasteners and the plurality of lower fasteners are engaged with each other.

16. The covering for the vehicle of claim 1, wherein the peripheral edges of the upper cover and the peripheral edges of the lower cover are curved to approximate a shape of the vehicle and configured to eliminate excess material.

17. The covering for the vehicle of claim 1, wherein a length of the lower cover is between approximately 160% and 180% of a total length of the vehicle.

18. The covering for the vehicle of claim 1, wherein at least one of the upper cover and the lower cover has a transparent portion.

19. The covering for the vehicle of claim 1, wherein a front portion of the upper cover and the front portion of the lower cover are pre-folded in a rolled configuration, and a back portion of the upper cover and the back portion of the lower cover is pre-folded in a rolled configuration.

20. The covering for the vehicle of claim 1, wherein a front portion of the upper cover and the front portion of the lower cover are pre-folded in a rolled configuration, and a back portion of the upper cover and the back portion of the lower cover is pre-folded in an accordion fold.

21. The covering for the vehicle of claim 1, further comprising a plurality of rope-and-engagement-members and a plurality of corresponding loop members positioned opposite one another around the peripheral edges of the lower cover,
wherein the plurality of rope-and-engagement-members and the plurality of corresponding loop members are configured to pair with each other such that each rope-and-engagement-member is configured to engage one loop member, and each pair is configured to secure excess slack of the upper cover and the lower cover when the covering is on the vehicle.

22. The covering for the vehicle of claim 21, wherein the plurality of rope-and-engagement-members include one of rope, straps, and webbing.

23. The covering for the vehicle of claim 21, wherein the plurality of loop members include one of a side bar buckle, a slide buckle, a cam buckle, and a double ring.

24. The covering for the vehicle of claim 21, wherein each pair of the rope-and-engagement-member and the loop member have a matching distinct color from the other pairs.

25. The covering of claim 1, wherein the front folded portion of the lower cover represents approximately half of the lower cover on a distal end thereof, and the back folded portion represents approximately half of the lower cover on a proximal end thereof.

26. The covering of claim 1, wherein the vehicle comprises a plurality of vehicles, and wherein the upper cover and the lower cover are configured to cover the plurality of vehicles simultaneously.

* * * * *